(12) United States Patent
Braginsky et al.

(10) Patent No.: US 10,819,104 B2
(45) Date of Patent: Oct. 27, 2020

(54) BYPASS CIRCUIT AND METHOD TO BYPASS POWER MODULES IN POWER SYSTEM

(71) Applicant: Solaredge Technologies Ltd., Herzeliya (IL)

(72) Inventors: David Braginsky, Ashdod (IL); Ilan Yoscovich, Ramat Gan (IL); Tzachi Glovinsky, Petah Tikva (IL)

(73) Assignee: Solaredge Technologies Ltd., Herzeliya (IL)

( * ) Notice: Subject to any disclaimer, the term of this patent is extended or adjusted under 35 U.S.C. 154(b) by 81 days.

(21) Appl. No.: 15/998,858

(22) Filed: Aug. 17, 2018

(65) Prior Publication Data

US 2018/0366945 A1 Dec. 20, 2018

Related U.S. Application Data

(63) Continuation-in-part of application No. 15/924,564, filed on Mar. 19, 2018, now Pat. No. 10,355,582.
(Continued)

(51) Int. Cl.
*H02H 7/20* (2006.01)
*H02M 7/06* (2006.01)
(Continued)

(52) U.S. Cl.
CPC .............. *H02H 7/20* (2013.01); *H02M 7/06* (2013.01); *H02M 7/49* (2013.01); *H02S 10/00* (2013.01);
(Continued)

(58) Field of Classification Search
CPC ...................................................... H02M 7/06
See application file for complete search history.

(56) References Cited

U.S. PATENT DOCUMENTS

2008/0198523 A1 8/2008 Schmidt et al.
2009/0033152 A1 2/2009 Harris
(Continued)

FOREIGN PATENT DOCUMENTS

EP 3029821 A1 6/2016
WO 2017/038022 A1 3/2017

OTHER PUBLICATIONS

Apr. 25, 2019—European Search Report for EP 18164697.7.
(Continued)

*Primary Examiner* — Jue Zhang
*Assistant Examiner* — Trinh Q Dang
(74) *Attorney, Agent, or Firm* — Banner & Witcoff, Ltd.

(57) ABSTRACT

A method for a power system having a string of a plurality of power sources connected across a power device includes connecting a plurality of safe voltage units having safety switches connected respectively across each of the power sources. The method includes sensing a plurality of parameters of the power sources, and monitoring for a signal transmitted from the power device. Each of the safety switches is activated to be OFF responsive to detecting the signal within a predetermined time period. Upon not detecting the signal from the power device within the predetermined time period, a safe mode of operation of the power system is entered in which the voltages of each of the power sources is reduced to a voltage level less than a predetermined voltage level by turning the safety switches ON.

20 Claims, 35 Drawing Sheets

Related U.S. Application Data

(60) Provisional application No. 62/547,221, filed on Aug. 18, 2017, provisional application No. 62/478,366, filed on Mar. 29, 2017.

(51) Int. Cl.
| | | |
|---|---|---|
| *H02M 7/49* | (2007.01) | |
| *H02S 10/00* | (2014.01) | |
| *H02S 40/36* | (2014.01) | |
| *H02J 7/00* | (2006.01) | |
| *H02M 7/5387* | (2007.01) | |
| *H02J 3/38* | (2006.01) | |
| *H02M 3/158* | (2006.01) | |
| *H02J 1/08* | (2006.01) | |

(52) U.S. Cl.
CPC ............ *H02S 40/36* (2014.12); *H02H 7/205* (2013.01); *H02J 1/08* (2013.01); *H02J 3/383* (2013.01); *H02J 7/0013* (2013.01); *H02J 7/0063* (2013.01); *H02J 2007/0067* (2013.01); *H02J 2300/30* (2020.01); *H02M 3/158* (2013.01); *H02M 3/1582* (2013.01); *H02M 7/5387* (2013.01)

(56) References Cited

U.S. PATENT DOCUMENTS

| | | |
|---|---|---|
| 2009/0195081 A1 | 8/2009 | Quardt et al. |
| 2010/0208501 A1 | 8/2010 | Matan et al. |
| 2011/0006232 A1 | 1/2011 | Fahrenbruch et al. |
| 2011/0084553 A1 | 4/2011 | Adest et al. |
| 2012/0175964 A1 | 7/2012 | Yoscovich et al. |
| 2013/0194706 A1* | 8/2013 | Har-Shai ................ H02H 3/16 361/42 |
| 2014/0306541 A1 | 10/2014 | Harrison et al. |
| 2015/0381063 A1 | 12/2015 | Takahara et al. |
| 2017/0018967 A1 | 1/2017 | Berkhout et al. |
| 2017/0222542 A1 | 8/2017 | Adest et al. |
| 2017/0310235 A1* | 10/2017 | Sakakibara ........... H02M 1/088 |
| 2018/0138827 A1 | 5/2018 | Goto |

OTHER PUBLICATIONS

Pathirana, Walive Pathiranage Manula Randhika, "Low Voltage Integrated Charge Pump Circuits for Energy Harvesting Applications," 143 pages, Jul. 2014.

Cheng, Po-Hung et al., "0.18-V Input Charge Pump with Forward Body Biasing in Startup Circuit using 65 nm CMOS," IEEE, 5 pages, 2010.

Sep. 5, 2009—Fuzzy Logic Control of Stand-Alone Photovoltaic System with Battery Storage—EP 18164697.7.

Aug. 8, 2018—European Search Report for EP 18164697.7.

Aug. 5, 2020—EP Office Action—18164697.7.

* cited by examiner

BYPASS CIRCUIT AND METHOD TO BYPASS POWER MODULES IN POWER SYSTEM

RELATED APPLICATIONS

This application is a continuation in part of patent application Ser. No. 15/924,564, filed Mar. 19, 2018 and entitled "Bypass Circuit and Method to Bypass Power Modules in Power System", which claims priority to provisional application Ser. No. 62/478,366, filed Mar. 29, 2017, entitled "Bypass Circuit", and to provisional application Ser. No. 62/547,221, filed Aug. 18, 2017, entitled "Bypass of a Photovoltaic Module", the entire contents of which are incorporated herein by reference.

BACKGROUND

Power systems may have multiple power generators coupled to power devices. Power systems may be configured to control the power harvesting and extracting from the power generators, and in some embodiments, bypass one or more power generators and/or power devices. In some scenarios, the power system may operate more efficiently by bypassing one or more power devices. In some scenarios, one or more power devices may experience potentially unsafe conditions, such as over-heating or over-voltage. Safety regulations may require to disconnect, or bypass unsafe parts of the system. Safety regulations may require to lowering the voltage or heat of a power system or power device or to distance and/or electrically separate a high voltage point from a system power device. One way to lower the voltage or to distance and/or separate the high voltage point from the system power device may be to bypass a power device.

Also, bypass circuits, such as bypass diodes or freewheeling diodes, may be wired in parallel across the outputs of intercoupled power sources such as photovoltaic (PV) panels, batteries or generators, to provide a current path around them in the event that a power source becomes faulty by failing to provide power on its output. For example, the use of bypass circuits with regard to intercoupled PV panels, may allow a series string of coupled PV cells, PV panels and/or a series string of serially connected power devices outputs to continue supplying power to a load at a reduced voltage rather than no power at all, since the use of bypass circuits may allow continued current draw around the output of a faulty PV panel output and/or power device. Certain bypass circuits may incur significant losses (e.g., due to a substantial voltage drop across a conducting bypass circuit). There is a need for efficient bypass circuits that may allow bypassing power sources and/or other circuit elements without incurring significant losses.

SUMMARY

The following summary is a short summary of some of the inventive concepts for illustrative purposes only, and is not intended to limit or constrain the inventions and examples in the detailed description. One skilled in the art will recognize other novel combinations and features from the detailed description.

Illustrative embodiments disclosed herein may be with respect to power sources in a power system and may consider the interconnection of various groups of power sources. Each group of power sources may contain different types of power derived from both renewable energy sources such as provided from sunlight, wind or wave power, and non-renewable energy sources such as fuel used to drive turbines or generators, for example. Some illustrative embodiments may consider the connection of DC sources to a load via multiple power modules.

Illustrative embodiments disclosed herein may include a power system utilized to supply power to a load and/or a storage device. The power system may include various inter connections of groups of direct current (DC) power sources that also may be connected in various series, parallel, series parallel and parallel series combinations, for example. More specifically, illustrative embodiments disclosed herein include a power system that comprises a plurality of power sources connected in a series string, wherein the series string is connected across a power device to provide a voltage of the series string to the power device. The power system includes a plurality of safe voltage units each including a respective plurality of safety switches connectable across each one of the power sources and a plurality of sensors connectable to each one of the power sources. The sensors are configured to sense a plurality of parameters of the power sources. Each of the safe voltage units are configured to monitor for a signal output from the power device. The power system is controllable such that at least one of: a) detection of the signal by the safe voltage units within a predetermined time period, and b) an operating criteria determined based on the parameters sensed, causes each of the safety switches to be OFF in a normal mode of operation of the power system. The power system is controllable such that, when at least one of the safe voltage units does not detect the signal within the predetermined time period, the power system enters into a safety mode of operation from the normal mode of operation. The power system is controllable such that, upon entry of the power system into the safety mode of operation, the safety switches are caused to be ON to ensure a voltage level at each point in the series string to be at or below a predetermined voltage level, thereby reducing the level of the voltage of the series string to beat or below the predetermined voltage level.

According to some aspects of the power system, the power sources comprise batteries, wherein power from the power device is applied to the series string to charge the batteries in the normal mode of operation, wherein at least one of the receiving of the signal and operating criteria applied to the parameters sensed enables each of the safety switches to be OFF or ON responsive to the normal mode of operation.

According to some aspects of the power system, the power sources comprise batteries, wherein power from the batteries is provided from the series string to the power device to thereby discharge the batteries in the normal mode of operation, wherein at least one of the receiving of the signal and operating criteria applied to the parameters sensed, enables each of the safety switches to be OFF or ON, in the normal mode of operation of the power system.

According to some aspect of the power system, the power sources comprise photovoltaic panels, wherein power from the photovoltaic panels is provided from the series string to the power device in the normal mode of operation, wherein at least one of the receiving of the signal and operating criteria applied to the parameters sensed, enables each of the respective safety switches to be OFF when the photovoltaic panels are unshaded or ON when photovoltaic panels are shaded, in the normal mode of operation.

According to some aspects of the power system, the voltage of the series string is less than an open circuit voltage of the power sources.

According to some aspects of the power system, an operating power is provided to the safety switches to cause the safety switches to be ON or OFF in the normal mode of operation of the power system, and wherein operating power of the safe voltage units are supplied from at least one of the power sources and an auxiliary source of power independent of the power sources.

According to some aspects of the power system the operating criteria in the normal mode is selected from the group of criteria comprising: the voltage levels of the power sources, polarities of the power sources relative to each other, current level in the series string, the direction of the current in the series string or the voltage level of the series string.

According to some aspects of the power system, the power system enters into the safety mode of operation from the normal mode of operation due to at least one of: a disconnection in the series string, a disconnection between the series string and the power device, an outage of a grid connected to the power device, a leakage current, a malfunction of the power device, a trip of a circuit breaker or a shutdown of power device.

According to some aspects of the power system, the voltage of the series string is the sum of each of the voltages of the power sources.

According to some aspects of the power system, the power system further includes a load connected to the power device, wherein the load [is selected from the group of loads comprising: an AC grid, a DC grid, a transformer, a DC to AC inverter, a DC to DC converter, or an AC to DC rectifier.

Illustrative embodiments disclosed herein include a method for a power system having a series string of a plurality of power sources connected across a power device, in which the method includes connecting a plurality of safe voltage units including a plurality of safety switches connected respectively across each of the power sources. The method also includes monitoring an operating power applied to the safety switches. The method further includes sensing a plurality of parameters of the power sources. The method still further includes monitoring, by the safe voltage units, for a signal transmitted from the power device. The method also includes activating each of the safety switches to be OFF responsive to detecting the signal within a predetermined time period and at least one of the operating power and a sensing being associated with a normal mode of operation. The method further includes upon not detecting the signal from the power device within the predetermined time period, or based on the operating power applied to the safety switches being associated with an abnormal mode of operation, entering a safe mode of operation of the power system by reducing the voltages of each of the power sources to a voltage level less than a predetermined voltage level by activating the safety switches to be ON.

According to some aspects of the method, the activating comprises: turning at least one of the safety switches from OFF to ON responsive to the monitoring, wherein the monitoring monitors for a reverse polarity of a respective power source relative to the other polarities of the other power sources.

According to some aspects of the method, the reducing ensures a safe voltage level at each point in the series string of power sources.

According to some aspects of the method, a lowering of a voltage of the series string is achieved by activating at least one of the safety switches to be ON, thereby reducing the voltage of the string to a safe level of voltage in the safe mode of operation, wherein in the safe mode of operation, a voltage of the series string is less than an open circuit voltage of each of the power sources, and wherein the operating power is selected from the group comprising: the voltage levels of the power sources and the polarities of the power sources relative to each other, the current level, and the direction of the current in the series string or the voltage level of the series string.

According to some aspects of the method, the sensing includes sensing at least one of: a disconnection in the series string, and a disconnection between the series string and the power device.

As noted above, this Summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

By way of introduction, features of one or more embodiments may be directed to a power system and bypass circuits that may be utilized, for example, on power module outputs in a series connection of the power module outputs. Each power module may have inputs coupled to one or more direct current (DC) power sources. The series connection may be coupled across a load. Possible features of bypass circuits disclosed herein may include continuous bypass operation to provide a potential bypass of serially coupled power module outputs and/or power source outputs. In some embodiments, the bypass circuits may provide a bypass path during a low level of power production of an associated DC power source. In some embodiments, the bypass circuits may provide a bypass path when low power may be being produced on the output of at least one of the power modules compared to other power module outputs. In some embodiments, the bypass circuits may utilize a switch, and may have low power loss compared to the use of other passive or active bypass devices, for both high and low current flow through a series connection of power modules and/or power sources. Illustrative bypass circuits may include additional circuitry that may be adapted to provide or increase a bias voltage to the switch. The bias voltage may enable operation of the switch below minimal operating parameters normally provided by a series connection of the power modules and/or power sources outputs for the switch.

The term "multiple" as used here in the detailed description indicates the property of having or involving several parts, elements, or members. The claim term "a plurality of" as used herein in the claims section finds support in the description with use of the term "multiple" and/or other plural forms. Other plural forms may include for example regular nouns that form their plurals by adding either the letter 's' or 'es' so that the plural of converter is converters or the plural of switch is switches for example.

The claim terms "comprise", "comprises" and/or "comprising" as used herein in the claims section finds support in the description with use of the terms "include", "includes" and/or "including".

Figure 1A:
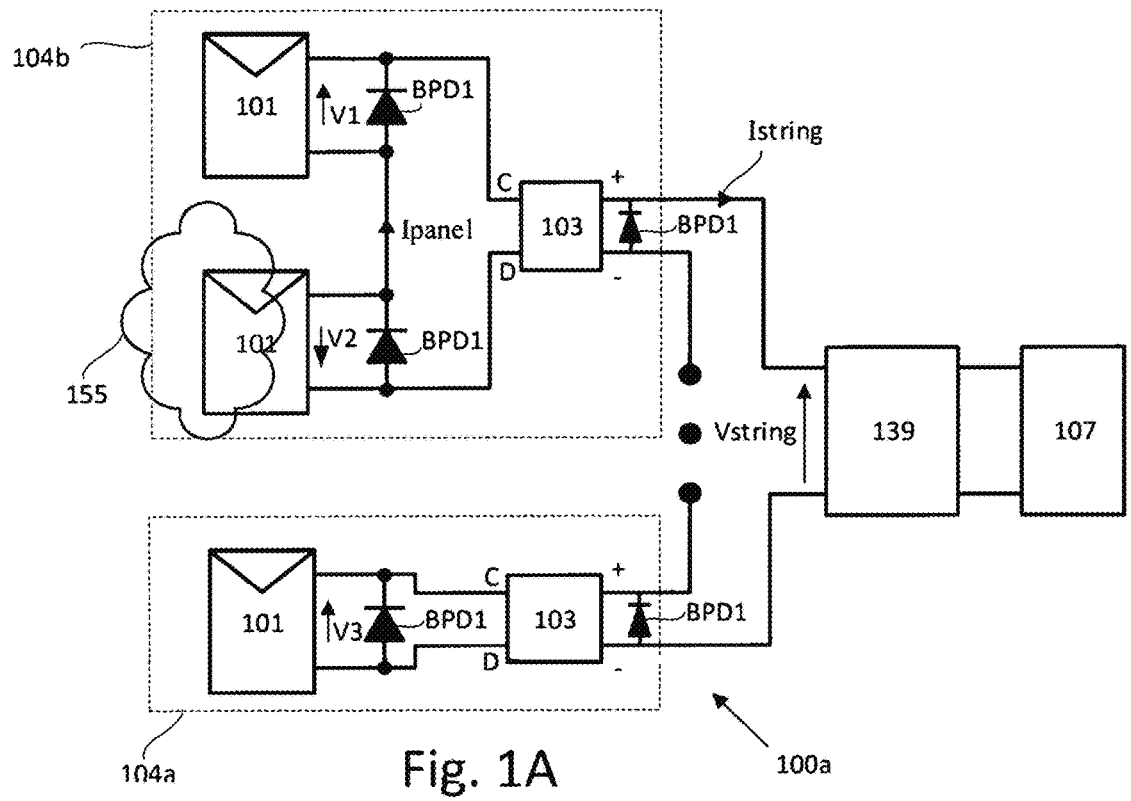
FIG. 1A shows a power system, according to one or more illustrative embodiments.

Reference is made to FIG. 1A, which shows a power system 100a, according to illustrative embodiments. Connection configuration 104a includes power source 101 with direct current (DC) output terminals coupled to input terminals of power module 103. Connection configuration 104b includes two power sources 101 coupled in a series connection, with direct current (DC) output terminals of the series connection coupled to the input terminals of power module 103. The outputs of power modules 103 may be coupled in series to form a series coupled string of power module 103 outputs. The series coupled string of power module 103 outputs have a total voltage output Vstring that may be coupled across the input of system power device 139. Power modules 103 may be a direct current (DC) to DC converter. Alternatively, total voltage output Vstring may be coupled across load 107. The outputs of power modules 103 may be coupled in a series string to which more power modules 103 may be added in order to provide the required input voltage (Vstring) to system power device 139. System power device 139 may be, for example, a direct current (DC) to DC converter or may be DC to alternating current (AC) inverter supplying power to load 107. In some embodiments, system power device 139 may be a combiner box for combining multiple strings of power sources, a safety device (e.g., a ground fault detector and/or or safety switch) and/or a monitoring device configured to measure, monitor and/or report operational parameters associated with power system 100*a*. Load 107 may be, for example, a battery, an alternating current (AC) grid, a DC grid, or a DC to AC inverter.

A positive (+) output terminal of power module 103 in connection configuration 104*a* may be coupled to a negative (−) output terminal of another power module 103 or to a negative (−) output terminal of power module 103 in connection configuration 104*b*. Bypass diodes BPD1 may be provided with cathodes coupled to respective positive (+) output terminals of power sources 101 and anodes coupled to respective negative (−) output terminals of power sources 101. Bypass diodes BPD1 may be similarly coupled across the outputs of power modules 103. In connection configuration 104*b* two power sources 101 including their respective bypass diodes BPD1 are connected in series to provide a voltage (V1+V2). The voltage (V1+V2) may then be applied to the input of a power module 103 at terminals C and D of the power module 103. In connection configuration 104*a*, a single power source 101 with bypass diode BPD1 provides a voltage V3. The voltage V3 is applied to the input of a power module 103 at terminals C and D of power module 103. Multiple outputs of connection configurations 104*a*/104*b* may be wired in series to give a string voltage (Vstring) that may be applied to the input of system power device 139.

In the descriptions that follow, power sources 101 may be a photovoltaic (PV) generator, for example, a PV cell, a series string of PV cells, a parallel connection of serially coupled PV strings of PV cells, a photovoltaic or solar panel, DC generator, a battery, or a fuel cell. In some embodiments, for example where power source 101 includes multiple serially coupled power sources such as PV substrings or PV cells, bypass diodes BPD1 may be replaced or complemented by additional diodes coupled in parallel to each serially coupled power source 101. DC sources of power for power sources 101 may also be derived from rectified or converted sources of alternating current (AC) provided from a switched mode power supply, dynamo or alternator, for example.

Operation of bypass diodes BPD1 may be illustrated, by way of example, where power sources 101 may be photovoltaic panels. A power source in connection configuration 104*b* is shown shaded with a shade 155. As such, the voltage V2 of the shaded power source 101 may have opposite polarity with respect to the other unshaded panels with respect to their voltages V1 and V3. The opposite polarity may be as a result of restricted current flow of Ipanel so that the non-shaded panel may attempt to push the current through power module 103. The attempt at pushing current flow may cause bypass diodes BPD1 to become forward biased. A function of bypass diodes BPD1 may therefore provide the function of bypassing a shaded panel and/or non-functioning power module 103 output in a series string of serially connected power module outputs 103. Without bypass diodes BPD1 on the outputs of power sources 101, voltage V2 may oppose the flow of current Ipanel so that current Ipanel may be substantially zero. Substantially zero current Ipanel means that power module 103 in connection configuration 104*b* may be inoperative and therefore, both current Istring and voltage Vstring to the input of system power device 139 may be substantially zero.

However, with bypass diodes BPD1, the opposite polarity of V2 may be applied across the bypass diode BPD1 which forward biases bypass diode BPD1. Voltages V1 and V3 may reverse bias the respective bypass diodes BPD1. The forward bias of V2 applied bypass diode BPD1 causes current Ipanel to flow from anode to cathode of bypass diode BPD1 at the output of the shaded power source 101. Therefore, bypass diodes BPD1 provide a potential parallel path of current conduction around a panel or power source 101 that is not working or is shaded with shade 155. In general, a working panel applies a reverse bias voltage across bypass diodes, and a non-working or shaded panel applies a forward bias voltage across bypass diodes BPD1.

Bypass diodes BPD1 may be coupled across the output of power modules 103. If a power module 103 becomes inactive in a series string of power module outputs, current (Istring) attempting to pass through the inactive power module 103 may be offered an alternative, parallel path. The alternative, parallel path may be around the output of the inactive power module 103 via bypass diode BPD1. Rather than a forcing of current (Istring) through an inactive power module 103 output, the flow of current (Istring) may cause bypass diode BPD1 to become forward biased. The forward biasing of bypass diode BPD1 may cause current Istring to flow from anode to cathode of bypass diode BPD1. Therefore, bypass diodes BPD1 may provide a potential parallel path of current conduction around a nonfunctioning power module 103 output in a series string of coupled power module 103 outputs.

Figure 1B:
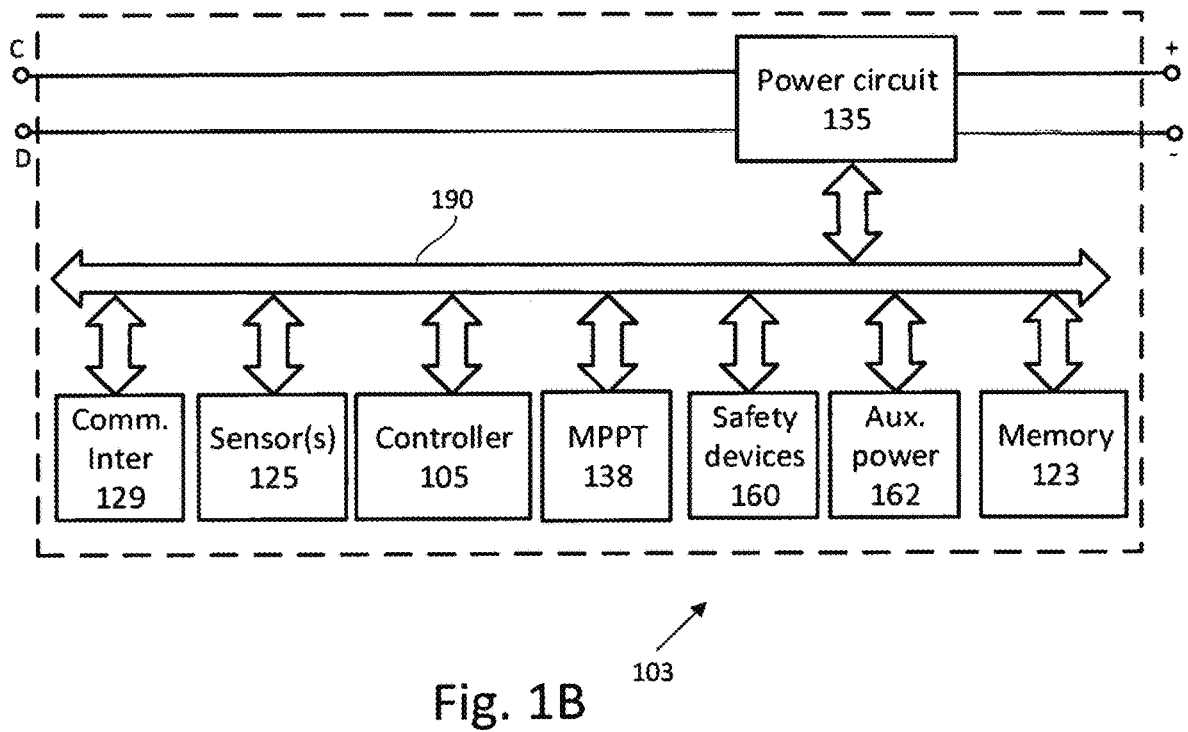
FIG. 1B illustrates circuitry that may be found in a power device such as a power module, according to one or more illustrative embodiments.

Reference is now made to FIG. 1B, which illustrates circuitry that may be found in a power device such as power module 103, according to illustrative embodiments. Power module 103 may be similar to or the same as power module 103 shown in FIG. 1A. In some embodiments, power module 103 may include power circuit 135. Power circuit 135 may include a direct current-direct current (DC/DC) converter such as a Buck, Boost, Buck/Boost, Buck+Boost, Cuk, Flyback and/or forward converter, or a charge pump. In some embodiments, power circuit 135 may include a direct current—alternating current (DC/AC) converter (also known as an inverter), such as a micro-inverter. Power circuit 135 may have two input terminals and two output terminals, which may be the same as the input terminals and output terminals of power module 103. In some embodiments, power module 103 may include Maximum Power Point Tracking (MPPT) circuit 138, configured to extract increased power from a power source the power device may be coupled to. In some embodiments, power circuit 135 may include MPPT functionality. In some embodiments, MPPT circuit 138 may implement impedance matching algorithms to extract increased power from a power source the power device may be coupled to power module 103 may further include controller 105 such as a microprocessor, Digital Signal Processor (DSP), Application-Specific Integrated Circuit (ASIC) and/or a Field Programmable Gate Array (FPGA).

Still referring to FIG. 1B, controller 105 may control and/or communicate with other elements of power module 103 over common bus 190. In some embodiments, power module 103 may include circuitry and/or sensors/sensor interfaces 125 configured to measure parameters directly or receive measured parameters from coupled sensors and/or sensor interfaces 125 configured to measure parameters on or near the power source, such as the voltage and/or current output by the power source and/or the power output by the power source. In some embodiments, the power source may be a photovoltaic (PV) generator including PV cells, and a sensor or sensor interface may directly measure or receive measurements of the irradiance received by the PV cells, and/or the temperature on or near the PV generator.

Still referring to FIG. 1B, in some embodiments, power module 103 may include communication interface 129, configured to transmit and/or receive data and/or commands from other devices. Communication interface 129 may communicate using Power Line Communication (PLC) technology, acoustic communications technology, or additional technologies such as ZigBee™, Wi-Fi, Bluetooth™, cellular communication or other wireless methods. In some embodiments, power module 103 may include memory 123, for logging measurements taken by sensor(s)/sensor interfaces 125 to store code, operational protocols or other operating information. Memory 123 may be flash, Electrically Erasable Programmable Read-Only Memory (EEPROM), Random Access Memory (RAM), Solid State Devices (SSD) or other types of appropriate memory devices.

Still referring to FIG. 1B, in some embodiments, power module 103 may include safety devices 160 (e.g., fuses, circuit breakers and Residual Current Detectors). Safety devices 160 may be passive or active. For example, safety devices 160 may include one or more passive fuses disposed within power module 103 where the element of the fuse may be designed to melt and disintegrate when excess current above the rating of the fuse flows through it, to thereby disconnect part of power module 103 so as to avoid damage. In some embodiments, safety devices 160 may include active disconnect switches, configured to receive commands from a controller (e.g., controller 105, or an external controller) to short-circuit and/or disconnect portions of power module 103, or configured to short-circuit and/or disconnect portions of power module 103 in response to a measurement measured by a sensor (e.g., a measurement measured or obtained by sensors/sensor interfaces 125). In some embodiments, power module 103 may include auxiliary power circuit 162, configured to receive power from a power source coupled to power module 103, and output power suitable for operating other circuitry components (e.g., controller 105, communication interface 129, etc.). Communication, electrical coupling and/or data-sharing between the various components of power module 103 may be carried out over common bus 190.

Figure 1C:
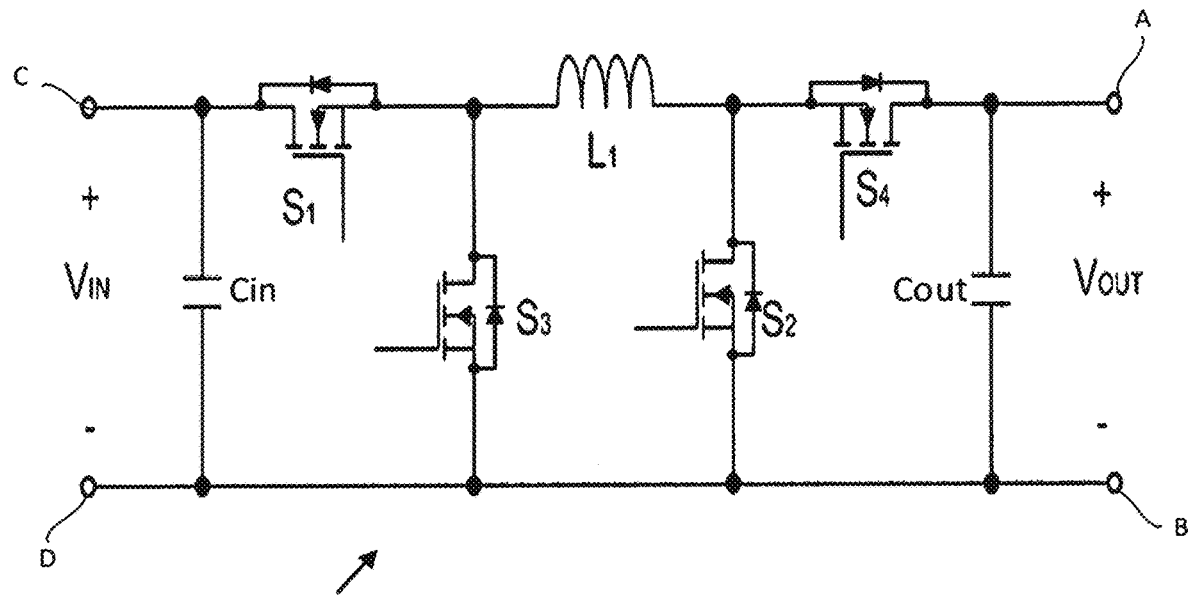
FIG. 1C shows a buck+boost circuit implementation for a power converter, according to one or more illustrative embodiments.

Reference is made to FIG. 1C, which shows a buck+boost circuit implementation for power circuit 135, according to one or more illustrative embodiments. The buck+boost circuit implementation for power circuit 135 utilizes metal oxide semiconductor field effect transistors (MOSFETs) for switches S1, S2, S3 and S4. The sources of switches S1, S2, S3 and S4 are referred to as first terminals, the drains of S1, S2, S3 and S4 are referred to second terminals, and the gates of S1, S2, S3 and S4 are referred to as third terminals. Capacitor Cin may be coupled in parallel across the respective positive (+) and negative (−) input terminals C and D of the buck+boost circuit, where the voltage may be indicated as VIN. Capacitor Cout may be coupled in parallel across the respective positive (+) and negative (−) output terminals A and B of the buck+boost circuit, where the voltage may be indicated as VOUT. First terminals of switches S3 and S2 may couple to the common negative (−) output and input terminals of the buck+boost circuit. A second terminal of switch S1 may couple to the positive (+) input terminal and a first terminal of switch S1 may couple to a second terminal of switch S3. A second terminal of switch S4 may couple to the positive (+) output terminal and a first terminal of switch S4 may couple to the second terminals of switch S2. Inductor L1 may couple respectively between the second terminals of switches S3 and S4. Third terminals of switches S1, S2, S3 and S4 may be operatively coupled to controller 105 (not shown in FIG. 1C).

Switches S1, S2, S3 and S4 may be implemented using semiconductor devices, for example, metal oxide semiconductor field effect transistors (MOSFETs), insulated gate bipolar transistors (IGBTs), bipolar junction transistors (BJTs), Darlington transistor, diode, silicon controlled rectifier (SCR), Diac, Triac or other semiconductor switches known in the art. By way of example, switches S1, S2, S3 and S4 may be implemented by use of bipolar junction transistors, where the collectors, emitters and bases may refer to first terminals, second terminals and third terminals described and defined above. Switches S1, S2, S3 and S4 may be implemented using mechanical switch contacts such as hand operated switches or electro-mechanically operated switches such as relays, for example. Similarly, implementation for power module 103 may include, for example, a buck circuit, a boost circuit, a buck/boost circuit, a Flyback circuit, a Forward circuit, a charge pump, a Cuk converter or any other circuit that may be utilized to convert power on the input of power module 103 to the output of power module 103.

Power module 103 may include or be operatively attached to a maximum power point tracking (MPPT) circuit (MPPT 138 for example). The MPPT circuit may also be operatively coupled to controller 105 or another controller 105 included in power module 103 that may be designated as a primary controller. A primary controller in power module 103 may communicatively control one or more other power modules 103 that may include controllers known as secondary controllers. Once a primary/secondary relationship is established, a direction of control may be from the primary controller to the secondary controllers. The MPPT circuit under control of a primary and/or central controller 105 may be utilized to increase power extraction from power sources 101 and/or to control voltage and/or current supplied to load 107.

Figure 1D:
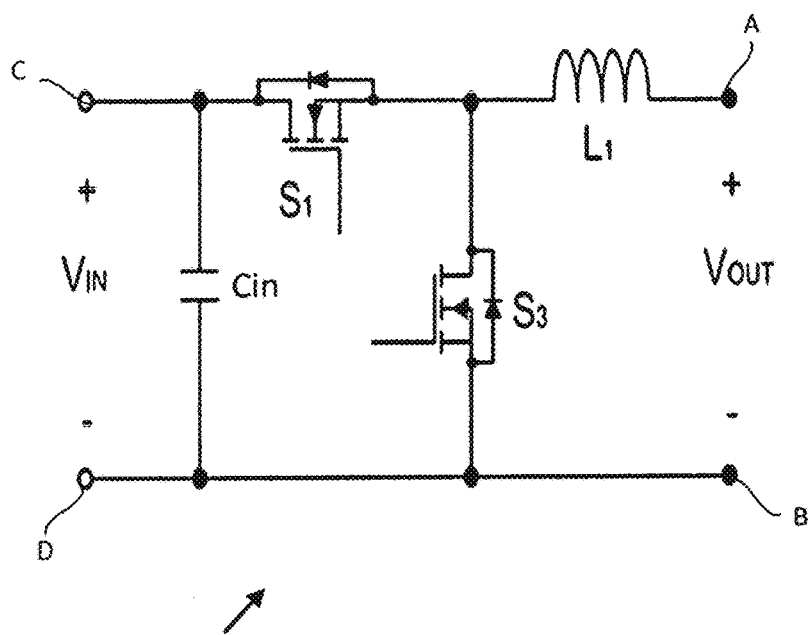
FIG. 1D shows a buck circuit implementation for a power converter, according to one or more illustrative embodiments.

Reference is made to FIG. 1D, which shows a buck circuit implementation for power circuit 135, according to one or more illustrative embodiments. The buck circuit implementation for power circuit 135 utilizes metal oxide semiconductor field effect transistors (MOSFETs) for switches S1 and S3. The sources of switches S1 and S3 are referred to as first terminals, the drains of S1 and S3 are referred to second terminals, and the gates of S1 and S3 are referred to as third terminals. Capacitor Cin may be coupled in parallel across the respective positive (+) and negative (−) input terminals C and D of the buck circuit, where the voltage may be indicated as VIN. Output terminals A and B of the buck circuit may be indicated as having an output voltage VOUT. A first terminal of switch S3 may couple to the common negative (−) output and input terminals of the buck circuit. A second terminal of switch S1 may couple to the positive (+) input terminal, and a first terminal of switch S1 may couple to a second terminal of switch S3. Inductor L1 may couple respectively between the second terminal of switches S3 and terminal A. Third terminals of switches S1 and S3 may be operatively coupled to controller 105 (not shown in FIG. 1D).

Figure 1E:
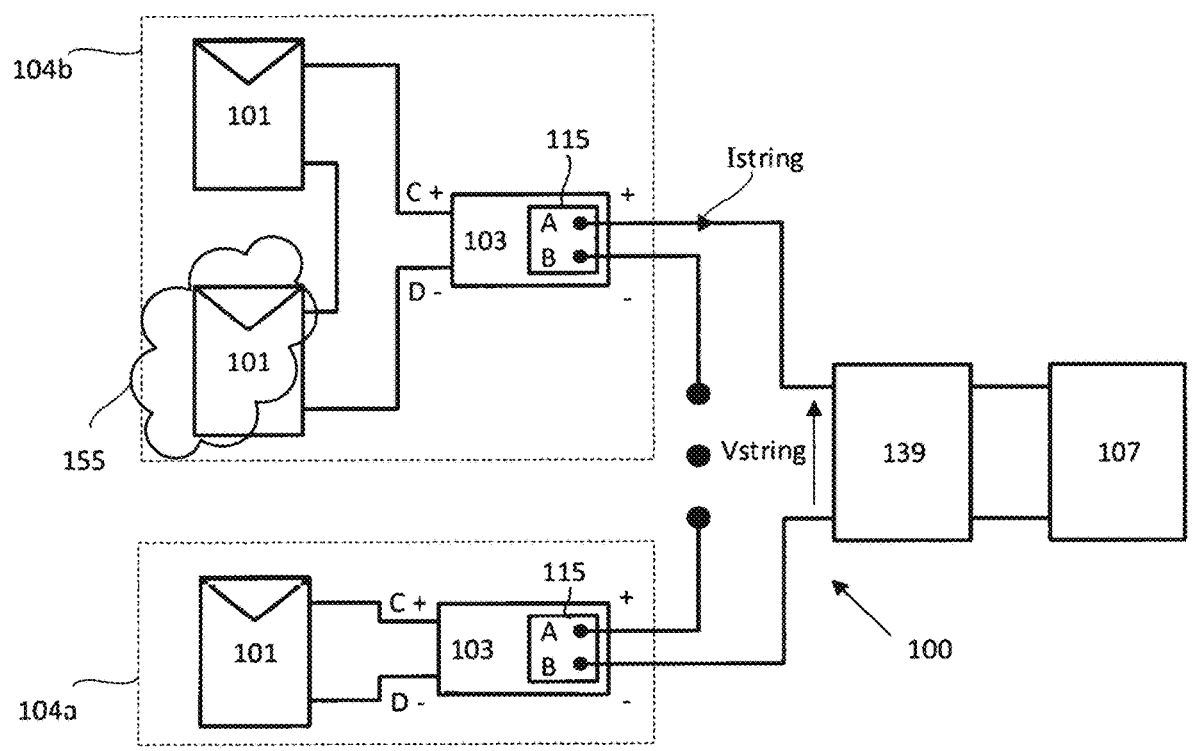
FIG. 1E shows a power system, according to one or more illustrative embodiments.

Reference is now made to FIG. 1E, which shows a power system 100, according to illustrative embodiments. Power harvesting system 100 may be similar to power harvesting system 100a but might not include bypass diodes BPD1. Instead of or in addition to bypass diodes BPD1, bypass circuits 115 having terminals A and B may couple across the output terminals of power modules 103. Bypass circuit 115 provides a switch between terminals A and B, so that when the switch is ON a substantially short circuit exists between terminals A and B, and when the switch is OFF a substantially open circuit exists between terminals A and B. Bypass circuits 115, in accordance with illustrative embodiments disclosed herein, may provide certain advantages when compared to passive bypass diodes (e.g. BPD1).

Figure 1F:
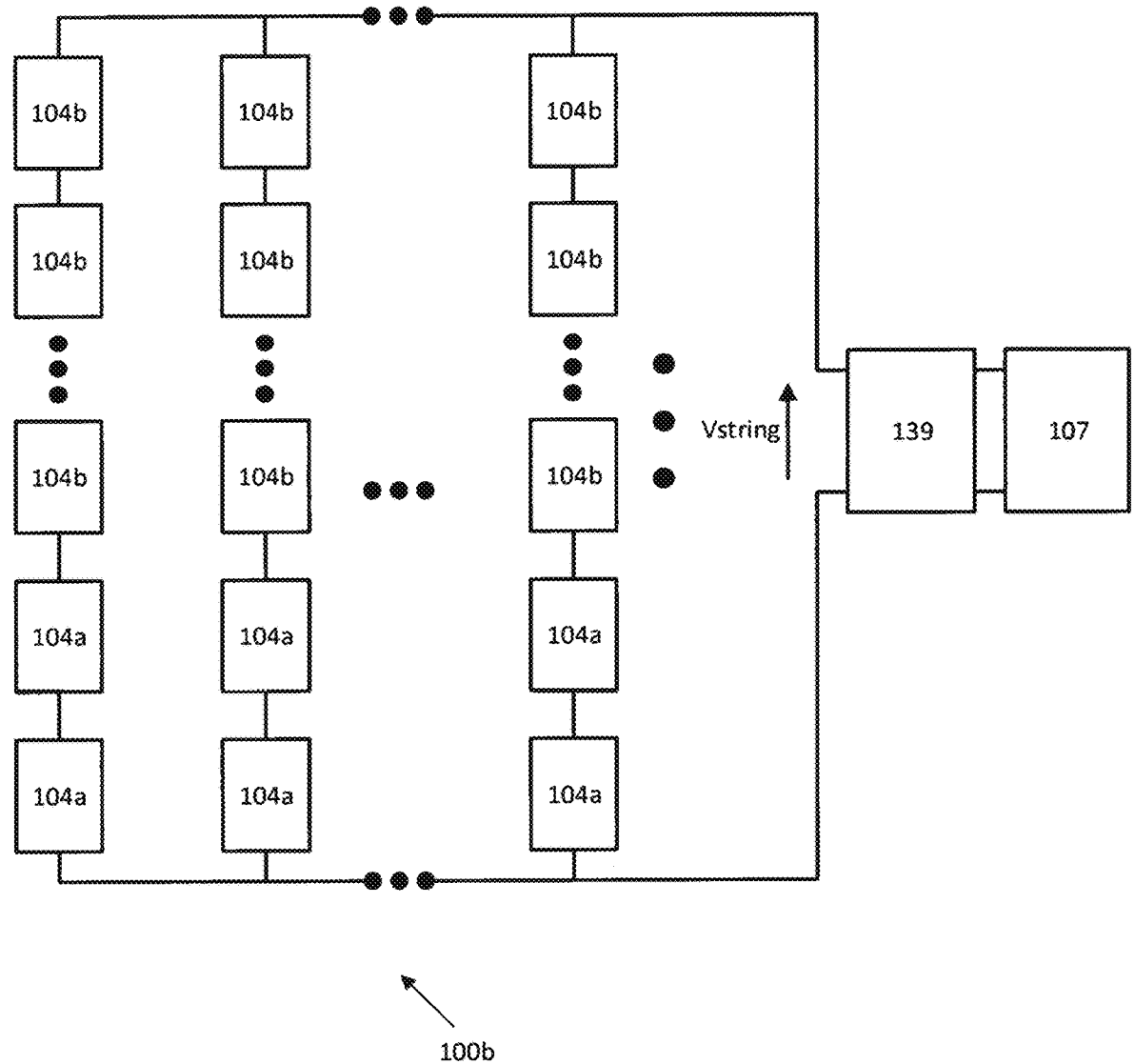
FIG. 1F shows a power system, according to one or more illustrative embodiments.

Reference is made to FIG. 1F, which shows a power system 100b, according to illustrative embodiments. Multiple strings of serially connected connection configurations 104a and 104b are shown in FIG. 1E. The strings are connected in parallel across the input of system power device 139, with voltage input to system power device 139 shown as Vstring. System power device 139 may be a direct current (DC) to DC converter or may be a DC to alternating current (AC) inverter supplying power to load 107. Power harvesting system 100b may be similar to power harvesting system 100 but might not include bypass diodes BPD1. Instead of or in addition to bypass diodes BPD1, bypass circuits 115 having terminals A and B may be implemented in connection configurations 104a and 104b as shown in FIG. 1E. In general, any number of connection combinations of multiple connection configurations 104a/104b may include DC power sources 101 of differing types so that one connection configuration has photovoltaic panels, for example, while another connection configuration has wind powered DC generators.

Figure 1G:
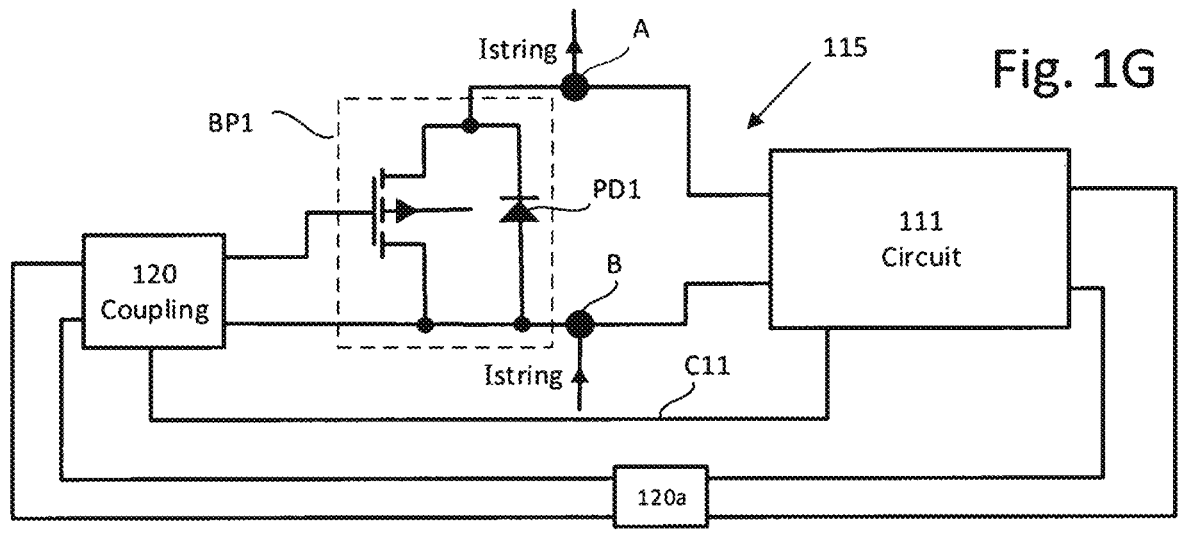
FIG. 1G is part block diagram, part schematic of a bypass circuit, according to one or more illustrative embodiments.

Reference is now made to FIG. 1G, which is part schematic, part block diagram of bypass circuit 115, according to illustrative embodiments. An output of a circuit 111 may couple to a coupling circuit 120 by coupling unit 120a. Coupling unit 120a may be a part of coupling circuit 120, a part of the output of circuit 111 and/or portions of both coupling circuit 120 and circuit 111. Coupling unit 120a may allow a coupling to provide a feedback path via a circuit between the output of circuit 111 and coupling circuit 120. The coupling may be a direct electrical connection and/or coupling circuitry between the output of circuit 111 and coupling circuit 120. The coupling may alternatively be a capacitive coupling between the output of circuit 111 and coupling circuit 120. The coupling may alternatively be an inductive coupling between the output of circuit 111 and coupling circuit 120. The inductive coupling may include a mutual inductive coupling between two inductors that may include a common direct electrical connection point shared between the two inductors. The inductive coupling may alternatively have two inductors that are both wound on a core. The core may allow a transformer coupling arrangement between the two inductors whereby a common direct electrical connection point is not shared between the two inductors.

The output of coupling circuit 120 may couple to the input of switch BP1. The output of coupling circuit 120 may be such that switch BP1 may be either ON or OFF. The poles of switch BP1 may couple to terminals A and B, which may also be coupled across the input of circuit 111. Terminals A and B may also couple across output terminals of a power module 103 (not explicitly shown). When switch BP1 is ON; the power module 103 might not be functioning and string current Istring may flow through switch BP1. When switch BP1 is OFF; the power module 103 may be functioning and string current Istring may flow through the output of the power module 103. Switch BP1 is shown as a MOSFET where a diode PD1 is coupled across the drain and source of the MOSFET. Diode PD1 may be an intrinsic part of the MOSFET as a result of a structure of the MOSFET. The structure of the MOSFET may have an intrinsic p-n junction (diode) coupled between the drain and source. The intrinsic p-n junction (diode) of a MOSFET may be referred to as a body diode or a parasitic diode. Other semiconductor devices may be used for switch BP1 which do not have an intrinsic p-n junction (diode) between terminals A and B, in which case a diode may be additionally coupled across terminals A and B. An additional switch wire C11 may connect between coupling circuit 120 and circuit 111.

Switch BP1 may implemented using the switches that may already exist in power circuit 135. With reference to FIG. 1C, which shows a buck+boost circuit for power circuit 135, BP1 may implemented with the use of switches S2 and S4 across nodes A and B. Similarly, with reference to FIG. 1D, which shows a buck circuit for power circuit 135, switch BP1 may implemented with the use of switch S3 across nodes A and B via inductor L1. In descriptions, which follow of the Figures, diodes shown coupled across a switch may be intrinsic to the switch or may be additionally coupled across the switch.

Figure 1H:
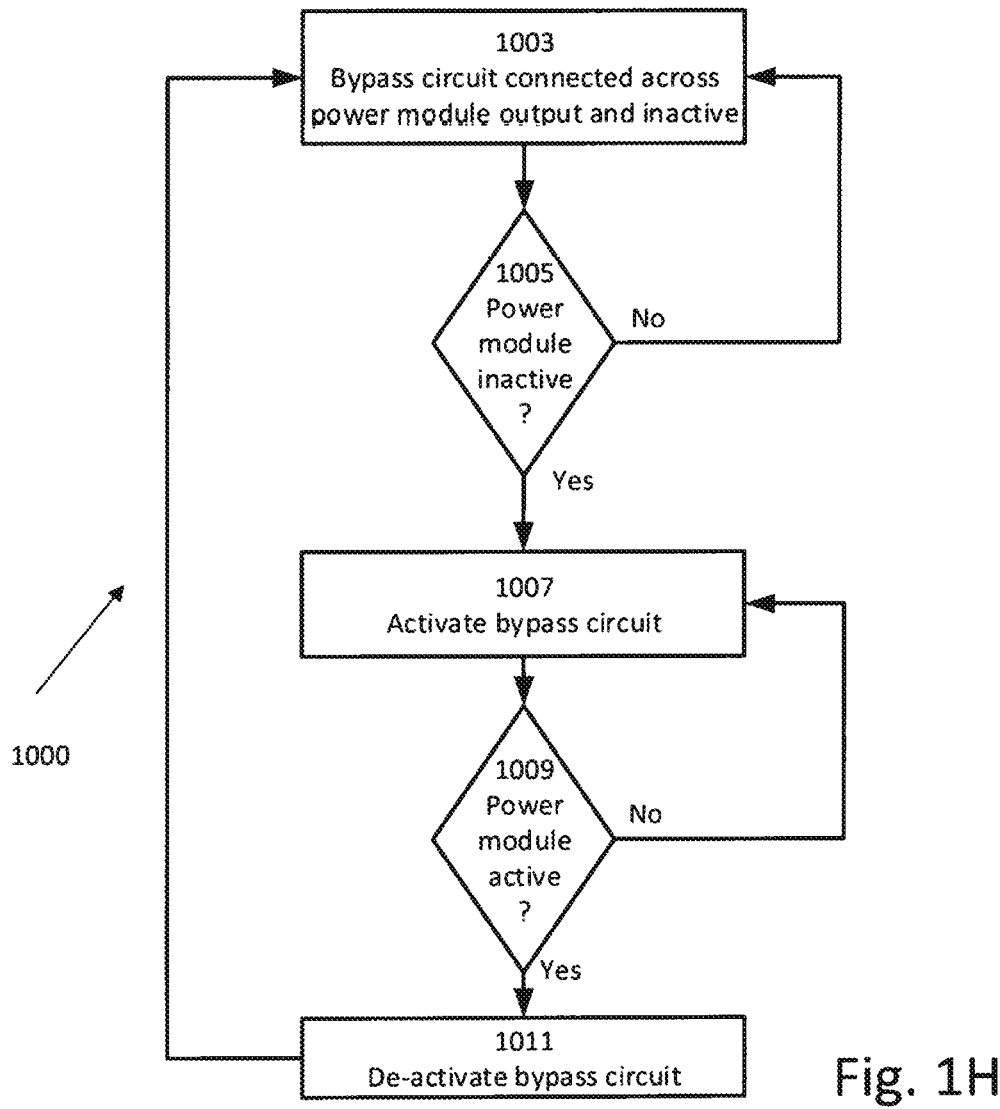
FIG. 1H shows a flowchart of a method, according to one or more illustrative embodiments.

Reference is now made again to FIG. 1G and to FIG. 1H, which shows a flow chart of a method 1000, according to illustrative embodiments. The flow chart of method 1000 is used to explain the operation of the part schematic, part block diagram of bypass circuit 115 shown in FIG. 1G. The flow chart of method 1000 is also used to describe the operation of interconnected analog circuits that include coupling circuit 120, switch BP1 and circuit 111 in bypass circuit 115 described in greater detail below. As such, steps in method 1000 and indeed in steps of the other methods described below might not preclude the use of digital methodologies such as use of a microprocessor or microcontroller and associated algorithm to sense and control the operation of a bypass switch that may include coupling to coupling circuit 120, switch BP1 and circuit 111 in bypass circuit 115. Steps in method 1000 and indeed in steps of the other methods described below might not preclude the use of any number of implementations that combines both analog and digital methodologies.

As such, steps of method 1000, methods described below and decision steps such as decision steps 1005 and 1009 in particular may be made by virtue of a configuration of the analog circuits used below to implement coupling circuit 120, switch BP1 and circuit 111 in bypass circuit 115. The configuration may include calculation and selection of component values, types of components and the interconnections of components as part of the circuit design of coupling circuit 120, switch BP1 and circuit 111 in bypass circuit 115. The configuration may be based therefore, on the normal operating parameters where power sources 101 and/or power modules 103 are functioning correctly or to accommodate non-normal operating parameters of power systems 100a/100 described above and in power systems described below. As such, the configuration with respect to the decision aspect of the decision steps described below may be responsive analog circuit wise to an event such as the breakdown or failure of a power module 103 and/or power source 101 so as to provide a bypass of the power module 103 and/or power source 101. In this regard, the configuration with respect to bypass circuit 115 and the other analog bypass circuit embodiments described below may be considered to be substantially activated and/or operated for most of the time such that the steps of method 1000 are performed responsive to the continuously changing operating parameters of power systems 100a/100. The continuously changing operating parameters of power systems 100a/100 for the bypass circuits 115 to be substantially activated most of the time may be where the power for the activation is provided from the string of serial connected power module 103 outputs, a module 103 and/or power source 101, a partial power from module 103 and/or power source 101 or power is supplied from an auxiliary power source (for example auxiliary power from auxiliary power circuit 162). As such, bypass circuit 115 and the other analog bypass circuit embodiments described below when considered as being substantially activated most of the time might not require sensors 125, controller 105 and associated algorithm to decide respectively in steps 1005/1007 to activate switch BP1 (ON) or to de-activate switch BP1 (OFF) in respective steps 1009/1011. A way therefore to enable a de-activation of bypass circuit 115 and the other analog bypass circuit embodiments described below from being substantially activated most of the time is for a controller to use driver circuitry 170 to apply a voltage to the gate of switch BP1 so that switch BP1 is OFF and/or de-activated thereby.

The configuration may also give the decision aspect of the decision steps described below so as to be responsive to an event such as a power module 103 and/or power source 101 reverting back to normal operation so as to remove a bypass of a power module 103 and/or power source 101.

The discussion that follows uses by way of non-limiting example, a power system such as power system 100 where power sources 101 are photovoltaic panels coupled to the inputs of power modules 103, and where the outputs of power modules 103 are coupled in series. The description that follows references power modules 103 but may equally apply to power sources 101. The configuration in this regard may take into account the voltages and currents present in the string of serially connected power module 103 outputs for example.

At step 1003, switch BP1 may be coupled across the outputs of a power module 103 where there may be a series string of power module 103 outputs. Provided the power modules 103 are functioning properly, switch BP1 is inactive (OFF). Alternatively, switch BP1 may also be coupled across the outputs of power sources 101.

At decision step 1005, a first bypass current conduction of diode PD1 may be an indication of power module 103 and/or power source 101 not functioning correctly. The indication according to the configuration may cause the subsequent activation of switch BP1 (step 1007) to be ON so that the output of a malfunctioning power module 103 is bypassed. Otherwise, switch BP1 remains OFF so that the bypass function of switch BP1 is inactive (step 1003).

A power module 103 not functioning correctly may be as a result of a panel becoming shaded or a component failure within power module 103 for example. As such, the flow of current (Istring) through an inactive power module 103 output may become restricted. As a result of restricted current flow, the voltage outputs of the other power modules 103 in the string may attempt to push the current through their outputs and through the inactive power module 103 output. The attempt at pushing current flow of current may be caused by an increase in voltage output of the other power modules 103, which may cause diode PD1 to become forward biased. Whereas when a normal operation of power module 103 exists, diode PD1 and the MOSFET of switch BP1 are reversed biased (the MOSFET is OFF). The forward biasing of diode PD1 may cause string current Istring to flow from anode to cathode of diode PD1 in the first bypass current conduction of diode PD1.

The first bypass current conduction of diode PD1 and forward voltage drop of diode PD1 is applied to the input of circuit 111, which may cause the oscillation of circuit 111. The output oscillations of circuit 111 may be fed back to the input of switch BP1 via coupling circuit 120. The output of coupling circuit 120 connects to the gate (g) of the MOSFET of switch BP1. The output of coupling circuit 120 applied to the gate of the MOSFET of switch BP1 may be sufficient to cause the MOSFET of switch BP1 to switch ON so that switch BP1 is activated at step 1007.

At decision step 1009, if inactive power module 103 remains inactive, then the MOSFET of switch BP1 remains ON so that switch BP1 remains activated at step 1007. However, when power module 103 starts to become active, both the MOSFET and diode PD1 of switch BP1 become reverse biased. Power module 103 may become active because a panel coupled to power module may become unshaded, for example. The reverse bias voltages of both the MOSFET and diode PD1 of switch BP1 applied to the input of circuit 111 at terminals A and B may cause the ceasing of the oscillations of circuit 111. The output oscillations of circuit 111 ceasing fed back to the input of switch BP1 via coupling circuit 120 may be sufficient to cause the MOSFET of switch BP1 to switch OFF, so that switch BP1 is de-activated at step 1011. The reduction of voltage applied to the gate of the MOSFET may cause the MOSFET to turn OFF. Alternatively, sensors 125 under control of controller 105 or some other controller may sense the reverse bias voltages of both the MOSFET and diode PD1 of switch BP1. As a result of the reverse biases being sensed, switch BP1 may be switched OFF and power from a driver circuitry may be allowed to be resupplied to the switches of power module 103 to allow power module 103 to function as normal. With the power modules 103 functioning normally, switch BP1 is now inactive (OFF) but still coupled at terminals A and B (step 1003).

Figure 1I:
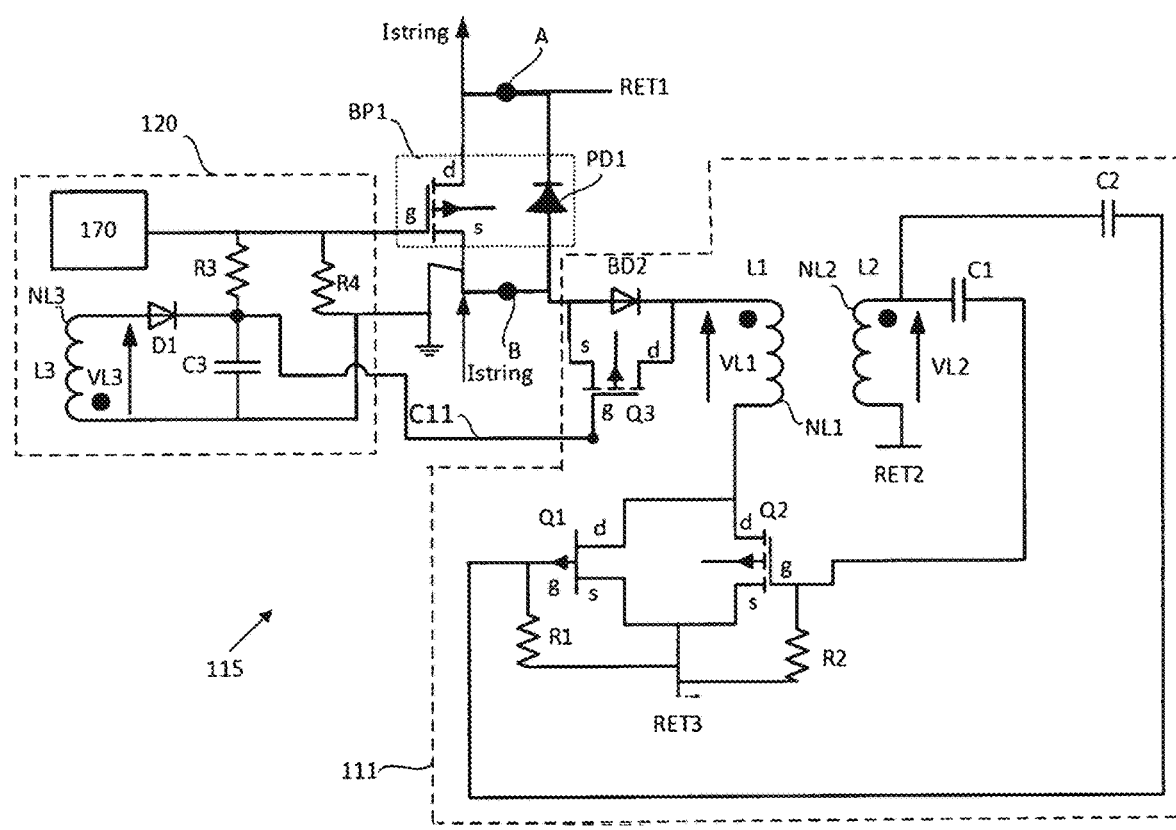
FIG. 1I shows further details of a coupling circuit, a bypass switch and a circuit in a bypass circuit, according to one or more illustrative embodiments.

Reference is now made to FIG. 1I, which shows further details of coupling circuit 120, switch BP1 and circuit 111 in bypass circuit 115, according to illustrative embodiments. Coupling circuit 120 may include biasing and driver circuitry 170 that has an output coupled to a first end of resistor R3 and a first end of resistor R4. The second end of resistor R3 may couple to the cathode of diode D1, a first end of capacitor C3 and the gate (g) of switch Q3 via switch wire C11. A second end of resistor R4 may couple to a second end of capacitor C3 and terminal B. The second end of capacitor C3 may couple to a first end of inductor L3 and a second end of inductor L3 may couple to the anode of diode D1. The gate (g) of switch BP1 may couple to the first ends of resistors R3 and R4. The drain (d) of switch BP1 may couple to the cathode of diode PD1 at terminal B to give a return connection RET1. The anode of diode PD1 may couple to the source (s) of switch BP1, the anode of diode BD2 that belongs to switch Q3 and the source (s) of switch Q3. The drain (d) of switch Q3 may couple the cathode of diode BD2 and a first end of inductor L1 of circuit 111. Switch BP1 may be a metal oxide semiconductor field effect transistor (MOSFET), which may include diode PD1 or which might not include diode. Similarly switches Q1, Q2 and Q3 may be MOSFETs, which include a diode like diode BD2 or which might not include a diode.

In circuit 111, a second end of inductor L1 may couple to the drains (d) of switches Q1 and Q2. The sources (s) of Q1 and Q2 may be coupled together to give a return connection RET2. A first end of resistor R1 may couple between the gate of switch Q1 and the source (s) of switch Q1. A first end of resistor R2 may couple between the gate of switch Q2 and the source (s) of switch Q2. The gate (g) of switch Q1 may couple to a first end of capacitor C2. A second end of capacitor C2 may couple to a first end of inductor L2 and a first end of capacitor C1. A second end of inductor L2 may provide return connection RET3. A second end of capacitor C1 may couple to the gate of switch Q2. Return connections RET1, RET2 and RET3 may couple together to form a return path that may be separate to terminal B at the source(s) of switch BP1. Separation between the return path and terminal B in bypass circuit 115, along with the integration of bypass circuit 115 across the output of a power module 103, may be achieved by disposing switch Q3 and diode BD2 between terminal B and inductor L1. Switches BP1, Q2 and Q3 may be metal oxide semiconductor field effect transistors (MOSFETs) and switch Q1 may be a junction field effect transistor (JFET).

In some embodiments, inductors L1, L2 and L3 may be mutually coupled on the same magnetic core. In effect, the coupling between inductor L1 to L2 and then inductor L2 to L3 provide a possible function of coupling unit 120a shown in FIG. 1G, which allows a coupling between the output of circuit 111 and coupling circuit 120. Therefore, the output of circuit 111 across inductor L1 may be coupled back to the input of coupling circuit 120 via the mutual inductance between inductor L1 and inductor L3 and also coupled to inductor L2 via the mutual coupling between inductor L1 and inductor L2. The mutual inductance between inductor L1 and inductor L2 and voltages induced into inductor L2 drive the gates (g) of switches Q1 and Q2 via the coupling of respective capacitors C2 and C1. The mutual coupling between inductor L1 and inductors L2 and L3 may be such that inductors L2 and L3 have a greater number of turns across the common magnetic core than inductor L1 does, so the voltages induced into inductors L2 and L3 are greater by virtue of the transformer equations:

$$\frac{VL1}{VL2} = \frac{NL1}{NL2}$$

and $$\frac{VL1}{VL3} = \frac{NL1}{NL3}$$

Where VL1, VL2 and VL3 are the respective voltages of inductors L1, L2 and L3, where NL1, NL2 and NL3 are the respective number of turns of inductors L1, L2 and L3.

The greater voltages induced into inductors L2 and L3 by virtue of the greater number of turns NL2 and NL3 may allow for operation of switches BP1, Q1, Q2 and Q3, whereas without the greater voltages induced, switches BP1, Q1, Q2 and Q3 might not be able to operate otherwise.

Inductor L2 and capacitors C1 and C2 in circuit 111 function as a Colpitts oscillator.

The frequency of oscillation given by:

$$f_o = \frac{1}{2\pi\sqrt{L_2\left(\frac{C_1 C_2}{C_1 + C_2}\right)}}$$

Inductors L1, L2, L3, capacitors C1 and C2 may be chosen so that a frequency of oscillation for circuit 111 may be between 1 and 4 Kilohertz (KHz). The low frequency of oscillation of circuit 111 may therefore, provide low losses in the switching of Q1, Q2 and Q3. Alternatively, capacitor C1 may be replaced with another inductor so that circuit 111 may be implemented as a Hartley oscillator. Inductor L3 of coupling circuit 120 may be built on the same core as inductors L1 and L2 in circuit 111, diode D1 may be used to rectify voltages induced on inductor L3 that may be by virtue of the mutual coupling between inductor L3 to inductors L1 and L2 of circuit 111. The rectified pulses may drive the voltage (Vgs) between gate (g) and source (s) of the MOSFET of switch BP1 to turn switch BP1 ON for continuous conduction of switch BP1 at step 1007.

Reference is now made again to FIG. 1F with method 1000 applied to the further details of coupling circuit 120, switch BP1 and circuit 111 in bypass circuit 115 shown in FIG. 1G, according to illustrative embodiments. At step 1003, switch BP1 may be coupled across the outputs of a power module 103 where there may be a series string of power module 103 outputs. Switch BP1 is not active in step 1003.

At decision step 1005, specifically a first bypass current conduction of diode PD1 may be an indication of power module 103 and/or power source 101 not functioning correctly. Consequently, the flow of current (Istring) through an inactive power module 103 output may become restricted. As a result of restricted current flow, the voltage outputs of the other power modules 103 in the string may attempt to push the current through their outputs and through the inactive power module 103 output. The attempt at pushing current flow of current may be caused by an increase in voltage output of the other power modules 103, which may cause diode PD1 to become forward biased so that a first bypass current conduction of current occurs through diode PD1. Diode PD1 becoming forward bias also results in diode BD2 also being forward biased. The forward biasing of diode BD2 allows the utilization of circuit 111 to initiate a continuous operation of switch BP1. Detailed description of the operation of circuit 111 is described later on in the descriptions which follow.

At step 1007, circuit 111 may initiate the continuous operation of switch BP1. As soon as diode PD1 conducts, Q2 and/or Q1 may be ON, and circuit 111 may maintain the continuous operation of switch BP1 so that the MOSFET of switch BP1 is ON such that the voltage (Vds) between drain (d) and source (s) of switch BP1 remains low, e.g., from about 10 millivolts (mV) substantially up to 200 mV. A comparison between Vds of 10 mV of switch BP1 and a forward voltage drop 0.7V of a bypass diode to bypass a string current Istring of 25 Amperes gives bypass power losses of 0.25 Watts and 17.5 Watts, respectively. As such, operation of switch BP1 in bypass circuit 115 and other bypass circuit embodiments described below provide efficient bypass circuits that may allow the bypassing power sources and/or other circuit elements without incurring significant losses by the bypass itself. Bypassing power sources and/or other circuit elements without incurring significant losses may be significant when compared to other ways of providing a bypass that may include the use of bypass diodes, for example.

At step 1007, return connections RET1, RET2 and RET3 may couple together to form a return path that may be a separate return path to that provided at terminal B at the source (s) of switch BP1. Separation between the return path and terminal B between coupling circuit 120 and circuit 111 may be by switch Q3 and diode BD2. Consequently, oscillations of circuit 111 may build on the drains of switches Q2 and/or Q1, while the return path for the oscillations may be provided on the sources(s) of switches Q2 and/or Q1.

At decision step 1009, if inactive power module 103 remains inactive, then the MOSFET of switch BP1 remains ON so that switch BP1 remains activated at step 1007. At decision step 1009, if switch BP1 remains activated at step 1007, power from driver circuitry 170 may be isolated from being supplied to the inactive power module 103. However, when power module 103 starts to become active, for example when a panel becomes unshaded that may be sensed by sensors 125, power from driver circuitry 170 may be allowed to be resupplied to the switches of power module 103 to allow the functioning of power module 103. Both the MOSFET and diode PD1 of switch BP1 and diode BD2 at this point may become reverse biased. The reverse bias voltages of both the MOSFET and diode PD1 of switch BP1 applied to the input of circuit 111 at the anode of diode BD2 may cause the ceasing of the oscillations of circuit 111. The output oscillations of circuit 111 ceasing when feedback to the input of switch BP1 via coupling circuit 120 may be sufficient to cause the MOSFET of switch BP1 to switch OFF, so that switch BP1 is de-activated at step 1011. Alternatively, sensors 125 under control of controller 105 or some other controller may sense the reverse bias voltages of both the MOSFET and diode PD1 of switch BP1. As a result of the reverse biases being sensed, switch BP1 may be switched OFF and power from driver circuitry 170 may be allowed to be resupplied to the switches of power module 103 to allow power module 103 to function as normal. The reduction of voltage applied to the gate of the MOSFET of switch BP1 causes the MOSFET to turn OFF. With the power modules 103 functioning normally switch BP1 is now inactive (OFF) hut still coupled at terminals A and B (step 1003).

Operation of Circuit 111

Figure 1J:
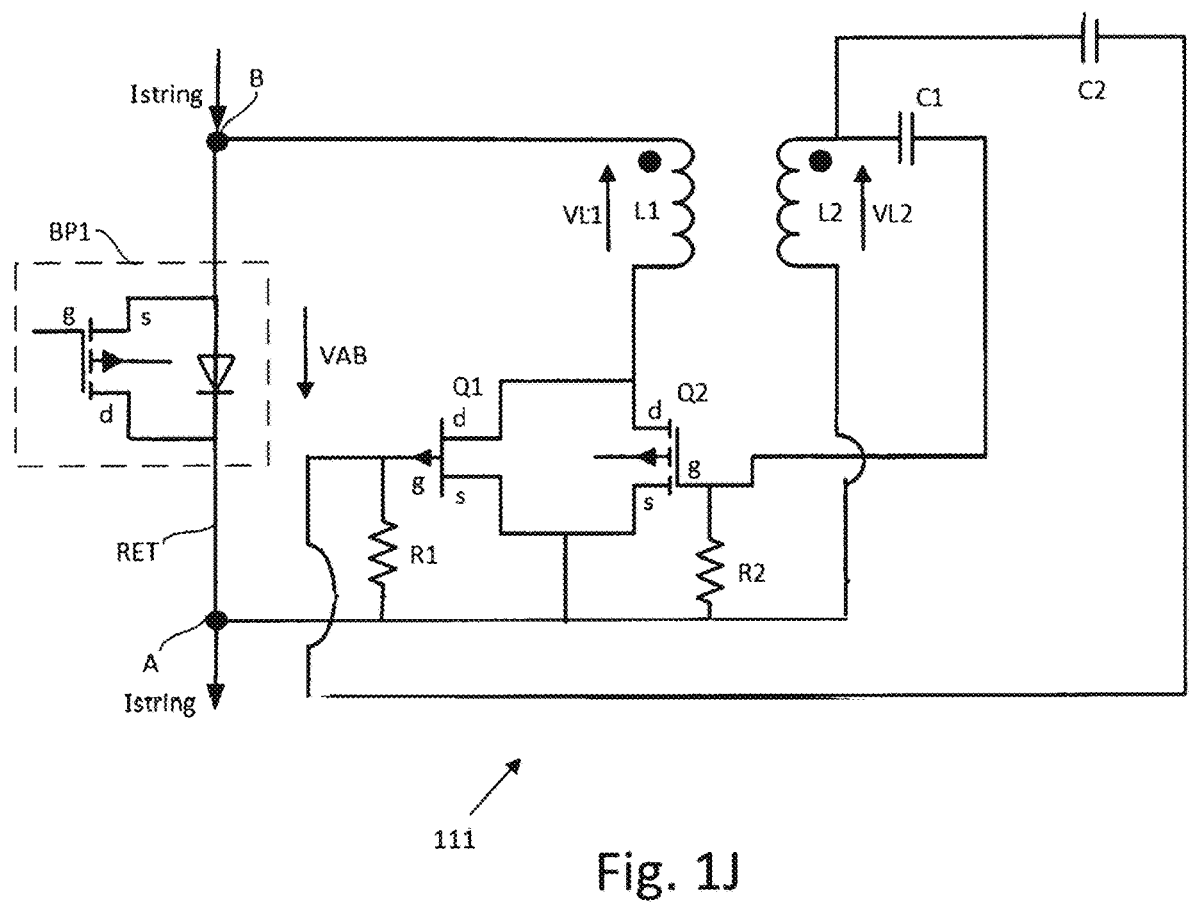
FIG. 1J shows further details of the circuit in the bypass circuit of FIG. 1I, according to one or more illustrative embodiments.
Figure 1K:
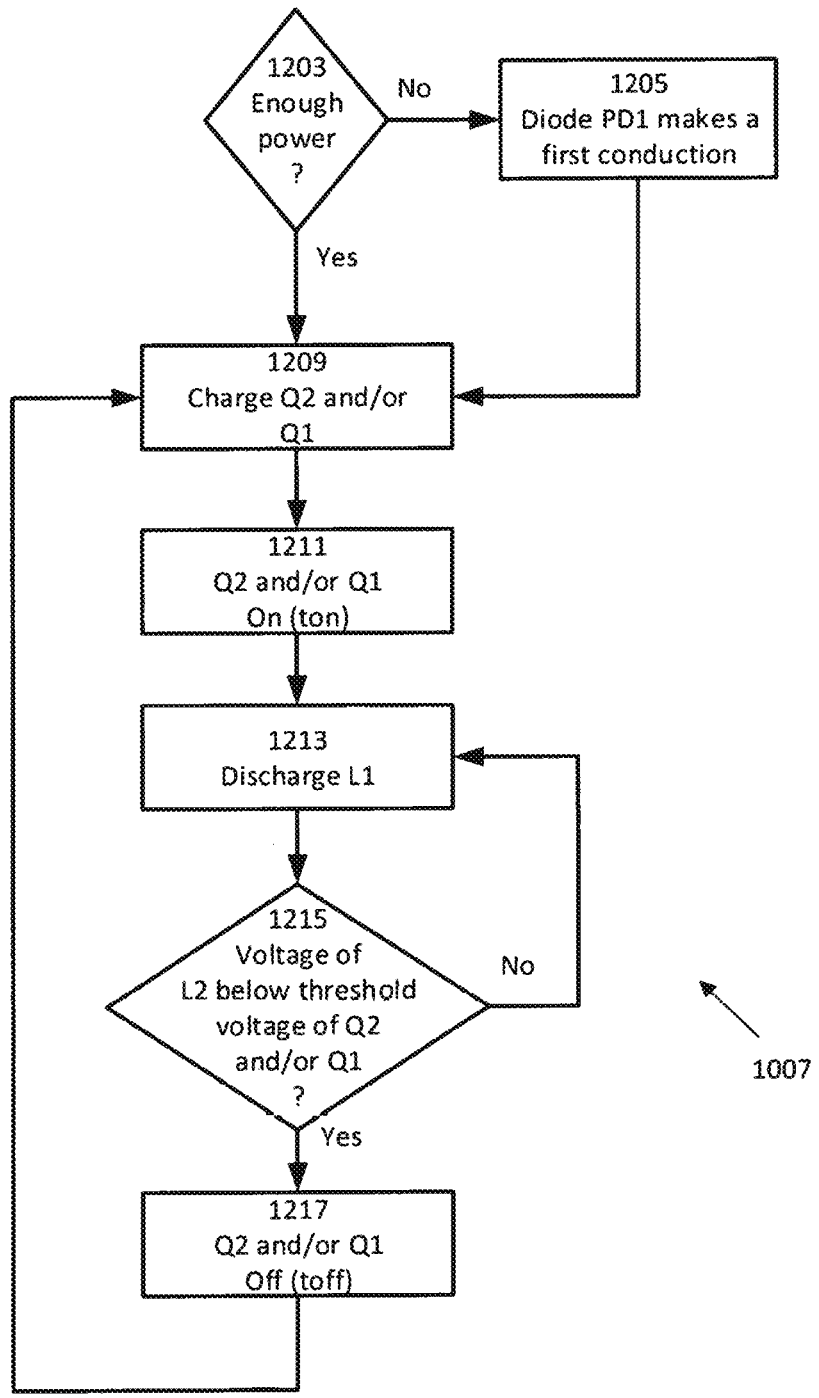
FIG. 1K shows a flow chart of a method for a bypass circuit, according to one or more illustrative embodiments.

Reference is now made to FIG. 1J and FIG. 1K which show, respectively, circuit 111 and a flow chart of step 1007 in greater detail, according to illustrative embodiments. Step 1007 occurs if a power module 103 does not work, so that switch BP1 draws the current in the series string (Istring) in a path around the output of an inactive power module 103. Circuit 111 may be the same as described with regard to FIG. 1G, and may be coupled to bypass switch BP1. Switches Q1 and Q2 may be biased with resistors R1 and R2 respectively. In operation of circuit 111 when switch BP1 is OFF and a power module 103 is working correctly at step 1011, switch Q3 and diode BD2 may block leakage current through bypass switch BP1 and block reverse voltage across bypass switch BP1 when the voltage at terminal A may be much greater than the voltage at terminal B. Conversely when a power module 103 is not working at step 1007, switch Q3 is operated by the rectified output provided by diode D1 so that diode BD2 is bypassed by switch Q3 when switch Q3 may be ON. Switch Q3 OFF during step 1007 provides a block of leakage current through bypass switch BP1. Switch Q3 being ON may additionally compensate for any drop in voltage across terminals A and B as a result of switch BP1 being turned ON and being maintained as ON during step 1007 so as to give headroom for circuit 111 to oscillate. Switch Q3 and its operation is ignored and is to be considered to be ON, in order to simplify the following description.

In decision step 1203, if a low amount of power is being produced by a power source 101 and respective power module 103 compared to other power sources 101 and respective power modules 103 in a series string of power module 103 outputs, a first bypass current conduction may therefore be through diode PD1. Similarly, if the power source 101 and respective power module 103 has a failure the first bypass current conduction may also be, through diode PD1.

At decision step 1205 the first bypass current conduction may induce a voltage VL1 across inductor L1 since diode BD2 is similarly forward biased as diode PD1. At step 1205, bypass switch BP1 may be positively biased with respect to output voltage (VAB) of power module 103. Bypass switch BP1 being positively biased with respect to output voltage (VAB) of power module 103 may be a result of power module 103 not functioning. The first bypass current conduction to provide the bypass of current through bypass switch BP1 may therefore be through diode PD1, followed by the conduction of inductor L1 via diode BD2 and then by the conduction of inductor L1 by use of switch Q1 in a first stage of operation of bypass switch BP1.

An example of the low amount of power may be when power sources 101 may be photovoltaic panels that have just begun to be illuminated (e.g., at dawn) or when a photovoltaic panel may be substantially and/or partially shaded. Shading may reduce power generated by a power source 101 (e.g., reducing the power generated by, for example, 20%, 50% or even close to 100% of the power generated by an unshaded power source). If enough power may be produced by power sources 101 in decision step 1203, circuit 111 may continue to oscillate with an initial use of switch Q1 for a number of times according to the steps of 1209-1217 described below as part of the first stage of operation of switch BP1 until the second stage of operation where switch Q2 and/or Q1 are used. Q1 may be implemented using a junction field effect transistor (JFET) rather than a MOSFET since a JFET compared to a MOSFET may have a lower bias input current compared to a MOSFET and a JFET may conduct between source (s) and drain (d) when the voltage between gate (g) and source (Vgs) is substantially zero. Q1 may also be implemented using a depletion mode FET.

Following on from the first stage with the use of Q1, steps 1209-1217 are implemented with the use of switch Q2 and/or switch Q1 as part of a second stage of operation of switch BP1. The principal of operation for both the first stage and the second stage is that inductor L1 is mutually coupled to inductors L3 and L2 when current flows through inductor L1. The mutual coupling is such that when current flows through inductor L1, current flows in inductor L2 and induces a voltage VL2 into inductor L2. Voltage VL2 may charge the gate (g) of switches Q2 and/or switch Q1 (step 1209) via capacitors C1 and/or C2. The charging of the gate (g) of Q2 and/or switch Q1 may cause switch Q2 and/or switch Q1 to start to conduct current between source (s) and drain (d) of switch Q2 and/or switch Q1 so that Q2 and/or switch Q1 is ON (step 1211) for a time period ton.

The energy induced into inductor L1 during ton may be discharged by a time constant $\tau[L1]$ $$\tau[L1]=L1 \times Req$$

where Req may be the equivalent resistance that includes resistors R2 and/or R1 and the respective resistances (Rds) between drain (d) and source (s) when switch Q2 and/or Q1 may be ON. The value of respective resistances (Rds) between drain (d) and source (s) when switch Q2 and/or Q1 may be ON may be derived from manufacturer data sheets for the particular devices chosen for switches Q2 and Q1 as part of the design of circuit 111. Discharge of inductor L1 (step 1213) may continue in decision step 1215 until voltage VL2 of inductor L2 in decision step 1215 drops below the threshold voltage of Q2 and/or switch Q1 which makes Q2 and/or switch Q1 switch OFF (step 1217) for a time period toff. Q2 and/or switch Q1 drain (d) voltage then may begin to increase by the ratio:

$$\frac{ton}{toff \times VAB},$$

so that voltage may again increase on L2 for a time defined by a time constant τ[L2], after which switch Q2 and/or switch Q1 conducts again (step 1209), which may create the oscillation of circuit 111. The time constant τ[L2] may be given by:

$$\tau[L2] = \sqrt{L2 \times Ceq}$$

where Ceq may be the equivalent capacitance that includes capacitors C1 and C2 and the parasitic capacitances of switches Q2 and/or Q1. Parasitic capacitances of switches Q2 and/or Q1 may be derived from manufacturer data sheets for the particular devices chosen for switches Q2 and Q1 as part of the design of circuit 111. Parasitic capacitances of switches Q2 and/or Q1 may or might not be a significant factor in the desired value of time constant τ[L2]. Inductor L1 coupled to inductor L3 may cause a voltage to be induced in inductor L3 when current flows through inductor L1. The voltage induced into inductor L3 may be rectified by diode D1. The rectified voltage of diode D1 may be applied to the gate (g) of bypass switch BP1 via bias resistors R3 and R4, which may turn bypass switch BP1 to be ON (step 1007).

Figure 1L:
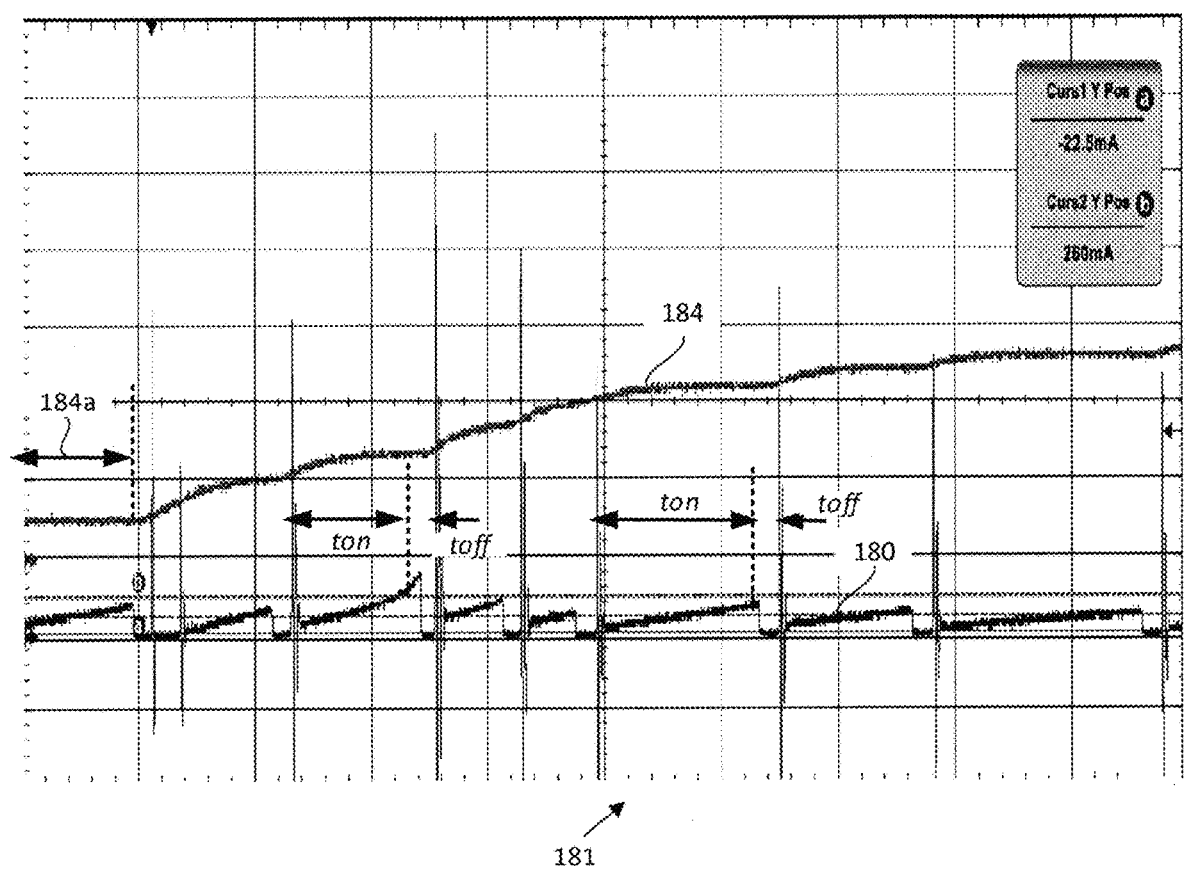
FIG. 1L shows transient traces of measurements made on a working design of the bypass circuit shown in FIG. 1I, according to one or more illustrative embodiments.

Reference is now made to FIG. 1L, which shows transient traces 181 of measurements made on a working design of bypass circuit 115, according to illustrative embodiments. Transient traces 181 show the effects of switch BP1 in a transition from being OFF to being ON. The transient traces further show the entry into steady state condition where switch BP1 is ON at step 1007. The steady state condition may be where switch BP1 is ON at step 1007 and may be an example of an inherent stabilization of bypass circuit 115. The inherent stabilization of bypass circuit 115 may be established during the second stage of operation of switch BP1 at step 1007. The transition shows the effect of the operation of switch BP1: in the first bypass, current conduction through diode PD1, followed by switch Q1 being operated in the first stage of operation, followed by switch Q2 and/or switch Q1 being operated in the second stage of operation of switch BP1.

Trace 184 shows the transient behavior of the voltage (Vgs) between gate (g) and source (s) of the MOSFET of switch BP1. Trace portion 184a shows when a power module 103 may be functioning incorrectly so that switch BP1 and/or diode PD1 are forward biased and string current Istring flows through diode PD1. Trace portion 184a is when a module 103 and/power source 101 are not functioning correctly at step 1203. Trace portion 184a shows how the gate (g) source (s) voltage Vgs of switch BP1 begins to fluctuate as a result of the first bypass current conduction through diodes PD1 and BD2 at step 1205. Gate (g) voltage of the MOSFET of switch BP1 is derived from the rectified voltage (from diode D1) induced in inductor L3 which is mutually coupled to inductor L1. The rectified voltage (from diode D1) also drives the gate of switch Q3 so that after the first bypass current conduction of diodes PD1 and BD2 at step 1205, current flow through inductor L1 is through both the source (s) and drain (d) of Q3 and/or diode BD2. Beyond trace portion 184a is shown the steady continued rise of the gate (g) source (s) voltage Vgs of switch BP1 of the first stage by use of switch Q1 and then by the second stage by use of switches Q1 and/or Q2. The fluctuation of gate (g) source (s) voltage (Vgs) of switch BP1 because of the first bypass current conduction through diodes PD1 and BD2 at step 1205 and the use of switches Q1 and/or Q2 in steps 1209-1217 shows a steady buildup of Vgs during the first stage. As such, both the initial fluctuation of Vgs and the steady buildup of Vgs during the first stage demonstrates a positive feedback loop between the output of circuit 111 back to the input of circuit 111 via coupling circuit 120. The positive feedback loop is therefore responsive to the output of power modules 103 and/or power sources 101 in order to establish that Vgs is sufficient to turn switch BP1 ON, to thereby provide a bypass across terminals A and B.

Trace portion 180 shows the current flow of inductor L1. The principal of operation for the first bypass current conduction through diodes PD1 and BD2, the first stage by use of switch Q1 and the second stage by use of switches Q1 and/or Q2 is that inductor L1 is mutually coupled to inductors L3 and L2 when current flows through inductor L1. The mutual coupling is such that when current flows through inductor L1, current flows in inductor L2 and induces a voltage VL2 into inductor L2. Voltage VL2 may charge the gates (g) of switches Q2 and/or switch Q1 (step 1209) via capacitors C1 and/or C2. The charging of the gate (g) of Q2 and/or switch Q1 may cause switch Q2 and/or switch Q1 to start to conduct current between source (s) and drain (d) of switch Q2 and/or switch Q1 so that Q2 and/or switch Q1 is ON (step 1211) for a time period ton. Discharge of inductor L1 (step 1213) may continue in decision step 1215 until voltage VL2 of inductor L2 in decision step 1215 drops below the threshold voltage of Q2 and/or switch Q1 which makes Q2 and/or switch Q1 switch OFF (step 1217) for a time period toff. The transient nature of the ON and OFF periods, ton and toff for switches Q1 and/or switch Q2 are shown by trace portion 180. The steady state at step 1007 for traces 180 and 184 are shown in the descriptions of the figures that follow.

Inherent stabilization of bypass circuit 115 may be established during the second stage of operation of switch BP1 by virtue of the feedback loop established from the output of circuit 111 back to the input of circuit 111 via coupling circuit 120 being responsive to the output of power modules 103 and/or power sources 101. As such, the steady continued rise of the gate (g) source (s) voltage Vgs of switch BP1 is only allowed to rise to a certain level of voltage so as to maintain switch BP1 to be ON. The feedback loop during the second stage therefore is a negative feedback loop. The negative feedback loop may be responsive to the output of power modules 103 and/or power sources 101 establishes and maintains the activation of switch BP1 to be ON continuously at step 1007 until a power module 103 and/or power source 103 becomes active once more at step 1009. Switch BP1 at step 1007 is forward biased with respect to terminals A and B during bypass mode and the voltage applied to gate (g) of switch BP1 is such that switch BP1 is continuously ON for the time period that the non-functioning power module 103 is required to be bypassed. Likewise, the feedback loop responsive to the output of power modules 103 and/or power sources 101 establishes and maintains the deactivation of switch BP1 to be OFF continuously at step 1011 until a power module 103 and/or power source 103 becomes once again inactive. Switch BP1 is reverse biased with respect to terminals A and B during non-bypass mode and the voltage applied to gate (g) of switch BP1 is such that switch BP1 is continuously OFF for the time period that the functioning power module 103 is required not to be bypassed at step 1011.

Inherent stabilization may therefore occur when switch BP1 may be ON at step 1007, so that as its drain to source voltage Vds falls, the gate (g) to source (s) voltage Vgs also falls. Similarly, stabilization of bypass circuit 115 may be established when switch BP1 may be OFF at step 1011, so that as its drain (d) to source (s) voltage Vds rises, the gate (g) to source (s) voltage Vgs also rises.

Figure 1M:
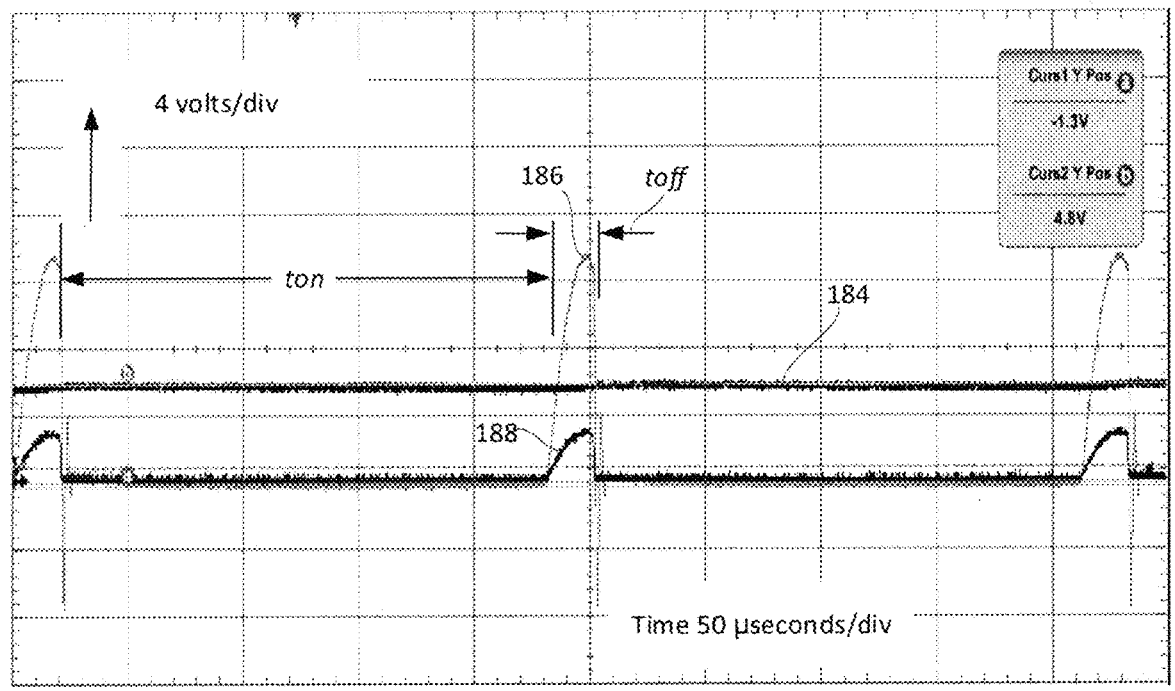
FIG. 1M shows steady state measurement traces of a bypass circuit shown in FIG. 1I, according to one or more illustrative embodiments.
Figure 1N:
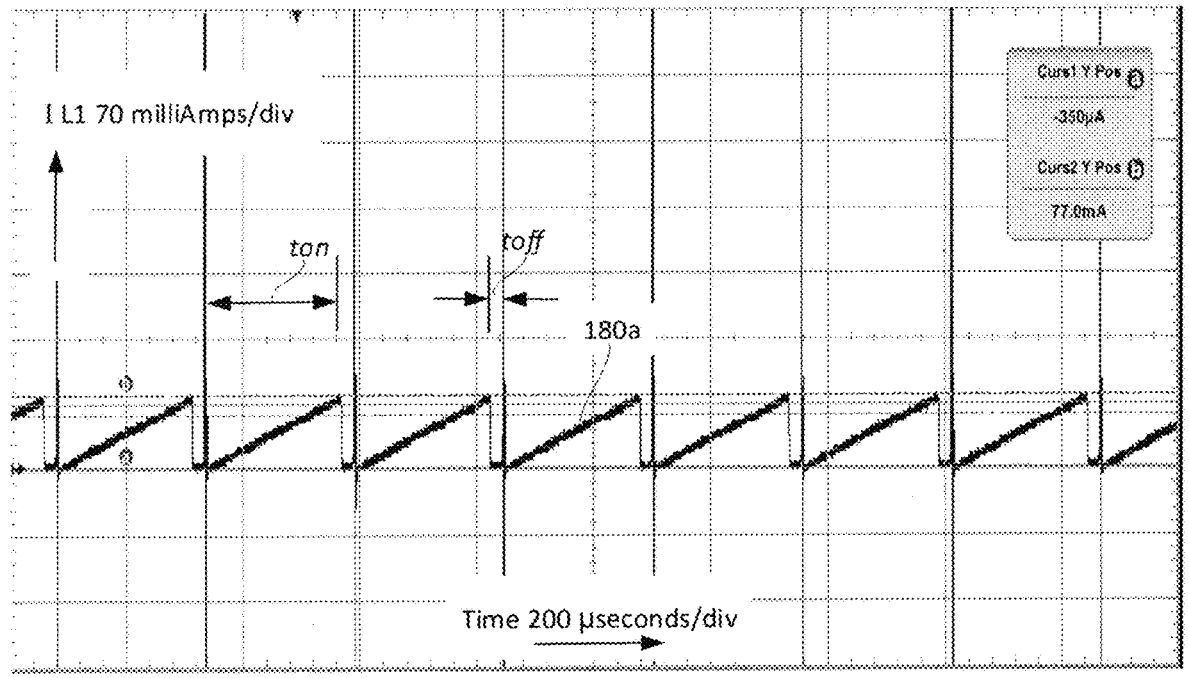
FIG. 1N shows steady state measurement traces of a bypass circuit, according to one or more illustrative embodiments.

Reference is now made to FIGS. 1M and 1N, which show steady state measurement traces 182 and 180 made on bypass circuit 115, according to illustrative embodiments. The measurement traces shown are for when a non-functioning power module 103 as part of a series connection of power modules 103 outputs is not functioning correctly and needs to be bypassed by switch BP1 for a string current (Istring) operating up to a maximum of 25 Amperes. The measurement traces demonstrate that switch BP1 is forward biased with respect to terminals A and B during bypass mode and the gate (g) of switch BP1 is such that switch BP1 is continuously ON for the time period that the non-functioning power module 103 is required to be bypassed.

Reference is now made to FIG. 1M, which shows an oscilloscope trace 182 of the measured steady state traces 184, 186 and 188, according to illustrative embodiments. Trace 184 may be the measured gate (g) source (s) voltage Vgs of switch BP1 when switch BP1 is used to bypass a power module 103 output (step 1007) when a power module 103 does not work. According to trace 184, it can be seen that the measured gate (g) source (s) voltage Vgs of switch BP1 may stay substantially constant at approximately 5.8 volts, which makes bypass switch BP1 to be ON for the time periods ton and toff. Time periods ton and toff refer respectively to when switches Q2 and/or Q1 are ON (step 1211) and OFF (step 1217). Trace 186 shows the measured voltage across inductor L3 which begins at about minus 1.3 volts, rises to a peak of approximately 13 volts, rapidly drops to minus 7.8 volts and then returns back to minus 1.3 volts for a time period of toff (step 1217). The voltage across inductor L3 then remains at about minus 1.3 volts for a time period ton (step 1211). Trace 188 is the measured voltage between drain (d) source (s) voltage Vds of switch Q2, which begins at minus 1.3 volts and rises to a peak of approximately 3.8 volts and returns back to minus 1.3 volts for a period of toff (step 1217). Vds then remains at minus 1.3 volts for time period ton (step 1211).

Reference is now made to FIG. 1N, which shows an oscilloscope trace 180 of the measured steady state current in inductor L1, according to illustrative embodiments. The steady state current in inductor L1 is for when switch BP1 is activated to be ON (step 1007). The ramp portion 180a of trace 180 begins at a current level through inductor L1 beginning at −350 micro-Amperes (μA) and carries on increasing for a time period ton (step 1211) where the current may reach 77 milli-Amperes (mA). Once the current in inductor L1 reaches 77 mA, the ramp drops back down to −350 μA for a time period toff (step 1217). At the end of the time period toff (step 1217), the ramp portion 180a of trace 180 begins once again where the current through inductor L1 reaches 77 mA for the time period ton (step 1211). For both FIGS. 1L and 1M ton (step 1211) may be 240 μseconds and toff may be 20 μseconds. The frequency of oscillation of circuit 111 may be the inverse of 260 μseconds which may be 3.85 KiloHertz (KHz).

Utilization of a first bypass current conduction through diode PD1, switch Q1 in the first stage of operation, Q2 and/or Q1 in the second stage of switch BP1 may therefore give a continuous operation of a bypass of the output of a non-functioning power module 103. The continuous operation of bypass switch BP1 to carry a wide range of currents (e.g. substantially zero to 30 amperes of string current (Istring)) where the conduction of the bypass circuit 115 may be, for example, 10 mV-200 mV compared to 0.7V of bypass diode BPD1. Additionally, operation of bypass circuit 115 may be utilized as part of a 'wake-up' of power system 100 when power sources 101 (e.g., photovoltaic (PV) generators) begin to produce a partial power or when PV generators may be completely shaded. Bypass circuit 115 may then utilize power from auxiliary power circuit 162 and/or the conduction of diode PD1 at step 1205 followed by the first and second stages of operation of bypass 115 as described above in steps 1209-1217 to bypass a power source and/or a PV generator.

Figure 1O:
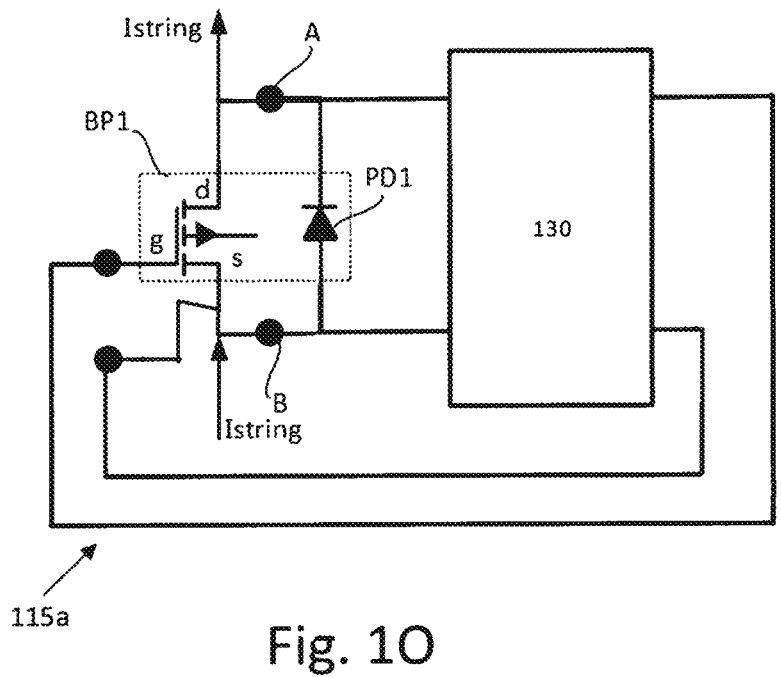
FIG. 1O is a part circuit diagram, part schematic of a bypass circuit, according to one or more illustrative embodiments.

Reference is now made to FIG. 1O, which shows a bypass circuit 115a, according to illustrative embodiments. The sources (s) of switches described herein are referred to as first terminals, the drains (d) are referred to second terminals and the gates (g) are referred to as third terminals. An output of charge pump 130 may be coupled to the input of switch BP1 across the first terminal and third terminal of switch BP1. The first and second terminals of switch BP1 connect to the input of charge pump 130. The anode of diode PD1 connects to the first terminal of switch BP1 and the cathode of diode PD1 connects to the second terminal of switch BP1. Nodes A and B are provided respectfully at the second and first terminals of switch BP1. Charge pump 130 may be configured to receive a very low voltage (e.g., tens or hundreds of millivolts) at its input, and output a substantially larger voltage (e.g., several volts). To enable the substantially larger voltage, charge pump 130 may include several conversion stages. Variations of illustrative circuits for charge pump 130 may be found in "0.18-V Input Charge Pump with Forward Body Biasing in Startup Circuit using 65 nm CMOS" (P. H. Chen et. al., ©IEEE 2010), "Low voltage integrated charge pump circuits for energy harvesting applications" (W. P. M. Randhika Pathirana, 2014), which may be used as or as part of charge pump 130.

Figure 1P:
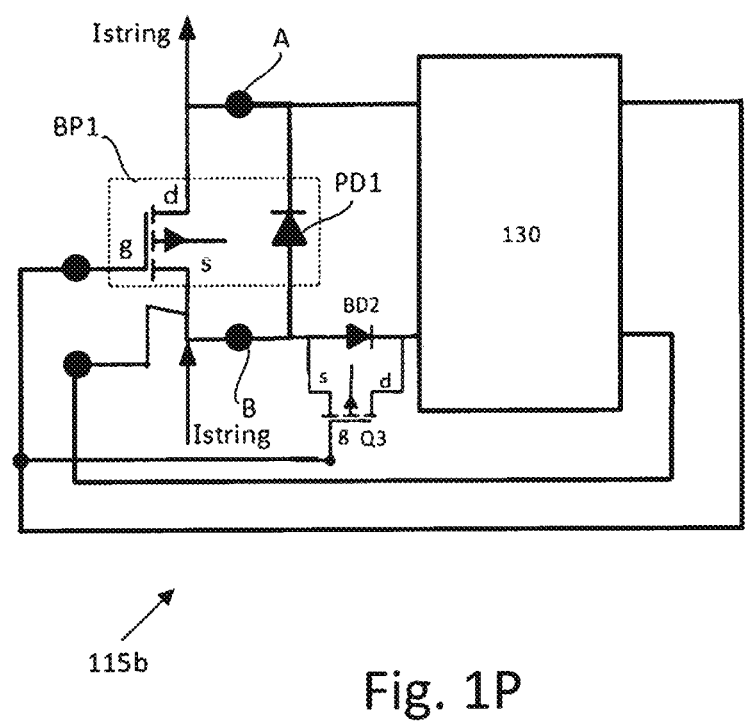
FIG. 1P is a part circuit diagram, part schematic of a bypass circuit, according to one or more illustrative embodiments.

Reference is now made to FIG. 1P, which shows a bypass circuit 115b, according to illustrative embodiments. Bypass circuit is the same as bypass circuit 115a but with a first terminal of switch Q3 connected to terminal B and a second terminal connected to the input of charge pump 130. The third terminal of switch Q3 connects to the third terminal of switch BP1.

Reference is now made again to method 1000 shown in FIG. 1H and to FIGS. 1O and 1P, according to illustrative embodiments. At step 1003, switch BP1 may be coupled across the outputs of a power module 103 where there may be a series string of power module 103 outputs. Provided the power modules 103 are functioning properly, switch BP1 is inactive (OFF). Alternatively, switch BP1 may also be coupled across the outputs of power sources 101.

At decision step 1005, a first bypass current conduction of diode PD1 may be an indication of power module 103 and/or power source 101 not functioning correctly. The indication according to the configuration may cause the subsequent activation of switch BP1 (step 1007) to be ON so that the output of a malfunctioning power module 103 is bypassed. Otherwise, switch BP1 remains OFF so that the bypass function of switch BP1 is inactive (step 1003). Whereas when a normal operation of power module 103 exists, diode PD1 and the MOSFET of switch BP1 are reversed biased (the MOSFET is OFF). The forward biasing of diode PD1 may cause current Istring to flow from anode to cathode of diode PD1 in a first bypass current conduction of diode PD1.

The first bypass current conduction of diode PD1 and forward volt drop of diode PD1 is applied to the input of charge pump circuit 130, which may cause the buildup of the voltage output of charge pump circuit 130. The output voltage of charge pump circuit 130 may be fed back to the input of switch BP1. The output voltage of charge pump circuit 130 applied to the gate of the MOSFET of switch BP1 may be sufficient to cause the MOSFET of switch BP1 to switch ON so that switch BP1 is activated at step 1007. Conversely, with respect to the use of bypass circuit 115*b* when a power module 103 is not working at step 1007, switch Q3 is operated by the output of charge pump 130 so that diode BD2 is bypassed by switch Q3 when switch Q3 may be ON. Switch Q3 OFF during step 1007 provides a block of leakage current through bypass switch BP1. Switch Q3 being ON, additionally compensates for any drop-in voltage across terminals A and B as a result of switch BP1 being turned ON and being maintained as ON during step 1007 so as to may be give headroom for charge pump 130 to function.

At decision step 1009, if inactive power module 103 remains inactive then the MOSFET of switch BP1 remains ON so that switch BP1 remains activated at step 1007. However, when power module 103 starts to become active both the MOSFET and diode PD1 of switch BP1 become reverse biased. Power module 103 may become active because a panel coupled to power module may become un-shaded for example. The reverse bias voltages of both the MOSFET and diode PD1 of switch BP1 applied to the input of charge pump circuit 130 at terminals A and B may cause the decreasing of the output voltage of charge pump circuit 130 and/or a reverse voltage output of charge pump circuit 130. The decreasing of the output voltage of charge pump circuit 130 and/or a reverse voltage output of charge pump circuit 130 applied to the gate (g) of switch BP1 may be sufficient to cause the MOSFET of switch BP1 to switch OFF so that switch BP1 is de-activated at step 1011. The reduction of voltage applied to the gate of the MOSFET therefore may cause the MOSFET to turn OFF. Alternatively, sensors 125 under control of controller 105 or some other controller may sense the reverse bias voltages of both the MOSFET and diode PD1 of switch BP1. As a result of the reverse biases being sensed, switch BP1 may be switched OFF and power from driver circuitry such as driver circuitry 170 for example, may be allowed to be resupplied to the switches of power module 103 to allow power module 103 to function as normal. With the power modules 103 functioning normally, switch BP1 is now inactive (OFF) but still coupled at terminals A and B (step 1003).

Figure 1Q:
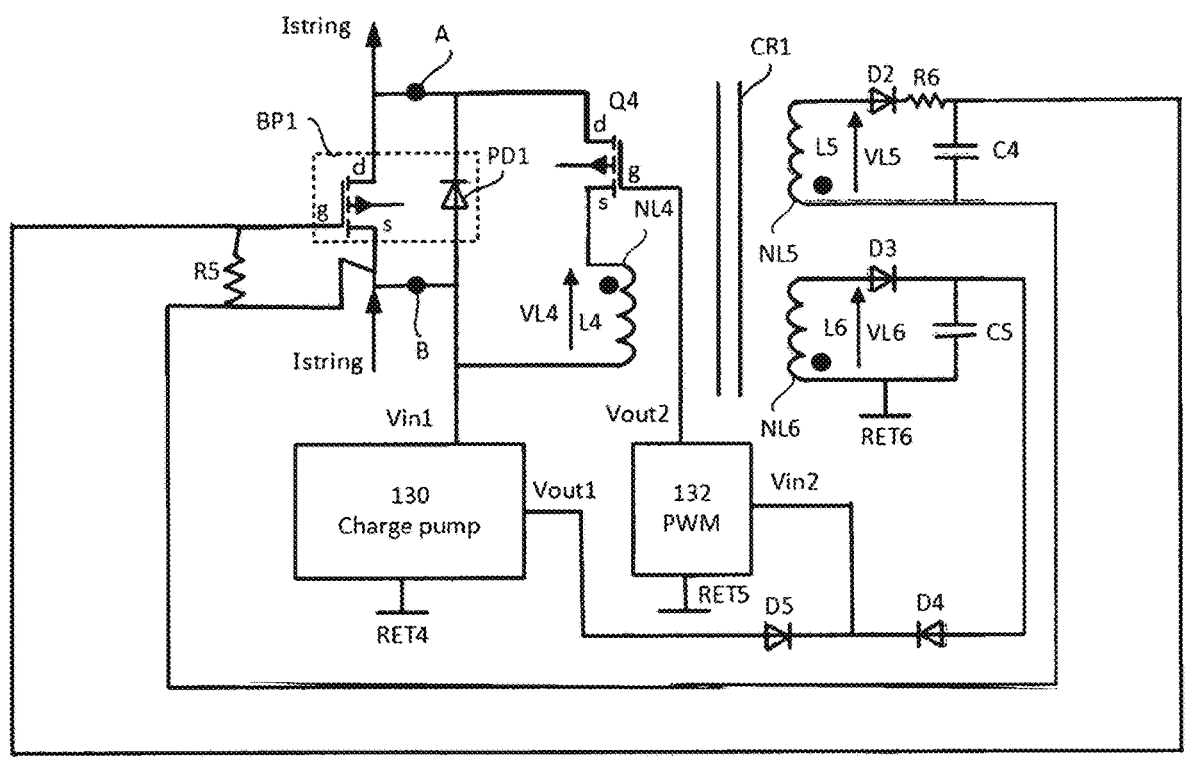
FIG. 1Q shows further details of a bypass circuit, according to one or more illustrative embodiments.

Reference is now made to FIG. 1Q, which shows further details for a bypass circuit 115*c*, according to illustrative embodiments. Coupling 120 circuit may include resistor R5, capacitor C4, resistor R6, diode D2 and inductor L5. Resistor R5 may have a first end coupled to the gate (g) of switch BP1. Resistor R5 may have a second end coupled to terminal B. Capacitor C4 may be coupled across resistor R5. A first end of capacitor C4 may be coupled to terminal B and to a first end of inductor L5. A second end of inductor L5 may be coupled to the anode of diode D2. A second end of capacitor C4 may be coupled to one end of resistor R6. A second end of resistor R6 may be coupled to the cathode of diode D2.

The sources (s) of switches described herein are referred to as first terminals, the drains (d) are referred to second terminals and the gates (g) are referred to as third terminals.

Circuit 111*a* may include the second terminals of switch BP1 may couple to the second terminals of switch Q4 and the cathode of diode PD1 of switch BP1. The anode of diode PD1 may couple to terminal B, the voltage (Vin1) input of charge pump 130 and a first end of inductor L4. The second end of inductor L4 may couple to the first terminals of switch Q4. The third terminals of switch Q4 may couple to the voltage output (Vout2) of PWM 132. The output voltage (Vout1) of charge pump 130 may couple to the anode of diode D5. The cathode of diode D5 may couple to the cathode of diode D4 and the input voltage (Vin2) of pulse width modulator (PWM) 132. The anode of diode D4 may couple to the cathode of diode D3 and a first end of capacitor C5. The second end of capacitor C5 may couple to a first end of inductor L6 and provide return connection RET6. The second end of inductor L6 may couple to the anode of diode D3. Both PWM 132 and charge pump 130 provide respective return paths RET5 and RET6. Return paths RET4, RET5 and RET6 may be coupled together. Inductors L4, L5 and L6 may be all mutually coupled together on the same core CR1, and the output of circuit 111*a* on inductor L4 may be coupled back to the input of coupling circuit 120 on inductor L5. Charge pump 130 may be realized by a Switched-Capacitor Voltage Converter MAX1680C/D® (Maxim Integrated Products, 120 San Gabriel Drive, Sunnyvale, Calif. USA), which may double input voltage (Vin1) on output Vout1. PWM 132 may be realized by use of the LTC®6992 a silicon circuit with an analog voltage-controlled pulse width modulation (PWM) capability by Linear Technology Corporation 1630 McCarthy Blvd., Milpitas, Calif., USA.

Reference is now again made to FIG. 1Q and again to FIG. 1H, which shows a flowchart of method 1000, according to illustrative embodiments. Switch BP1 may couple (step 1003) across the outputs of power modules 103 where there may be a series string of power module 103 outputs. At decision step 1005, if a power module 103 does not work, switch BP1 draws the current in the series string (Istring) in a path around from the output of an inactive power module 103 (step 1007).

At decision step 1005, a first bypass current conduction of diode PD1 may be an indication of power module 103 and/or power source 101 not functioning correctly. Methods described below and decision steps in particular assume that so called 'decisions' are made by virtue of a configuration of the analog circuits used below to implement coupling circuit 120, switch BP1 and circuit 111*a* in bypass circuit 115*c*. As such, steps in method 1000 and indeed in steps of the other methods described below might not preclude the use of digital methodologies such as use of a microprocessor or microcontroller and associated algorithm to sense and control the operation of a bypass switch which may include coupling to circuit 120, switch BP1 and circuit 111*a* in bypass circuit 115. Steps in method 1000 and indeed in steps of the other methods described below might not preclude the use of any number of implementations that combines both analog and digital methodologies.

As with analog circuits, the configuration may include calculation and selection of component values, types of components and the interconnections of components as part of the circuit design of coupling circuit 120, switch BP1 and circuit 111*a* in bypass circuit 115*c*. The configuration may be based therefore, on the normal operating parameters or non-normal operating parameters of power systems 100*a*/ 100 described above and in power systems described below. As such, the configuration with respect to the decision aspect of the decision steps described below may be responsive analog circuit wise to an event such as the breakdown or failure of a power module 103 and/or power source 101, so as to provide a bypass of the power module 103 and/or power source 101.

The configuration may also give the decision aspect of the decision steps described below so as to be responsive to an event such as a power module 103 and/or power source 101 reverting back to normal operation so as to remove a bypass of a power module 103 and/or power source 101. The indication according to the configuration may cause the subsequent activation of switch BP1 (step 1007) to be ON, so that the output of a malfunctioning power module 103 is bypassed. Otherwise, switch BP1 remains OFF so that the bypass function of switch BP1 is inactive (step 1003).

The attempt at pushing current flow of current through a non-functioning power module 103 may be caused by an increase in voltage output of the other power modules 103, which may cause diode PD1 to become forward biased. Whereas when a normal operation of power module 103 exists, diode PD1 and the MOSFET of switch BP1 are reversed biased (the MOSFET is OFF). The forward biasing of diode PD1 may cause current Istring to flow from anode to cathode of diode PD1 in a first bypass current conduction of diode PD1. The forward biasing of diode PD1, similarly cause the forward biasing of switch Q4. The first bypass current conduction of diode PD1 and the forward voltage of diode PD1 may be applied to the input of circuit 111a, which may cause the oscillation of circuit 111a. The output oscillations of circuit 111a may be fed back to the input of switch BP1 via coupling circuit 120. The output of coupling circuit 120 connects to the gate of the MOSFET of switch BP1. The output of coupling circuit 120 applied to the gate of the MOSFET of switch BP1 may be sufficient to cause the MOSFET of switch BP1 to switch ON, so that switch BP1 is activated at step 1007. In step 1007, circuit 111a initiates the continuous operation of switch BP1 as soon as the diode PD1 conducts, and later by use of switch Q4 to maintain the continuous operation of switch BP1 such that the voltage (Vds) between drain (d) and source (s) of switch BP1 remains low at substantially up to 100 milli-volts (mv).

At decision step 1009, if inactive power module 103 remains inactive, then the MOSFET of switch BP1 remains ON so that switch BP1 remains activated at step 1007. However, when power module 103 starts to become active, both the MOSFET and diode PD1 of switch BP1 and switch Q4 become reverse biased. Power module 103 may become active because a panel coupled to power module may become un-shaded for example. The reverse bias voltages of both the MOSFET and diode PD1 of switch BP1 and switch Q4 applied to the input of circuit 111a at terminals A and B may cause the ceasing of the oscillations of circuit 111a. The output oscillations of circuit 111a ceasing fed back to the input of switch BP1 via coupling circuit 120 may be sufficient to cause the MOSFET of switch BP1 to switch OFF so that switch BP1 is de-activated at step 1011. The reduction of voltage applied to the gate of the MOSFET causes the MOSFET to turn OFF. Alternatively, sensors 125 under control of controller 105 or some other controller may sense the reverse bias voltages of both the MOSFET and diode PD1 of switch BP1. As a result of the reverse biases being sensed, switch BP1 may be switched OFF and power from driver circuitry such as driver circuitry 170 for example, may be allowed to be resupplied to the switches of power module 103 to allow power module 103 to function as normal. With the power modules 103 functioning normally switch BP1 is now inactive (OFF) but still coupled at terminals A and B (step 1003).

Operation of Circuit 111a

Figure 1R:
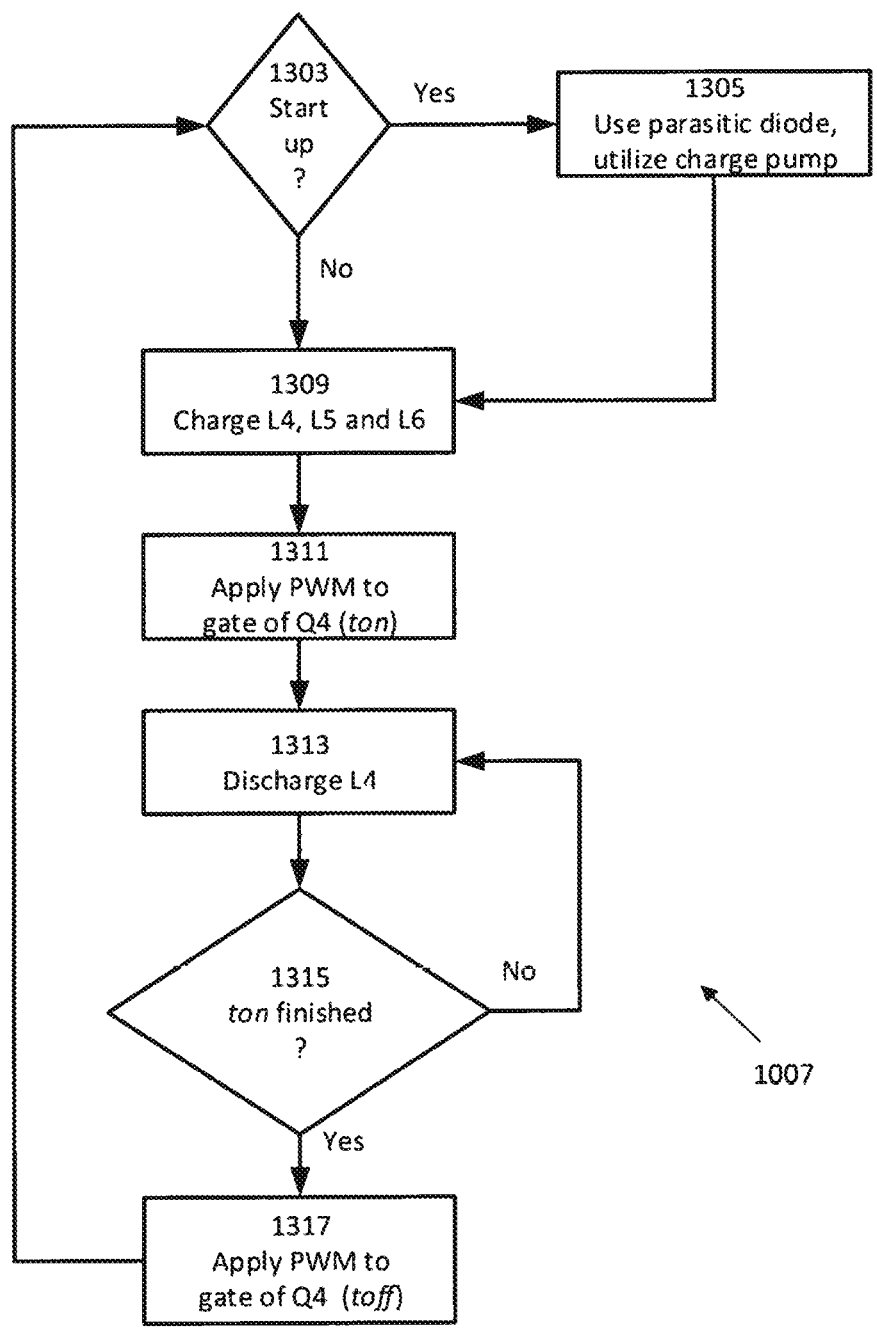
FIG. 1R shows a flow chart showing further details of a step shown in FIG. 1H, according to one or more illustrative embodiments.

Reference is now made again to FIG. 1Q and FIG. 1R, which show respectively bypass 115c and a flow chart showing further details of step 1007, according to illustrative embodiments. Step 1007 occurs if a power module 103 does not work, so that switch BP1 draws the current in the series string (Istring) in a path around the output of an inactive power module 103 in a series string of power module 103 outputs. In operation of circuit 111a, a switch and its diode may be incorporated into charge pump 130 or may be attached thereto. The switch (not shown but similar in function to switch Q3 and diode BD2 in FIG. 1I) may block leakage current through bypass switch BP1 and block reverse voltage across bypass switch BP1. The blocking of reverse voltage may be when the voltage at terminal A may be much greater than the voltage at terminal B such a situation may be when the power module 103 is operating correctly at step 1003. The switch and its operation may be ignored for ease of the following discussion and is considered to be ON.

In decision step 1303, the continuous operation of switch BP1 in bypass of a power module 103 output begins as soon as the diode PD1 of switch BP1 conducts in a first bypass current conduction. After the first bypass current conduction, a first stage of the continuous operation of switch BP1 may be established primarily by use of charge pump 130, PWM 132 and switch Q4. After several possible cycles as described in the steps which follow by use of charge pump 130, PWM 132 and switch Q4, the voltage produced by inductor L6 may be greater than the output voltage Vout1 of charge pump 130 which initiates a second stage of the continuous operation of switch BP1. The time constant to charge capacitor C5 may be smaller than the time constant to charge capacitor C4. The difference in time constants between capacitors C5 and C4 may facilitate the use of charge pump 130 and switch Q4 to operate switch BP1 in the first stage until the second stage. In the second stage, the operation may be mainly with the continuous operation of PWM 132, switch Q4 and when the voltage produced by inductor L6 may be greater than the output voltage Vout1 of charge pump 130.

In decision step 1303, diode PD1 makes a first bypass current conduction of inductor L4 in step 1305 which induces voltages across inductors L5 and L6 while bypass switch BP1 may be positively biased with respect to output voltage (VAB) of power module 103. Bypass switch BP1 being positively biased with respect to output voltage (VAB) of power module 103 may signify that power module 103 may be not functioning and needs to have its output bypassed. The induced voltage VL5 of inductor L5 is rectified by diode D2 to charge capacitor C4. The voltage of charged capacitor C4 is applied to the gate (g) of bypass switch BP1, so that bypass switch BP1 is ON for the first bypass current conduction and for both the first and second stages described in further detail below.

The first bypass current conduction of inductor L4 that may be through diode PD1 may be when a low amount of power may be being produced by power sources 101 and respective power modules 103. An example of the low amount of power may be when power sources 101 may be photovoltaic panels that have just begun to be illuminated at dawn for example, or when a photovoltaic panel may be substantially shaded. If enough power may be produced by power sources 101 at decision step 1303, circuit 111a continues to oscillate with the substantial use of charge pump 130 for several possible cycles until enough power may be produced by power sources 101.

The principal of operation, for either the first bypass current conduction or for the first stage may be that inductor L4 with current flowing through inductor L4 from the first bypass current conduction and/or followed by the use of switch Q4 may be mutually coupled to inductors L5 and L6 via inductor L4. Current flowing through L4 causes current to flow in inductors L5 and L6 (step 1309) and the application of PWM 132 voltage Vout2 to the gate (g) of switch Q4 (step 1311). The application of PWM 132 voltage Vout2 to the gate (g) of switch Q4 may be by virtue of the output voltage Vout1 of charge pump 130 applied to the input (Vin2) of PWM 132. The output voltage Vout1 of charge pump 130 applied to the input (Vin2) of PWM 132 further causes switch Q4 to start to conduct current between source (s) and second terminals of switch Q4 so that Q4 is ON for a time period ton. Discharge of inductor L4 (step 1313) continues in decision step 1315 until the end of time period ton. At end of time period ton the application of PWM 132 voltage Vout2 to the gate (g) of switch Q4 turns Q4 OFF for a time period toff.

Inductors L4, L5 and L6 may be all mutually coupled together on the same core CR1, as such, the output of circuit 111a on inductors L5 and L6 may be coupled back to the input of coupling circuit 120 to inductor L5. The mutual coupling between inductor L4 and inductors L5 and L6 may be such that inductors L5 and L6 have a greater number of turns than inductor L4 so that the voltages induced into inductors L5 and L6 may be much greater by virtue of the well-known transformer equations:

$$\frac{VL4}{VL5} = \frac{NL4}{NL5}$$

and $$\frac{VL4}{VL6} = \frac{NL4}{NL6}$$

Where VL4, VL5 and VL6 are the respective voltages of inductors L4, L5 and L6. NL4, NL5 and NL6 are the respective number of turns of inductors L4, L5 and L6. The greater voltages induced into inductors L5 and L6 may allow for operation of switch BP1, switch Q4, charge pump 130 and PWM 132. Whereas without the greater voltages induced, switch BP1, switch Q4, charge pump 130 and PWM 132 might not be able to operate otherwise.

Until after several possible cycles as described in the steps 1309-1317 above, the voltage produced by inductor L6 and rectified by diode D3 may build up to be greater than the output voltage Vout1 of charge pump 130 rectified by diode D5. When the voltage produced by inductor L6 and rectified by diode D3 may be greater than the output voltage Vout1 of charge pump 130 rectified by diode D5, a second stage begins. The second stage of the continuous operation of switch BP1 begins by the application of voltage rectified by diode D3 applied to the input (Vin2) of PWM 132. The second stage of the continuous operation of switch BP1 continues the same way as described previously in steps 1309-1317, but with substantial use of PWM 132 and switch Q4.

Inherent stabilization of bypass circuit 115c may be established by virtue of the feedback loop established from the output of circuit 111a back to the input of circuit 111a via the rectified outputs of inductors L5 and L6 (across capacitors C4 and C5) responsive to the output of power modules 103 and/or power sources 101. The feedback loop responsive to the output of power modules 103 and/or power sources 101 establishes and maintains the activation of switch BP1 to be ON continuously at step 1007 until a power module 103 and/or power source 103 becomes inactive. Switch BP1 at step 1007 may be forward biased with respect to terminals A and B during bypass mode and the gate (g) of switch BP1 may have voltage applied which may be such that switch BP1 may be continuously ON for the time period that the non-functioning power module 103 is to be bypassed.

Likewise, the feedback loop responsive to the output of power modules 103 and/or power sources 101 establishes and maintains the deactivation of switch BP1 to be OFF continuously at step 1011 until a power module 103 and/or power source 103 becomes once again inactive. Switch BP1 may be reverse biased with respect to terminals A and B during bypass mode and voltage applied to the gate (g) of switch BP1 may be such that switch BP1 is continuously OFF for the time period that the functioning power module 103 is required not to be bypassed at step 1011. Inherent stabilization may occur when switch BP1 may be ON at step 1007, so that as the drain to source voltage Vds falls, the gate (g) to source (s) voltage Vgs also falls. Similarly, stabilization of bypass circuit 115c may be established when switch BP1 may be OFF at step 1011, so that as the drain (d) to source (s) voltage Vds rises, the gate (g) to source (s) voltage Vgs also rises.

Figure 1S:
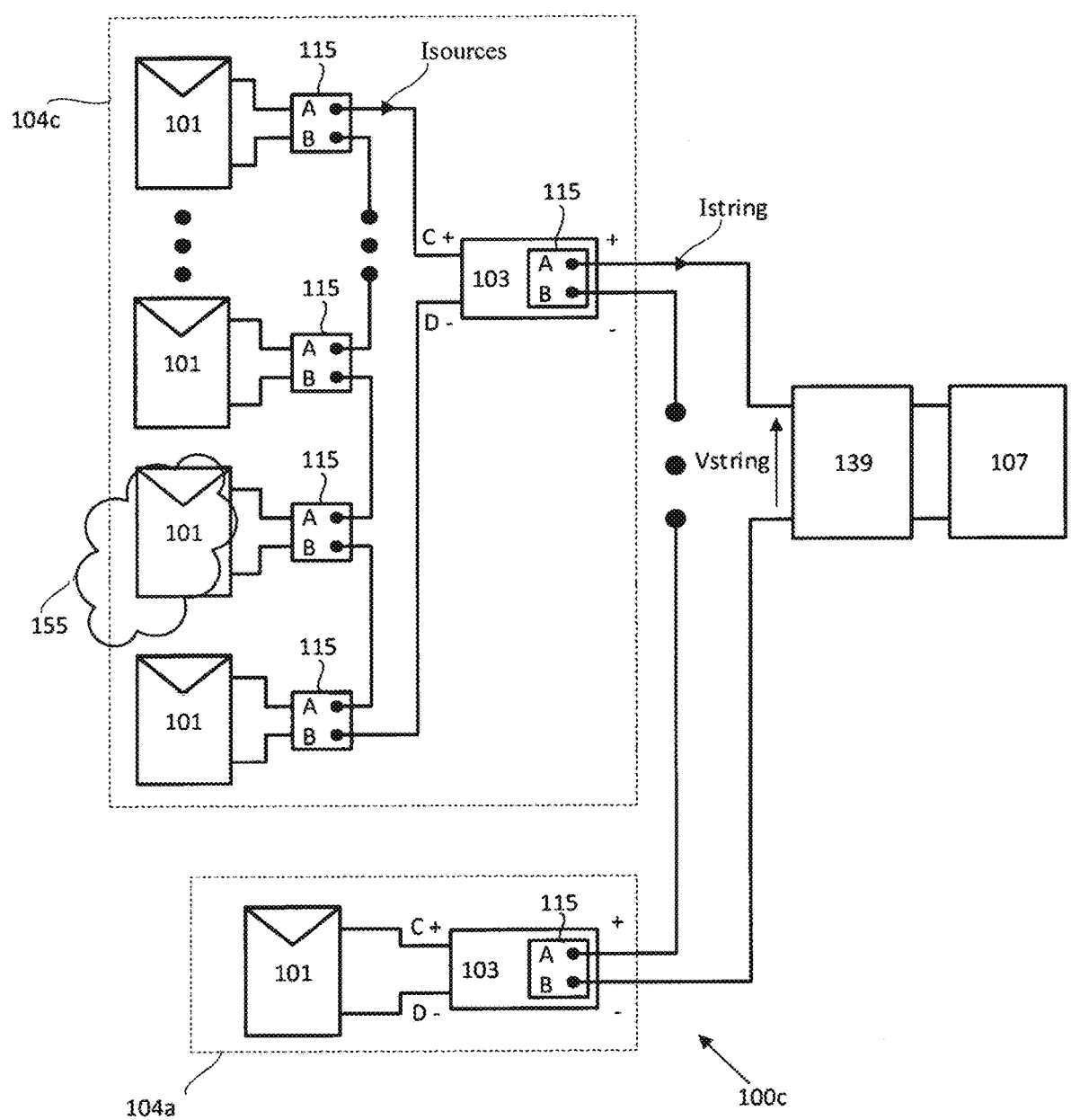
FIG. 1S shows a power system, according to one or more illustrative embodiments.

Reference is now made to FIG. 1S, which shows a power system 100c, according to illustrative embodiments. Connection configuration 104a shows power source 101 with direct current (DC) output terminals coupled to input terminals of power module 103 at terminals C and D. Power module 103 has a bypass circuit 115 coupled to the output terminals of power module 103 at terminals A and B.

Connection configuration 104c shows multiple power sources 101 outputs coupled to respective bypass circuits 115 at terminals A and B. The multiple power sources 101 outputs may be coupled in a series connection with direct current (DC) output terminals of the series connection coupled to the input terminals of power module 103 at terminals C and D. A bypass circuit 115 may be coupled to the output terminals of power module 103 at terminals A and B.

The outputs of power modules 103 may be coupled in series to form a series coupled string of power module 103 outputs. The series coupled string of power module 103 outputs, with a voltage output Vstring may be coupled across the input of system power device 139. System power device 139 may be a direct current (DC) to DC converter or may be DC to alternating current (AC) inverter supplying power to load 107.

Assuming power sources 101 may be photovoltaic (PV) panels, if a panel is shaded with shade 155, as shown in connection configuration 104c, the current (Isource) passing through the shaded panel may be offered an alternative, parallel path around the inactive panel, and the integrity of the shaded panel may be preserved. The purpose of bypass circuits 115 coupled across the outputs of panels/power sources 101 may be to be the alternative, parallel path to draw the current away from a shaded panel associated with its respective bypass circuit 115. Bypass circuits 115 become forward biased when their associated shadowed panel becomes reverse biased. Since the panels and the associated bypass circuits 115 may be in parallel, rather than forcing current through the shadowed panels, the bypass circuits 115 draw the current away from the shadowed panels and completes the electrical current to maintain the connection to the next panel in a string of series coupled power sources as shown in connection configuration 104c. Use of bypass circuits 115 with respect to multiple panels wired in series allows for power to be used from the remaining non-shaded panels whereas placing the bypass circuit on just the output of power module 103 only in connection configuration 104c may prevent utilization of the power produced by the remaining non-shaded panels.

Similarly, if a power module 103 becomes inactive, the current ((string) passing through the inactive power module 103 may be offered an alternative, parallel path around the outputs of the inactive power module 103. The purpose of bypass circuits 115 coupled across the outputs of power modules 103 may be to draw the current away from the output of an inactive power module 103 associated with its respective bypass circuit 115. Bypass circuits 115 become forward biased when their associated inactive power module 103 become reverse biased. Since the output of power module 103 and the associated bypass circuits 115 may be in parallel, rather than forcing current through an inactive power module 103, the bypass circuits 115 draw the current away from the output of an inactive power module 103 and completes the electrical current Istring to maintain the connection for current Istring to the next power module 103 output in a string of series coupled power module outputs 103 as shown.

It is noted that various connections are set forth between elements herein. These connections are described in general and, unless specified otherwise, may be direct or indirect; this specification is not intended to be limiting in this respect. Further, although elements herein are described in terms of either hardware or software, they may be implemented in either hardware and/or software. Further, elements of one embodiment may be combined with elements from other embodiments in appropriate combinations or sub-combinations. Examples above have utilized analog circuits for implementation of coupling circuits 120 and circuits 111/111a used to respectively activate or deactivate a bypass of a non-functioning and functioning power module 103 and/or power source output in a series string of power module 103 and/or power source outputs. Alternatively, the non-functioning power module 103 may utilize auxiliary power circuit 162 and sensors 125 to sense a non-functioning power module 103 output so as to bypass the output of the non-functioning power module 103 output by turning switch BP1 ON (step 1007). Similarly, sensors 125 may be utilized to sense a functioning power module 103 output so as to not bypass the output of the functioning power module 103 output by turning switch BP1 OFF (step 1011).

Figure 1T:
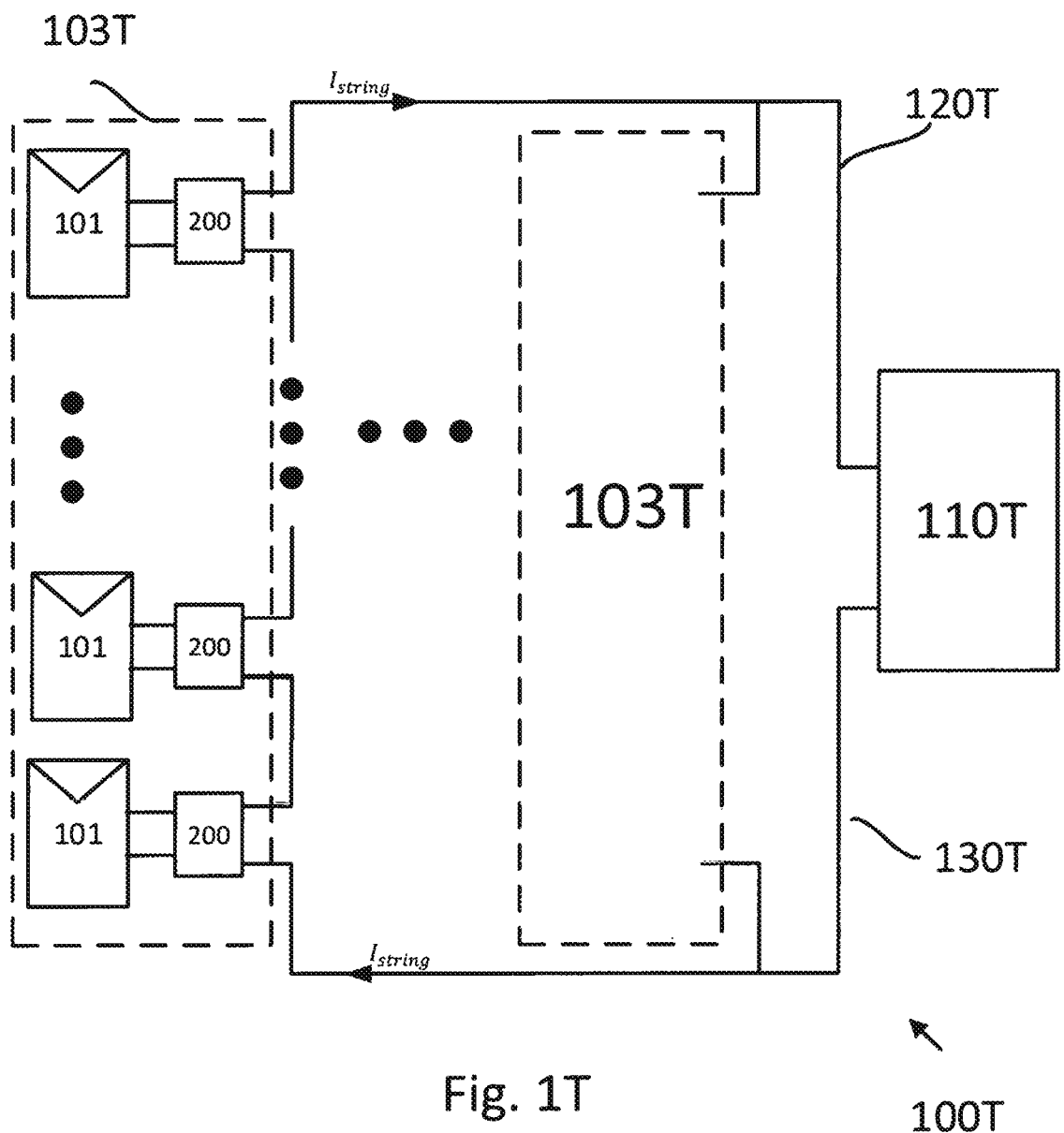
FIG. 1T is part schematic, part block diagram of a power system including multiple power devices and multiple power generators, according to one or more illustrative embodiments.

Reference is now made to FIG. 1T, which shows a photovoltaic (PV) system according to illustrative embodiments. Power system 100T may have multiple PV strings 103T coupled in parallel between power buses 120T and 130T. Each of the PV strings 103 may have multiple power sources 101 and multiple power devices 200. Power sources 101 may include one or more photovoltaic cell(s), module(s), panel(s) or/or photovoltaic shingle(s). Photovoltaic shingles, are solar panels designed to look like and function as conventional roofing materials, such as asphalt shingle or slate, while also producing electricity. Solar shingles are a type of solar energy solution known as building-integrated photovoltaics (BIPV). According to some aspects, power sources 101 shown as PV generators may be replaced by other power sources, for example, direct current (DC) batteries or other DC or alternating current (AC) power sources. Each power device 200 may include a control device and a communication device, and may be operated to disconnect a PV generator connected at the power device inputs when receiving (e.g., via the communication device) a command to disconnect PV generators. Power system 100T may include power buses 120T and 130T, which may be input to system power device 110T.

According to some aspects, system power device 110T may include a DC/AC inverter (e.g., when the input power is DC power), an AC/AC converter (e.g., when the input power is AC power), and may output AC power to a power grid, to a home, or to other destinations. According to some aspects, system power device 110T may include or be coupled to a control device and/or communication device for controlling or communicating with power devices 200. For example, system power device 110 may have a control device such as a microprocessor, digital signal processor (DSP), application specific integrated circuit (ASIC) and/or a field programmable gate array (FPGA) configured to control the operation of system power device 110T.

System power device 110T may further include a communication device (e.g., a power line communication circuit, an acoustic communications device and/or a wireless transceiver) configured to communicate with linked communication devices included in power devices 200 and transmit operational commands and/or receive reports from communication devices included in power devices 200.

According to some aspects, power buses 120T and 130T may be further coupled to energy storage devices such as batteries, supercapacitors, flywheels or other storage devices.

According to some aspects, it may be desirable to bypass (e.g., provide a low-impedance current path across) one or more power sources 101 and/or power devices 200. For example, in case of a malfunctioning or under-producing power source (e.g., PV generator) 101 or a malfunctioning PV power device 200, it may be beneficial to bypass the malfunctioning or under-producing PV module to enable continued power production from power system 100T.

Safety regulations may define a maximum allowable voltage between power buses 120T and 130T and any other point in power system 100T, during both regular operating conditions and during potentially unsafe conditions. Safety regulations may also define a maximum allowable voltage between any two voltage points in power system 100T. In some scenarios, in may be beneficial to bypass (e.g., by short-circuiting and/or disconnecting) one or more of power sources 101 in a PV string 103T in response to an unsafe condition in power system 100T.

Figure 2:
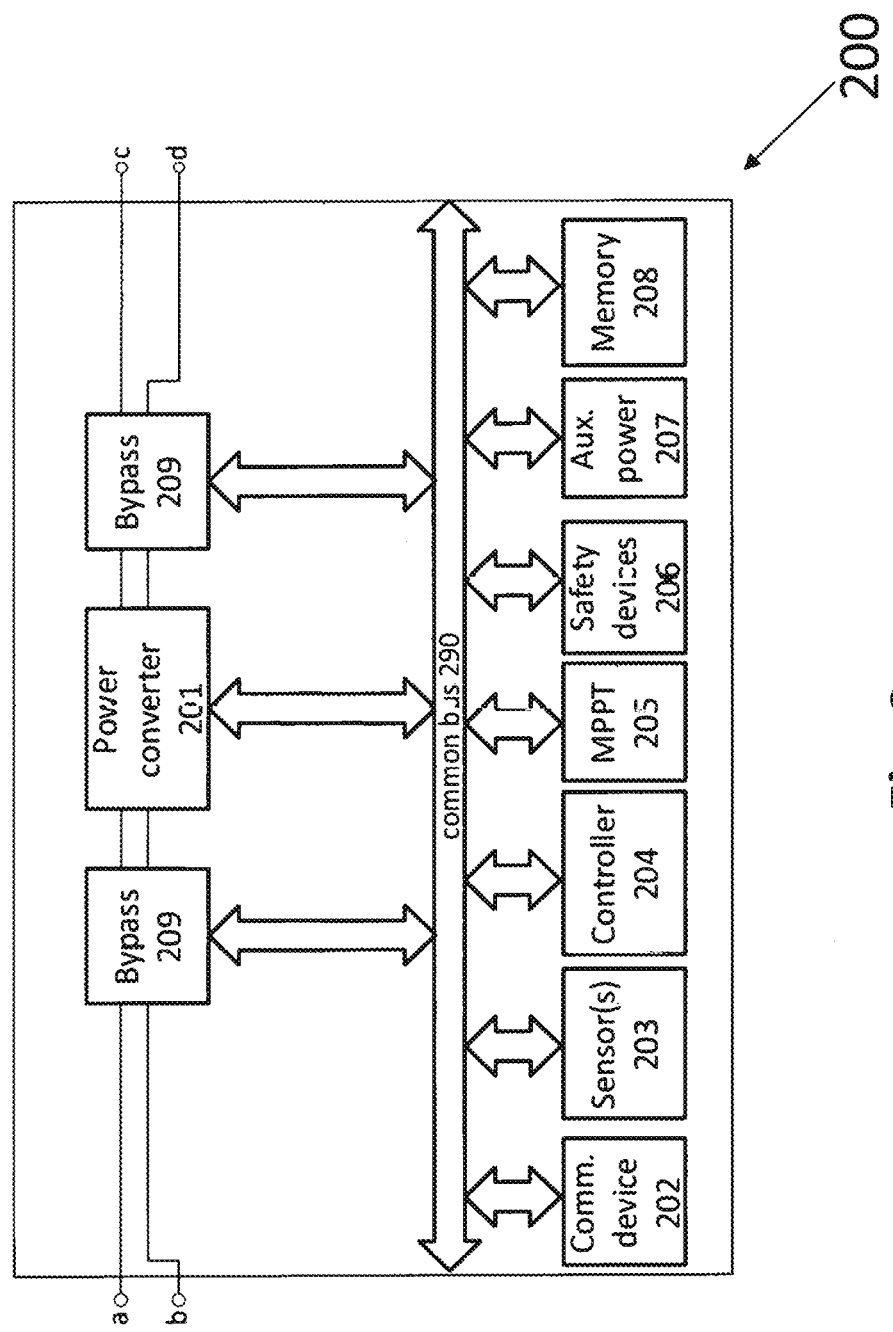
FIG. 2 is a block diagram of a power device, according to one or more illustrative embodiments.

Reference is now made to FIG. 2, which illustrates circuitry that may be included in a power device such as power device 200, according to aspects of the disclosure herein. Power device 200 may include power converter 201. Power converter 201 may include a DC/DC converter such as a Buck, Boost, Buck/Boost, Buck+Boost, Cuk, Flyback, charge pump and/or forward converter. According to some aspects, power converter 201 may include a DC/AC converter (also known as an inverter), such as a micro-inverter. Power converter 201 may have two input terminals and two output terminals, which may be the same as the input terminals and output terminals of power device 200. According to some aspects, power device 200 may include an MPPT circuit 205, configured to extract increased power from a power source coupled to power device 200. According to some aspects, power converter 201 may include MPPT functionality. According to some aspects, MPPT circuit 205 may implement impedance matching algorithms to extract increased power from a power source coupled (e.g., directly connected) to the input of power device 200.

Power device 200 may further include a controller 204 such as an analog control circuit, a microprocessor, Digital Signal Processor (DSP), Application-Specific Integrated Circuit (ASIC), and/or a Field Programmable Gate Array (FPGA). Controller 204 may control and/or communicate with other elements of power device 200 over common bus 290. According to some aspects, power device 200 may include circuitry and/or sensor(s)/sensor interface(s) 203 configured to measure parameters directly or receive measured parameters from connected sensor(s)/sensor interface(s) 203 configured to measure parameters on or near the power source, such as the voltage and/or current and/or power output by the power source. According to some aspects, sensor(s)/sensor(s) interfaces 203 may be configured to sense parameters on the output of power device 200. According to some aspects, the power source may be a PV generator including PV cells, and sensor(s)/sensor interface(s) 203 may directly measure or receive measurements of the irradiance received by the PV cells, and/or the temperature on or near the PV generator.

According to some aspects, power device 200 may include communication device 202, configured to transmit and/or receive data and/or commands from other devices such as system power device 110T of FIG. 1T. Communication device 202 may communicate using power line communication (PLC) technology, acoustic communications, or wireless communication technologies such as ZIG-BEE™, BLUETOOTH™, Wi-Fi, cellular communication or other wireless methods. According to some aspects, power device 200 may include a memory device 208, for logging measurements taken by sensor(s)/sensor interface(s) 203 to store code, operational protocols or other operating information. Memory device 208 may be flash, electrically erasable programmable read-only memory (EEPROM), random access memory (RAM), solid state devices (SSD) or other types of appropriate memory devices.

Power device 200 may have safety devices 206 (e.g., fuses, circuit breakers and/or Residual Current Detectors). Safety devices 206 may be passive or active. For example, safety devices 206 may include one or more passive fuses disposed within power device 200 and designed to melt when certain current flows through it, disconnecting part of power device 200 to avoid damage. According to some aspects, safety devices 206 may have active disconnect switches, configured to receive commands from a controller (e.g., controller 204) to disconnect portions of power device 200, or configured to disconnect portions of power device 200 in response to a measurement measured by a sensor (e.g., sensor(s)/sensor interface(s) 203). According to some aspects, power device 200 may have an auxiliary power circuit 207, configured to output power suitable for operating other circuitry components (e.g., controller 204, communication device 202). Communication, electrical coupling and/or data-sharing between various components of power device 200 may be carried out over common bus 290.

Figure 2A:
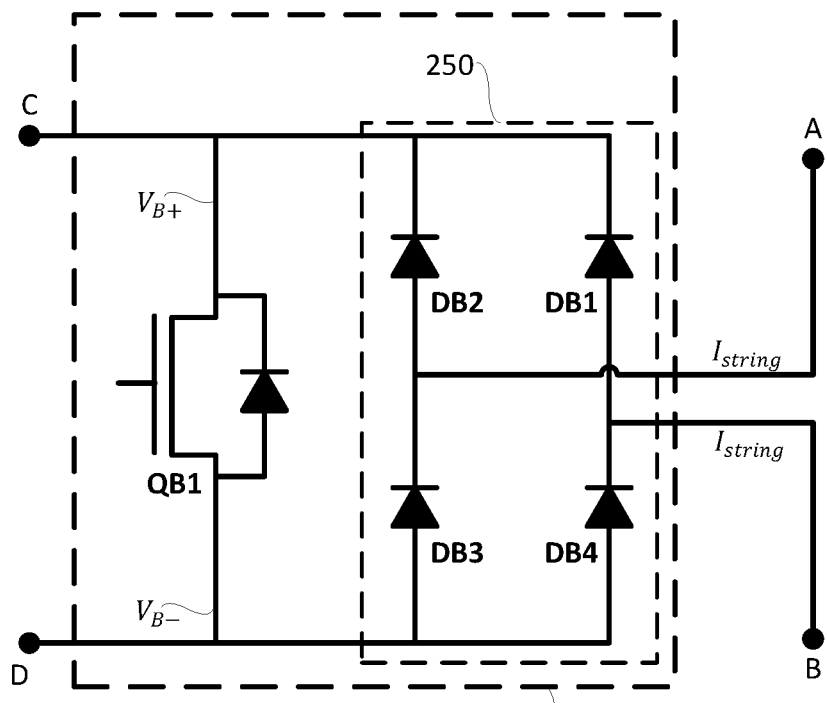
FIGS. 2A and 2B are schematics of implementations of a bypass circuit, according to one or more illustrative embodiments.
Figure 2B:
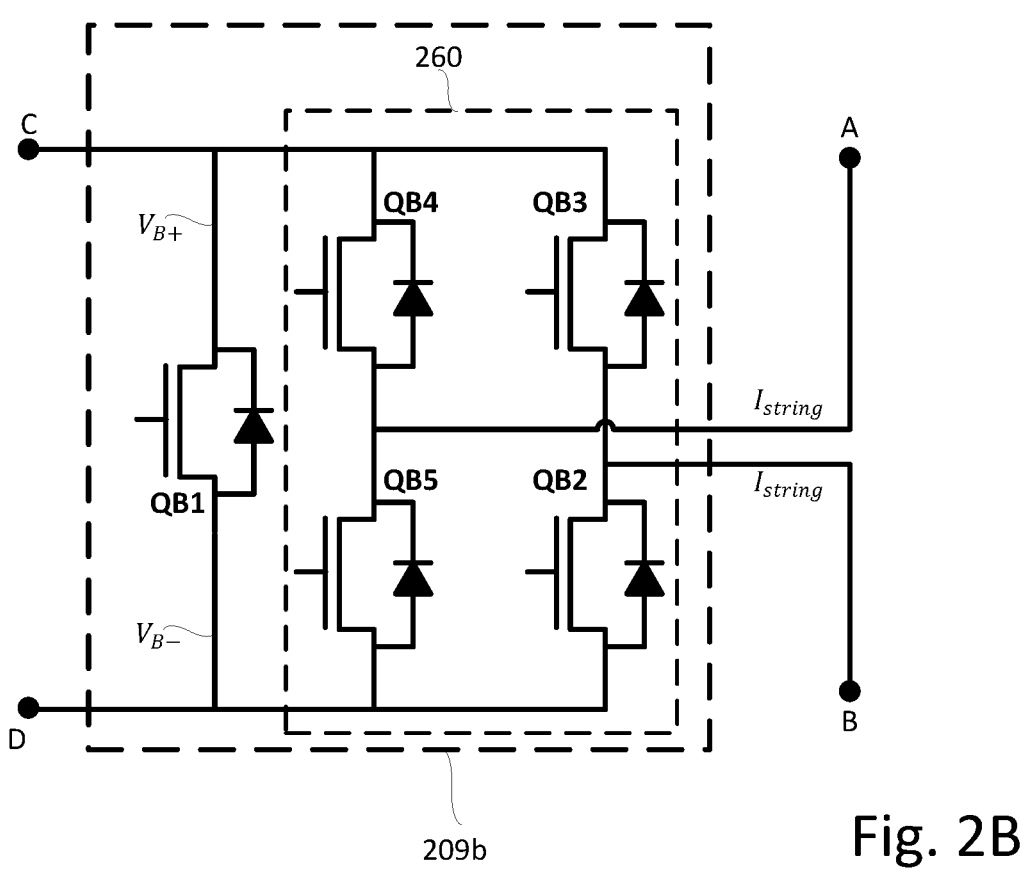

Power device 200 may have a bypass circuit 209 (also referred to herein as "safety module") coupled between the inputs and/or outputs of power converter 201. According to some aspects, bypass circuit 209 may be coupled to the inputs a and b of power device 200. According to some aspects, bypass circuit 209 may be coupled to the outputs c and d of power device 200. In the illustrative power device 200 shown in FIG. 2, a first bypass circuit 209 may be connected between the inputs a and b to power device 200 (e.g. bypass circuit 209a as shown in FIG. 2A), and a second bypass circuit 209 (e.g., bypass circuit 209b as shown in FIG. 2B) may be connected between the outputs c and d of power device 200. Bypass circuit 209 may be controlled by controller 204. If an unsafe condition, malfunction and/or underperformance condition is detected, according to some aspects, controller 204 may enable bypass circuit 209, bypassing the inputs a and b to power device 200. Bypass circuit 209 may bypass the inputs a and b to power device 200 by short circuiting the outputs c and d and/or short circuiting the inputs a and b. According to some aspects, bypass circuit 209 may disconnect an input, a or b of power device 200 from the outputs c and d of power device 200 and short circuit the outputs c and d of power device 200.

According to some aspects, bypass circuit 209 may be integrated in power converter 201. For example, power converter 201 may have multiple switches (e.g., metal-oxide-semiconductor field-effect transistors (MOSFETs) such as shown in FIG. 2B) that may be used for power conversion under safe conditions, and may short circuit either the inputs or outputs of power converter 201 under unsafe conditions such as a malfunction condition or an underproduction condition. According to some aspects, bypass circuit 209 may provide bidirectional bypass functionality, while also allowing a regulated voltage for controlling switches of power converter 201.

Reference is made to FIG. 2A, which illustrates circuitry that may be included in bypass circuit 209a. FIG. 2 illustrates two bypasses 209 as part of power device 200, and in series with power converter 201. According to some aspects, a bypass circuit 209a may be in parallel to the power device. Bypass circuit 209a may have a first input A and a second input B, where inputs A and B may be connected to a power string, for example, as part of PV string 103 of FIG. 1T. Bypass circuit 209a may include a diode bridge 250 including diodes DB1-DB4. A switch (e.g., MOSFET) QB1 may be connected between the output nodes C and D of the diode bridge 250 in bypass circuit 209a. According to some aspects, power systems supported by embodiments herein, a string current $I_{string}$ may be in DC form. For example, bypass circuit 209a may be coupled to a power converter connected to a battery, where the battery may be charged (resulting in current flow from node A to node B) and discharged (resulting in current flow from node B to node A). When $I_{string}$ is flowing from point A to point B, $I_{string}$ may enter bypass circuit 209a, flow through DB2 and reach switch QB1. When bypass circuit 209a is disabled, switch QB1 is OFF, bypass circuit 209a may effectively operate as an open circuit, and the string current $I_{string}$ may flow through and be processed by a power converter (e.g., a micro-inverter) coupled in parallel with bypass circuit 209a (not explicitly shown in FIG. 2A, but shown in FIG. 3). When bypass circuit 209a is enabled, switch QB1 is ON and $I_{string}$ flows through switch QB1 and diode DB4, out of bypass circuit 209a to point B. In some scenarios (e.g. discharging a battery), $I_{string}$ may flow from point B to point A. $I_{string}$ may enter bypass circuit 209a and flow through diode DB1 and reach switch QB1. When bypass circuit 209a is disabled, switch QB1 is OFF and bypass circuit 209a is an open circuit. When bypass circuit 209a is enabled, switch QB1 is ON and $I_{string}$ may flow through switch QB1 and diode DB3, out of bypass circuit 209a to point A.

According to some aspects, $I_{string}$ may be in an AC form (e.g., when power converter 201 is a DC/AC converter), and the $I_{string}$ current may flow from A to B during a first part of a cycle and from B to A during a second part of the cycle. In each flow direction of $I_{string}$, because of the diode bridge 250 in bypass circuit 209a, the voltage $V_{B+}$ may be larger than $V_{B-}$ which may prevent any current from flowing through the passive diode in switch QB1. Because of the diode bridge 250 in bypass circuit 209a, the voltage on switch QB1 may be positive ($V_{B+}-V_{B-}>0$). Because the positive voltage across switch QB1 may always be positive, the voltage drop across switch QB1 may be provided to a controller (e.g. an analog or digital controller) configured to drive switch QB1 to provide a bypass path, according to illustrative features disclosed below.

Reference is now made to FIG. 2B, which illustrates bypass circuit 209b, where the inputs of bypass circuit 209b are connected to a string, for example PV string 103 of FIG. 1T. Bypass circuit 209b may have a MOSFET bridge 260 including MOSFETs QB2-QB5. The outputs of the MOSFET bridge 260 in bypass circuit 209b may be connected with a switch QB1 between them. According to some aspects, $I_{string}$ may be in DC form. In a scenario where $I_{string}$ is flowing from point A to point B, $I_{string}$ may enter bypass circuit 209b, flow through QB4 (which may be ON or OFF) and reach switch QB1. When bypass circuit 209b is disabled, MOSFET QB1 may be OFF and bypass circuit 209b may be an open circuit. When bypass circuit 209b is enabled, switch QB1 is ON and $I_{string}$ may flow through switch QB1 and MOSFET QB2 (which may be ON or OFF), and may flow through bypass circuit 209b to point B. In some scenarios, $I_{string}$ may flow from point B to point A. $I_{string}$ may enter bypass circuit 209b and flow through switch QB3 (that may be ON or OFF) and reach switch QB1. When bypass circuit 209b is disabled, switch QB1 may be OFF and bypass circuit 209b may be an open circuit. When bypass circuit 209b is enabled, switch QB1 may be ON and $I_{string}$ may flow through switch QB1 and MOSFET QB5 (that may be ON or OFF) through bypass circuit 209b to point A. According to some aspects, $I_{string}$ may be in an AC form and the $I_{string}$ current may flow from A to B during a first part of a cycle and from B to A during a second part of the cycle. In each direction of $I_{string}$, because of the MOSFET bridge 260 in bypass circuit 209b, the voltage level $V_{B+}$ may be larger than voltage level $V_{B-}$ which may prevent substantial current from flowing through the passive diode in MOSFET QB1. Because of the MOSFET bridge 260 in bypass circuit 209b, the voltage on MOSFET QB1 may be positive ($V_{B+}-V_{B-}>0$). Each one of MOSFETs QB2-QB5 may be ON or OFF when bypass circuit 209b is enabled and/or disabled, where when MOSFETs QB2-QB5 are OFF current may flow through the passive diodes in MOSFETs QB2-QB5, and when MOSFETs QB2-QB5 are ON the current may flow through the MOSFETs themselves. MOSFETs QB1-QB5 may be powered by an external auxiliary power circuit such as auxiliary power circuit 207 of FIG. 2.

According to some aspects, MOSFETs QB2-QB5 of bypass circuit 209b may be part of an inverter (e.g., a microinverter). For example, power converter 201 of FIG. 2 may be an inverter. When bypass circuit 209b is disabled, switches QB2-QB5 may be switched at an inverter frequency (e.g., 10 kHz, 20 kHz, 100 kHz, 200 kHz or even higher) and switch QB1 may be OFF. When bypass circuit 209b is enabled, switches QB2-QB5 may switch at a frequency of a grid-frequency of current flowing through $I_{string}$ (e.g., 50 Hz or 60 Hz) and switch QB1 may be ON, short-circuiting outputs C and D. According to some aspects, bypass circuit 209b may be connected in parallel to a power device, where when bypass circuit 209b is disabled switch QB1 is OFF and $I_{string}$ may flow through the power device parallel to bypass circuit 209b. When switch QB1 is ON and bypass circuit 209b is enabled, the outputs of power device parallel to bypass circuit 209b (which may be the same as points A and B) may be short-circuited, allowing the current $I_{string}$ to flow through bypass circuit 209b and bypass the power device.

Figure 2C:
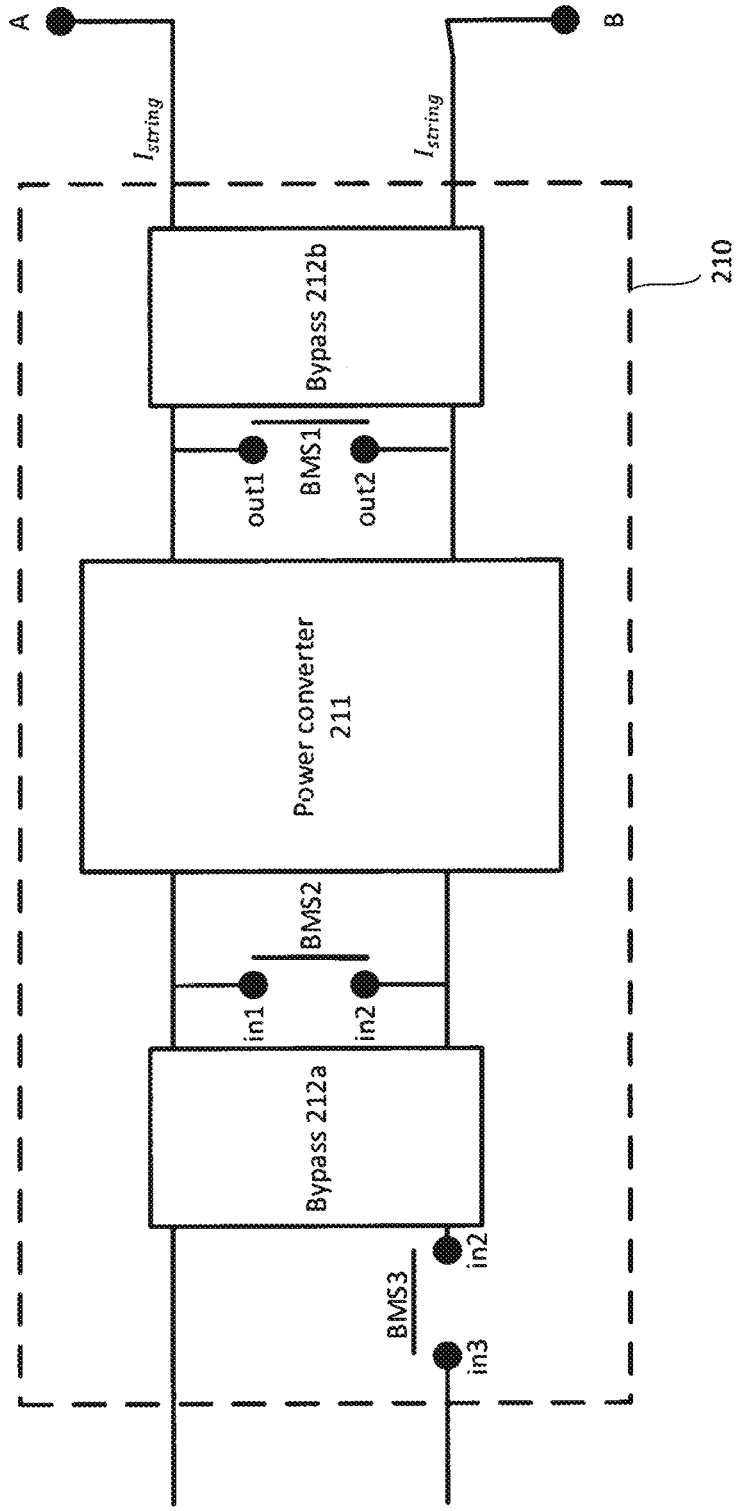
FIG. 2C is a block diagram of part of a power device, according to one or more illustrative embodiments.

Reference is now made to FIG. 2C, which shows part of a power device 210 according to one or more illustrative aspects of the present disclosure. Power device 210 may include power converter 211, which may be the same as power converter 201 of FIG. 2. According to some aspects, power device 212 may have a bypass circuit 212a configured to bypass the inputs of power device 210. Bypass circuit 212a may be configured to provide a bypass path across the outputs of power device 210 and/or disconnect an input of power device 210 from the outputs of power device 210. According to some aspects, power device 210 may have a bypass circuit 212b configured to bypass power device 210 and/or power converter 211. Bypass circuit 212b may be configured to provide a bypass path by short circuiting the outputs of power device 210.

According to some aspects, bypass circuit 212b may be coupled to a bypass circuit having a bimetallic strip BMS1. Bimetallic strip BMS1 may include two materials with different expansion coefficients bonded together. Bimetallic switch BMS1 may operate as a switch, such that when BMS1 is heated at a first temperature, the first material including BMS1 may curve in a first direction and at a second temperature the second material including BMS1 may curve in a second direction. For example, the first material may curve at a first temperature of 40° C. and the second material may curve at a second temperature of 200° C. BMS1 may be configured to short circuit the outputs of power device 212 out1 and out2 in response to a state of overheating (for example, when the temperature surrounding BMS1 is over 200° C.) and to disconnect outputs out1 and out2 when the temperature is beneath 200° C. The coupling of bypass circuit 212b with BMS1 may be such that BMS1 is positioned in proximity to a certain element in bypass circuit 212b (e.g., MOSFET or diode). The proximity of BMS1 to bypass circuit 212b may be such that BMS1 may sense a temperature level similar to the certain element in bypass circuit 212b. When bypass circuit 212b is enabled and current is flowing through bypass circuit 212b the temperature of certain elements may rise, and in a state of overheating, BMS1 may be configured to switch ON, creating another path for the current to flow through other than bypass circuit 212b, which may lower the temperature at the element of bypass circuit 212b. According to some aspects, power device 210 may have a bypass circuit 212a. According to some embodiments, bypass circuit 212a may be configured to short circuit the outputs of power device 210. Parallel to bypass circuit 212a may be a bimetallic switch BMS2. BMS2 may be similar to or the same as BMS1, where BMS1 may be placed between the outputs of power device 210 out1 and out2 and BMS2 may be placed between the inputs of power device 210 in1 and in2. BMS2 may be positioned in proximity to a certain element in bypass circuit 212a (e.g., MOSFET). The proximity of BMS2 to bypass circuit 212a may be such that BMS2 may sense a temperature level similar to the certain element in bypass circuit 212a. When bypass circuit 212a is enabled and current is flowing through bypass circuit 212a, the temperature of certain elements (e.g. a switch QB1) may rise, and in a state of possible or potential overheating, BMS2 may be configured to switch ON, creating another path for the current to flow through, which may lower the temperature in bypass circuit 212b. According to some aspects BMS3 may be coupled to the certain element in bypass circuit 212a.

According to some aspects, power device 210 may include bypass circuit 212*a*. A bimetallic strip BMS3 may be coupled to bypass circuit 212*a*. BMS3 may be similar to BMS1, where BMS1 may be placed between the outputs of power device 210 out1 and out2 and BMS3 may be placed between the low side of the inputs of power device 210, node in3, and power converter 211 low side, node in2. According to some aspects, BMS3 may be positioned in proximity to a certain element of bypass circuit 212*a*. In a scenario where bypass circuit 212*a* is enabled, and the inputs to power device 210 are short circuited, the temperature of the certain element in bypass circuit 212*a* may rise. BMS3 may be "normally ON" during normal operating conditions, and configured to create an open circuit and mechanically disconnect an input of power device 210 from the outputs of power device 210 which may lower the current flowing through bypass circuit 212*a* and specifically the certain element in bypass circuit 212*a*, and by lowering the current the temperature on the certain element may drop. According to some aspects, power device 210 may have only a bypass circuit including BMS1. According to some aspects, power device 210 may have a bypass circuit including BMS2. According to some aspects, power device 210 may have a bypass circuit BMS3. According to some aspects, power device 210 may have a bypass circuit including more than one bimetallic switch, such as BMS2 and BMS3.

Bimetallic switches BMS1 and/or BMS2 and/or BMS3 may be used as a primary bypass mechanism of power device 210, or as a backup bypass mechanism while the primary backup mechanism may be similar to or the same as bypass circuit 209*a* of FIG. 2A and/or 209*b* of FIG. 2B, where backup bypass mechanism may be needed in a scenario where the primary bypass circuit fails, overheats, etc.

According to some aspects, one or more of bimetallic switches BMS1-BMS3, may be replaced with an active electronic switch, for example, a metal-oxide-semiconductor field-effect transistor (MOSFET), insulated-gate bipolar transistor (IGBT), Bipolar Junction Transistor (BJT), relay switch etc. According to some aspects, BMS1 and/or BMS2 may be replaced with a passive switch, for example, a diode.

Reference is made again to FIG. 2. According to some aspects, power device 200 may have bypass circuit 209 coupled to the outputs of power device 200. Bypass circuit 209 may have a bypass circuit similar to or the same as bypass circuit 209*a* of FIG. 2A and/or bypass circuit 209*b* of FIG. 2B. In some embodiment, bypass circuit 209 may have a bimetallic strip similar to or the same as bimetallic strip BMS1 of FIG. 2C.

Reference is made again to FIG. 2. According to some aspects, power device 200 may have bypass circuit 209 coupled to the inputs of power device 200. Bypass circuit 209 may have a bypass circuit similar to or the same as bypass circuit 209*a* of FIG. 2A and/or bypass circuit 209*b* of FIG. 2B. In some embodiment, bypass circuit 209 may have a bimetallic strip similar to or the same as bimetallic strip BMS2 of FIG. 2C.

Figure 3:
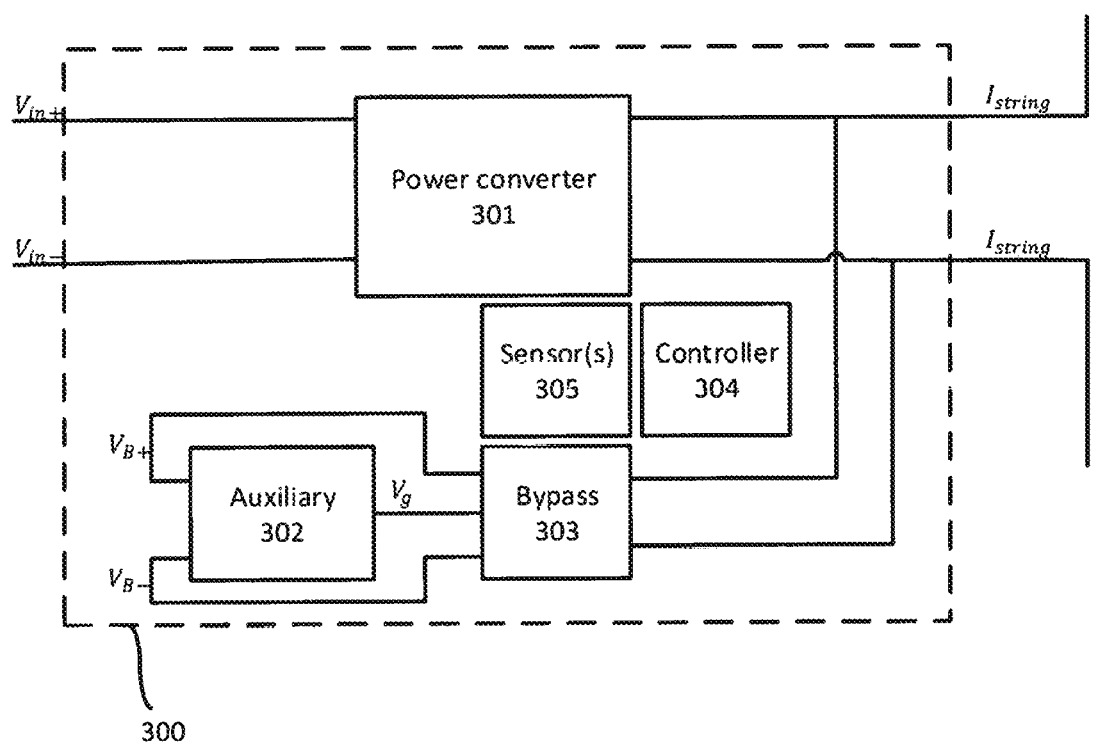
FIG. 3 is a part schematic, part block diagram of a power device, according to one or more illustrative embodiments.

Reference is now made to FIG. 3, which shows a block diagram of part of a power device 300, according to aspects of illustrative embodiments. Power device 300 may be the same as or similar to power device 200 of FIG. 2, and may include power converter 301, auxiliary power circuit 302, bypass circuit 303, controller 304, and sensor(s)/sensor interface(s) 305, which may be similar to or the same as power converter 201, auxiliary power circuit 207, bypass circuit 209, controller 204, and sensor(s)/sensor interface(s) 203, respectively. Controller 304 may be operatively connected to sensor(s)/sensor interface(s) 305, whereby sensor(s)/sensor interface(s) 305 may be operatively connected, to sense parameters of power device 300. Power converter 301 converts input power on terminals $V_{in+}$, $V_{in-}$ to an output power on the output of converter 301 as string current $I_{string}$. Bypass 303 may be connected across the output of converter 301. Power to operate bypass 303 as well as power converter 301, controller 304 and/or sensor(s)/sensor interface(s) 305 may be provided by auxiliary power circuit 302.

According to some aspects, controller 304 may receive a value of a parameter measured by sensor(s)/sensor interface(s) 305, for example temperature, voltage and/or current. Controller 304 may compare the value of the measured parameter with a maximum threshold and determine the value of the measured parameter as an unsafe value (e.g., a temperature indicative of overheating of the system, such as 200° C.). Controller 304 may enable bypass circuit 303 in response to determining that there is a malfunction and/or underproduction condition in power device 300. Bypass circuit 303 may short circuit the outputs of power converter 301 and/or outputs of power device 300. According to some aspects, bypass circuit 303 may be powered by auxiliary power circuit 302 with an output voltage of $V_g$. The output voltage of auxiliary power circuit 302 may be determined by controller 304, while controller 304 may further determine which switches in bypass circuit 303 to turn ON and OFF and when to turn ON and OFF. Auxiliary power circuit 302 may have an input voltage of $V_{AUX}=V_{B+}-V_{B-}$, where $V_{B+}$ and $V_{B-}$ may be according to the voltage value at the output of bypass circuit 303.

According to some aspects (not explicitly shown), power converter 301 may include an inverter, which may include a MOSFET bridge (e.g. bridge 260 of FIG. 2B). Power converter 301 may serve as a power converter and/or inverter when power device 300 is enabled and providing power to a solar string having current $I_{string}$. When power device is being bypassed, power converter 301 may serve as the bypass circuit. In an embodiment where power converter 301 serves as a bypass circuit, power converter 301 may include a switch positioned between the two outputs of the MOSFET bridge (e.g. QB1 of FIG. 2B) in power converter 301. The switch positioned between the two outputs of the MOSFET bridge may be ON when bypass is enabled and maybe OFF when bypass is disabled.

Figure 3A:
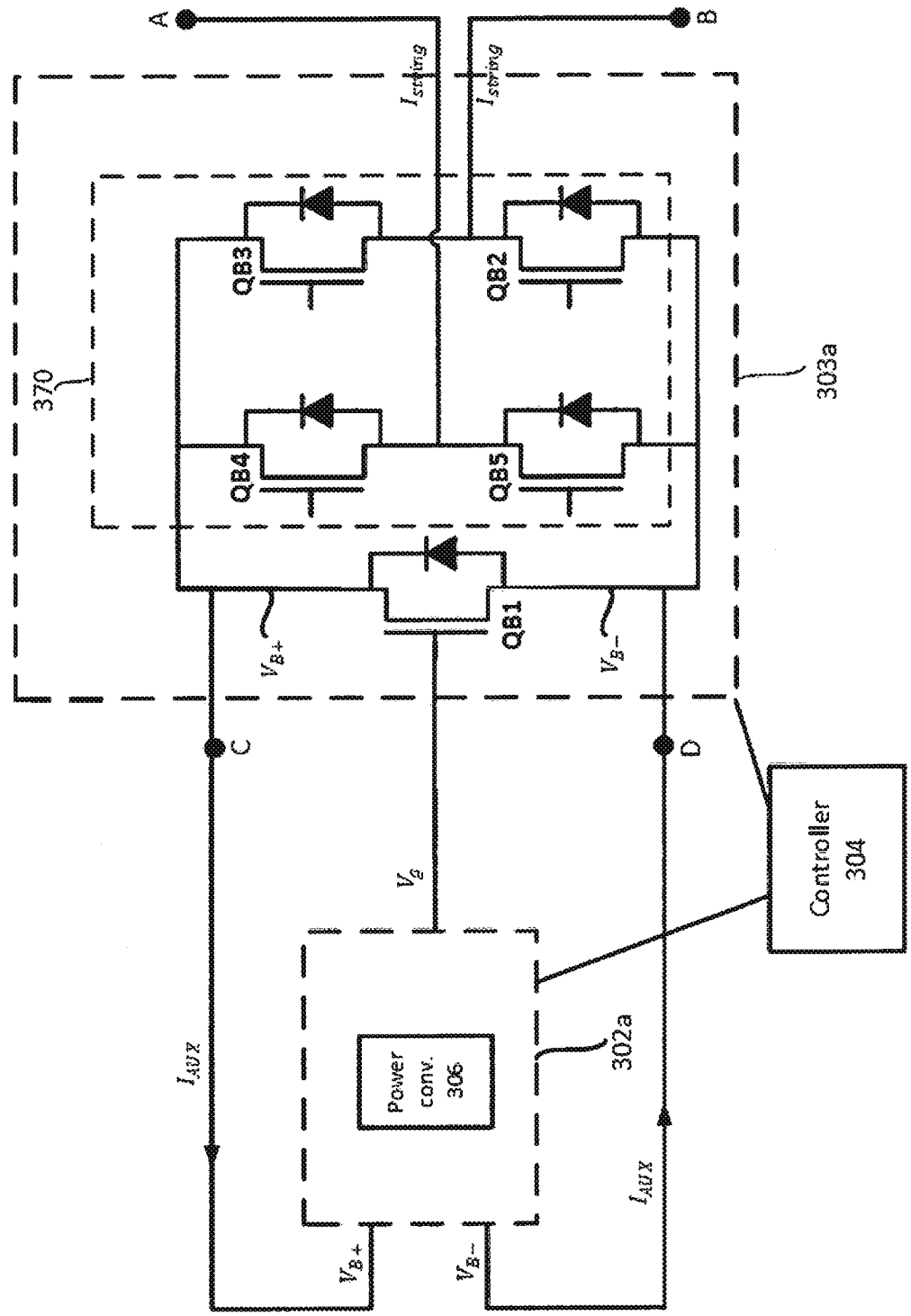
FIG. 3A is a part schematic, part block diagram of an auxiliary power circuit connected to a bypass circuit, according to one or more illustrative embodiments.

Reference is now made to FIG. 3A, which shows an illustration of an auxiliary power circuit 302*a*, bypass circuit 303*a* and controller 304 as part of a power device. Auxiliary power circuit 302*a* and bypass circuit 303*a* may be the same as or similar to auxiliary power circuit 302 and bypass circuit 303 of FIG. 3. Controller 304 may receive a signal indicating the bypass circuit 303*a* should be enabled, or controller 304 may independently determine that bypass circuit 303*a* should be enabled. Bypass circuit 303*a* may be implemented in a similar way to bypass circuit 209*b*, including a bridge 370 of switches (e.g. MOSFETs) QB2-QB5 where the outputs of the bridge 370 (nodes C and D), are coupled to each other via switch (e.g. MOSFET) QB1. A first input to auxiliary power circuit 302*a* may electrically couple to a first output of bypass circuit 303*a* (node C) which may be coupled to the source terminal of switch QB1. A second input to auxiliary power circuit 302*a* may electrically couple to a second output of bypass circuit 303*a* (node D) which may be coupled to the drain terminal of switch QB1. Auxiliary power circuit 302*a* may include a power converter 306. Power converter 306 may be an AC/DC converter and/or a DC/DC converter. Power converter 306 may be configured to convert power from a lower voltage level e.g. 0.01[V] to a higher voltage level (e.g., 5 V, 12 V, 100 V, 220 V, and higher). The power at the outputs of bypass circuit 303a may have a voltage value of $V_{B+}-V_{B-}$ that may be the same voltage on the inputs to auxiliary power circuit 302a. The input power to auxiliary power circuit 302a may be converted by power converter 306 and may be output by auxiliary power circuit 302a. Auxiliary power circuit 302a may be configured to provide power to one or more circuits and/or mechanisms in the power device, such as controller 304 and switches QB1-QB5 of bypass circuit 303a. Controller 304 may be configured to determine how much power to feed each switch of switches QB1-QB5. For example, $I_{string}$ may be an AC current with a value of: $I_{string}$=10[A] at a frequency of: f=40 [Hz] and may flow into a first input of bypass circuit 303a. Bypass circuit 303a may be disabled, switch QB1 may be OFF, and auxiliary power circuit 302a may draw power from the outputs of bypass circuit 302b having a voltage value of, for example, $V=V_{B+}-V_{B-}$=0.5[V]. Auxiliary power circuit 302a may draw current according to the voltage required by switches QB1-QB5 (as determined by controller 304). Auxiliary power circuit 302a may output a voltage value of $V_g$ with regard to a neutral point, ground or other point. According to some aspects, controller 304 may switch switches QB2-QB5 at a frequency of f=50 [Hz], such that switches QB4 and QB2 are ON when QB3 and QB5 are OFF, and switches QB2 and QB4 are OFF when QB3 and QB5 are ON. Auxiliary power circuit 302a may draw current from bypass circuit 303a with a value of, for example, $I_{AUX}$=0.01 [A]. The current $I_{AUX}$ may be used to power controller 304 as well as auxiliary 302a and bypass circuit 303a. According to some aspects, auxiliary power circuit 302a may include a controller configured to control the switching of switches QB1-QB5. In a scenario where controller 304 decides to enable bypass circuit 303a, switches QB2-QB5 may be powered and switched at the same rate as when bypass circuit 303a is disabled. The voltage value of $V=V_{B+}-V_{B-}$ may change because QB1 may be turned ON, creating a voltage drop depending on characteristics (e.g., the drain-to-source resistance) of switch QB1, for example, $V=V_{B+}-V_{B-}$=0.1V. Power converter 306 in auxiliary power circuit 302a may be configured to convert input ultra-low voltages such as 0.1V or even lower. When controller 304 enables bypass circuit 303a and commands auxiliary power circuit 302a to turn switch QB1 ON, $I_{AUX}$ may grow accordingly to $I_{AUX}$=0.05 A, to supply enough power to turn switch QB1 ON.

Figure 3B:
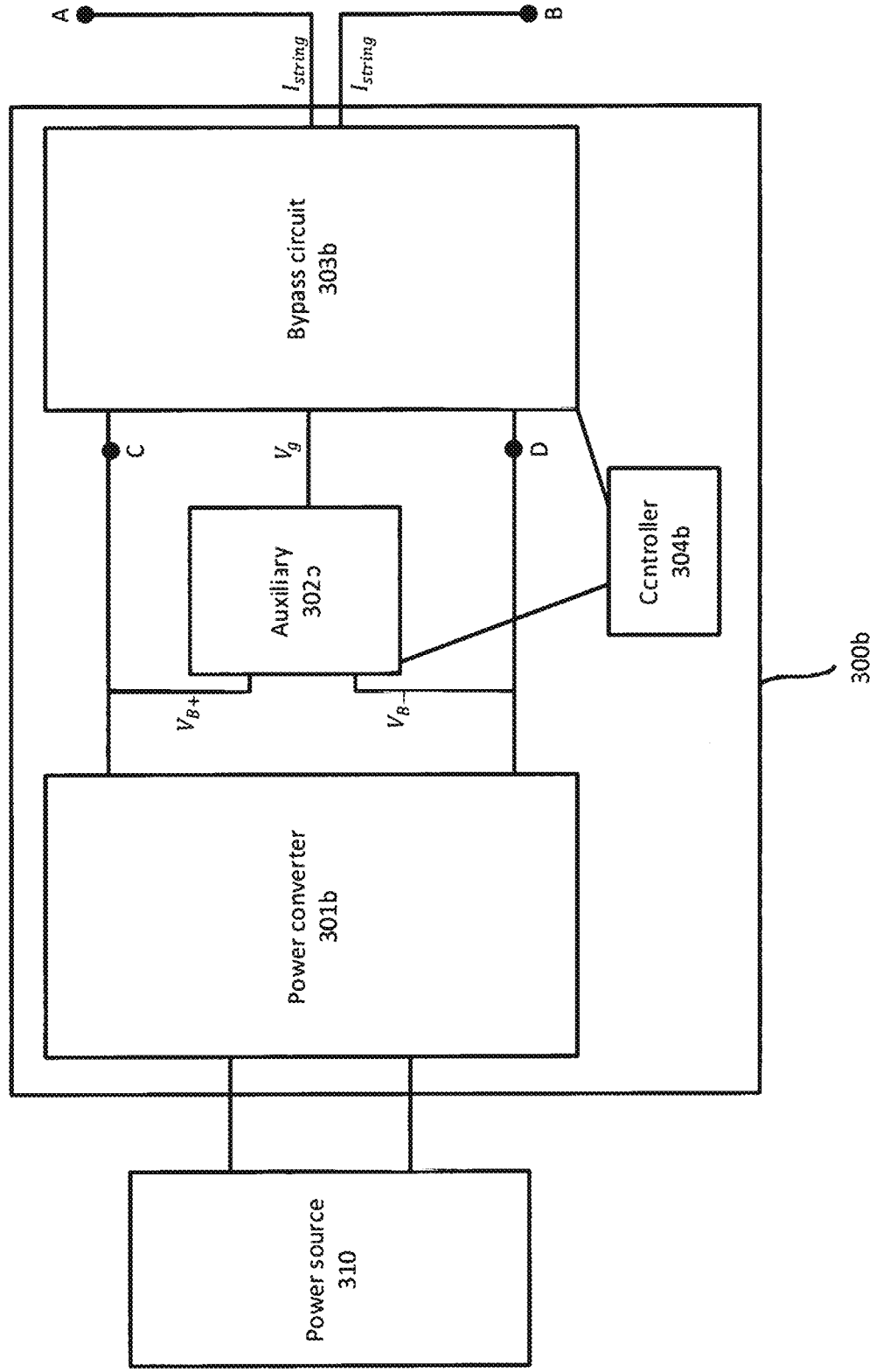
FIG. 3B is a part schematic, part block diagram of a power device, according to one or more illustrative embodiments.

Reference is now made to FIG. 3B, which shows part of power device 300b according to illustrative embodiments. Power device 300b may include power converter 301b, auxiliary power circuit 302b and controller 304b which may be the same as or similar to power converter 201, auxiliary power circuit 207 and controller 204 of FIG. 2. According to some aspects, power device 300b may be coupled to power source 310. Power source 310 may be a source which at times provides power and at times receives power, for example a battery. According to some aspects, $I_{string}$ may be in DC form during each period of time. When power source 310 is providing power, the current $I_{string}$ may flow from A to B and when power source 310 is receiving power, $I_{string}$ may flow from B to A. In an embodiment where $I_{string}$ is in DC form, power converter 301b may be a DC/DC converter. Power device 300b may have a bypass circuit 303b configured to bypass power converter 301b and/or power source 310. Bypass circuit 303b may be a component of power device 300b or power converter 301b or an independent device configured to couple to the outputs of power device 300b or power converter 301b.

Figure 3C:
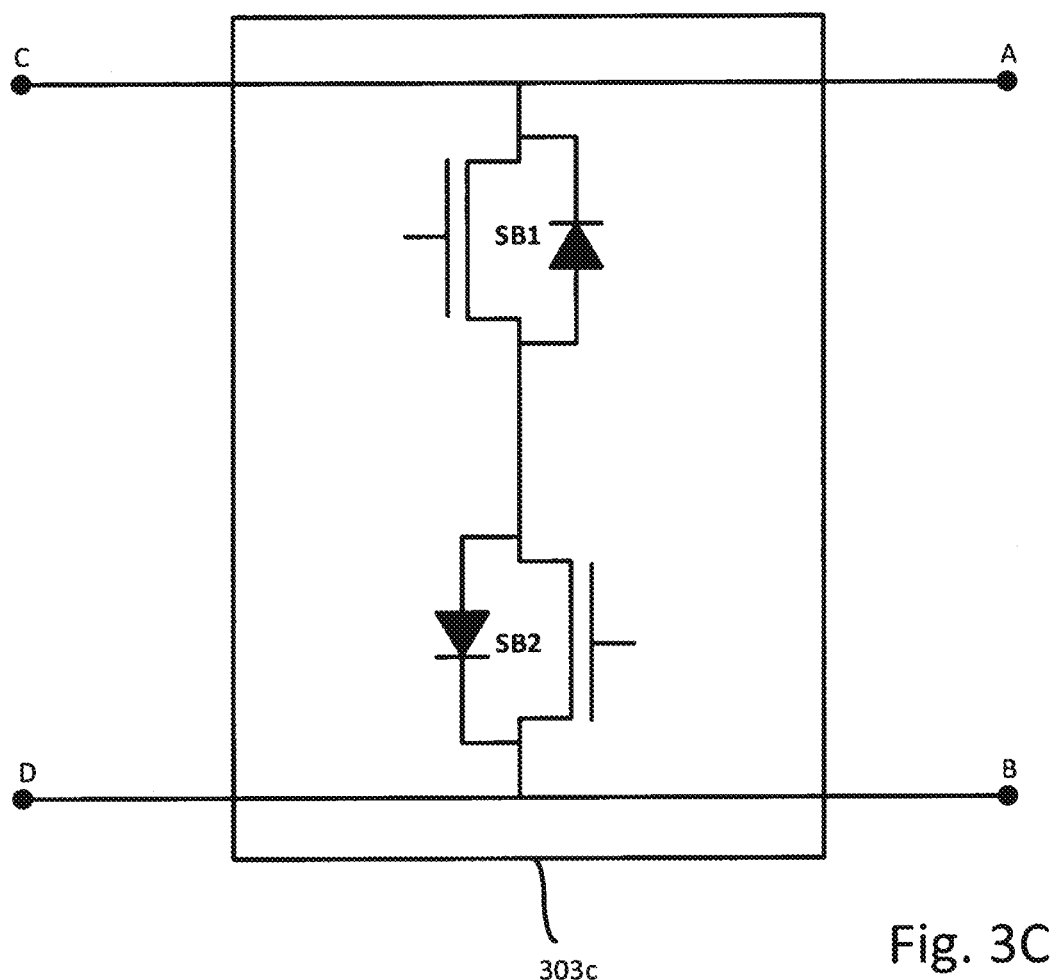
FIG. 3C is a schematic of a bypass circuit, according to one or more illustrative embodiments.

Reference is now made to FIG. 3C, which shows a bypass circuit according to illustrative embodiments. Bypass circuit 303b of FIG. 3B may be implemented similarly to bypass circuit 303c of FIG. 3C, having a first switch SB1 and a second switch SB2 connected in series. Switches SB1 and SB2 may be coupled to outputs A and B, and nodes C and D may be coupled to the outputs of power converter 301b. Bypass circuit 303b may be configured to turn switches SB1 and SB2 ON when bypass circuit 303b is enabled, and turn switches SB1 and SB2 OFF when bypass 303b is disabled. Bypass circuit 303b may receive power from auxiliary power circuit 302b. Controller 304b may be configured to decide to enable bypass circuit 303b and/or disable bypass circuit 303b. When bypass circuit 303b is disabled and power device 300b is transferring power from power source 310 to the outputs A and B of power device 300b or transferring power from outputs A and B of power device 300b to power source 310, the voltage drop across bypass circuit 303b may be the same as or similar to the voltage between points A and B, for example, 40[V]. Auxiliary power circuit 302b may have the same or a similar voltage as bypass circuit 302b, and may transfer power to components in power device 300b, such as controller 304b. When bypass circuit 303b is enabled, outputs A and B are short circuited using switches SB1 and SB2. The voltage between points A and B may drop to 1[V]. The voltage across auxiliary power circuit 302b may drop accordingly. Auxiliary power circuit 302b may be configured to transfer power under low voltages to bypass circuit 303b.

According to some aspects, $I_{string}$ may be in AC form. Bypass circuit 303b may be implemented in a manner the same as or similar to bypass circuit 303a. Power converter 301b may be a DC/AC inverter. When bypass circuit 303b is disabled, switch QB1 (of FIG. 3A) may be OFF and power converter 301b may receive $I_{string}$ from outputs of power device 300b, A and B. Switches QB4 and QB2 may be ON, powered by auxiliary power circuit 302b. When bypass circuit 303b is enabled, switch QB1 may turned ON by controller 304b and auxiliary power circuit 302b.

Figure 4:
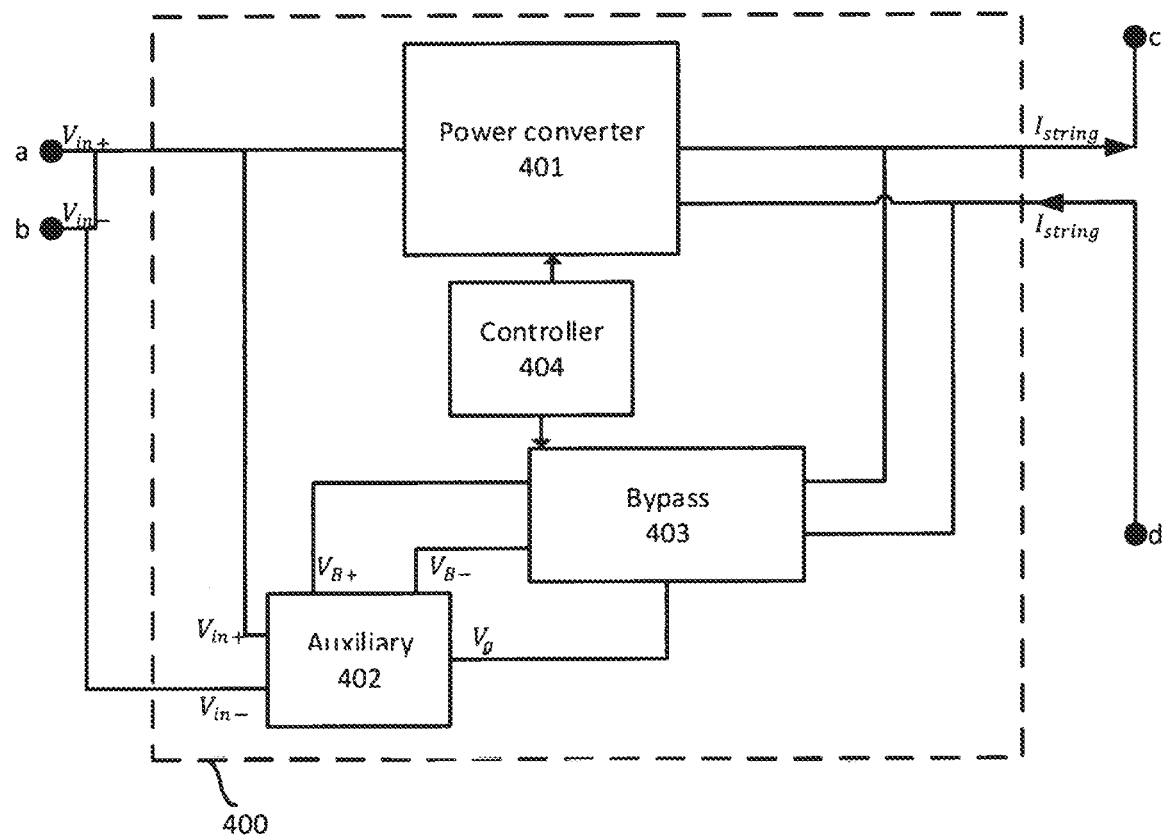
FIG. 4 is a part schematic, part block diagram of a power device, according to one or more illustrative embodiments.

Reference is now made to FIG. 4, which illustrates part of a power device 400 according to illustrative embodiments. Power device 400 may include power converter 401, auxiliary power circuit 402, bypass circuit 403, and controller 404 that may be the same as or similar to power converter 201, auxiliary power circuit 207, bypass circuit 209, nodes a, b, c, d and controller 204 of FIG. 2, respectively. Bypass circuit 403 may be coupled to the outputs of power device 400 and/or the outputs of power converter 401 and may be configured to bypass power converter 401.

According to some aspects, auxiliary power circuit 402 may receive power from the inputs to power device 400, a and b, with a voltage value of: $V_{in}=V_{in+}-V_{in-}$. Power may be transferred from a power generator (e.g., power generator 101 of FIG. 1) to the inputs a and b of power device 400, at a voltage value of $V_{in}$, and the power may flow from a power generator such as power generator 101 of FIG. 1A. Auxiliary power circuit 402 may be electrically coupled to the outputs of bypass circuit 403, and may receive power from bypass circuit 403 with at voltage value of $V_B=V_{B+}-V_{B-}$. According to some aspects, auxiliary power circuit 402 may extract power from the inputs to power device 400, A and B, rather than from the outputs of bypass circuit 403 that receives power from the outputs of power device 400, c and d, for example, if the current $I_{string}$ is in AC form while auxiliary power circuit requires current and voltage in DC form. According to some aspects, auxiliary power circuit 402 may receive power from the inputs to power device 400, controller 404 may disable bypass circuit 403, for example, bypass circuit 403 may qcomprise multiple MOSFETs (i.e., as shown in bypass circuit 209b of FIG. 2A), and controller 404 may keep the MOSFETs OFF and not switch them ON and OFF.

In some scenarios, auxiliary power circuit 402 might not be able to receive power from the inputs to power device 400, for example, if the power generator configured to output power to power device 400 through the inputs of power device 400 is disconnected from power device 400. In such a scenario (e.g., where power from the inputs to power device 400 is not available), auxiliary power circuit 402 may be powered by power from the outputs of bypass circuit 403. According to some aspects, auxiliary power circuit 402 may have a logic block (e.g., circuit 410 shown in FIG. 4A) configured to extract power from the inputs of power device 400 or from bypass circuit 403.

Figure 4A:
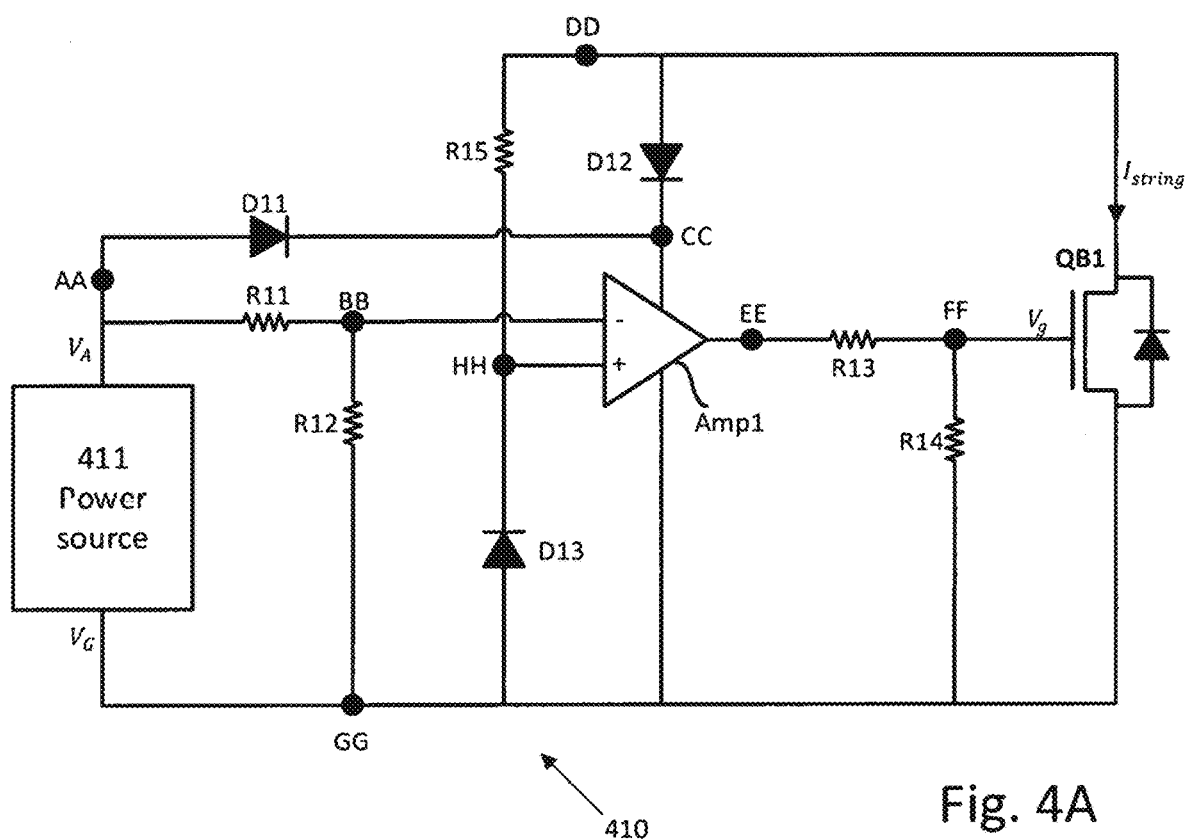
FIG. 4A is a schematic diagram of selection circuit configured to activate bypass, according to one or more illustrative embodiments.

Reference is now made to FIG. 4A, which illustrates a circuit 410 configured to disable and enable a bypass circuit. Circuit 410 may be part of a power device, such as power device 400. The bypass circuit may be enabled when a switch QB1 is ON and disabled when switch QB1 is OFF. Switch QB1 may be the same as or similar to switch QB1 of FIG. 3A. Switch QB1 may be a MOSFET disposed between points DD and GG. Switch QB1 may be configured to bypass a power source 411 and/or a power device including circuit 410. Power source 411 may have a first output AA and a second output point GG. Point GG may be used as a reference point in circuit 410 and may be referenced to as a relative ground. Circuit 410 may have a resistor R11 disposed between output AA and a point BB. Point BB may be an input to an amplifier Amp1. Amplifier Amp1 may have a negative input and a positive input. Point BB may be at the negative input to amplifier Amp1. The positive input to amplifier Amp1 may be point H. Between points HH and GG may be a diode D13 configured to allow current to flow from GG to H and to apply a set voltage (e.g., 0.3V, 0.5V, 0.7V, 1V) difference between GG and H, setting a reference voltage on the positive input to amplifier Amp1. Resistor R12 may be disposed between points BB and GG. Resistors R11 and R12 may be configured to function as voltage divider in relation to the voltage of power source 411, $V_A$-$V_G$. Amplifier Amp1 may have a first output at point EE. Switch QB1 may have a drain terminal connected to point DD, a source terminal connected to point GG and a gate terminal connected to point FF. Resistor R13 may be disposed between points EE and FF and resistor R14 may be disposed between points FF and GG. $V_g$ may be the voltage at point FF, where it may be defined by the output voltage from amplifier Amp1. $V_g$ may be the voltage at the gate to switch QB1. Point CC may be the positive power supply on amplifier Amp1 and point GG may be the negative power supply on amplifier Amp1. Resistor R15 may be disposed between points HH and DD. Between point CC and DD may be a diode D12 configured to set a voltage difference between point CC and point DD. A second diode D11 may be disposed between points AA and CC.

Amplifier Amp1 may be connected between terminals CC and GG for receiving operational power from power source 411 via diode D11 or from the voltage across switch QB1, via diode D12. According to the illustration of FIG. 4A, if the voltage across power source 411 is higher than the voltage across switch QB1, the operational power for amplifier Amp1 will be drawn from power source 411, and if the voltage across power source 411 is lower than the voltage across switch QB1, the operational power for amplifier Amp1 will be drawn from across switch QB1. This may provide the advantage of enabling power supply from power source 411 if power source 411 is available (which may increase efficiency), and enabling power supply from across switch QB1 if power source 411 is unavailable (e.g., if power source 411 is a disconnected or malfunctioning power source, or a shaded photovoltaic generator).

Optionally, diodes D12 and D11 may be removed, and terminal CC may be directly connected to terminal DD (enabling drawing operational power to amplifier Amp1 from across switch QB1) or to terminal AA (enabling drawing operational power to amplifier Amp1 from power source 411).

Figure 4B:
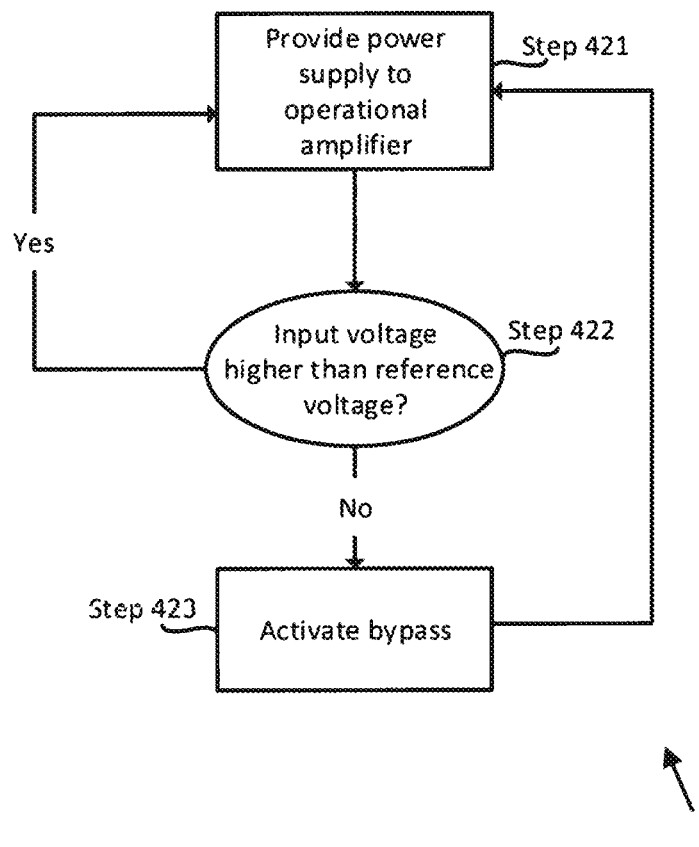
FIG. 4B shows a flow chart of a method for activating a bypass switch, according to one or more illustrative embodiments.

Reference is now made to FIG. 4B, which shows a method 420 for enabling bypass according to illustrative embodiments. Method 420 may be implemented by one or more circuits, analog and/or digital, for example circuit 410 of FIG. 4A. Step 420 may include providing power to an amplifier and/or an operational amplifier (e.g., Amp1 of FIG. 4A). The operational amplifier may have a positive power supply, and a negative power supply. According to some aspects, the positive power supply may be equal to the absolute value of the negative power supply. According to some aspects, the positive power supply may be different than the absolute value of the negative power supply, for example, the positive power supply may be 1[V] compared to a relative ground and the negative power supply may be 0[V] compared to the relative ground. The negative power supply may be connected to the negative end of a power source. The negative end of the power source may be related to as a relative ground. The positive power supply may draw power from a node common to a first diode and a second diode. The first diode (e.g. D11 of FIG. 4A) may be connected to the output of the power source, and the second diode (e.g. D11 of FIG. 4A) may be connected to the positive side of a switch configured to enable bypass when ON and disable bypass when OFF (e.g. QB1 of FIG. 4A). The switch may be a MOSFET where the drain may be a positive side of the switch, and the source of the switch may be the negative side of the switch. The positive power supply of the amplifier may get the voltage value of the higher voltage between the power source and the positive side of the switch.

Step 422 of method 420 may include inputting a first voltage into the negative input of the operational amplifier and a second voltage to the positive input of the operational amplifier. The positive voltage may be related to as a reference voltage. The reference voltage may be connected to the relative ground with a diode (e.g. D13 of FIG. 4A). The diode may be configured to maintain a set voltage relative to the ground. The positive input to the amplifier may be connected to the positive end of the power source through a voltage divider (e.g. R11 and R12 of FIG. 4A), to maintain a voltage level appropriate to the voltage levels that the operational amplifier may receive. The operational amplifier may be configured to compare the voltage level received from the positive end of the power source with the reference voltage. The voltage level need for the negative input to be greater than the reference positive input may be determined by the voltage divider connecting the positive end of the power source with the negative input to the amplifier, and the diode connecting the relative ground and the positive input. In a scenario where the negative input is greater than the positive input, the operational amplifier may output a voltage value similar to the relative ground. The output of the amplifier may be connected to the relative ground with two resistors in series (e.g. R13 and R14 of FIG. 4A). The switch configured to enable bypass may have a gate connected to a point between the two resistors in series, where the two resistors may be configured to be a voltage divider. In such a scenario, where the output voltage of the amplifier is the similar to the relative ground, the voltage difference between the output of the amplifier, the voltage in between the two resistors and the relative ground may be substantially zero with regard to voltage needed to activate the switch. As long as power is supplied to the operational amplifier, the comparison between the negative input and the positive input to the amplifier is done.

In a scenario where the negative input to the amplifier is less than the positive input, the output from the amplifier may be similar to the positive power supply. The positive power supply may be substantially greater than the relative ground, creating a differential voltage between the output of the amplifier and the relative ground. The voltage divider connected to the output of the amplifier may set a voltage level (depending on the ratio between the resistors of the voltage divider) at the gate of the bypass switch high enough to activate the switch and enable the bypass circuit, step 423. Bypass may continue as long as the voltage level at the negative input of the amplifier is lower than the reference voltage level at the positive input to the amplifier.

Figure 5:
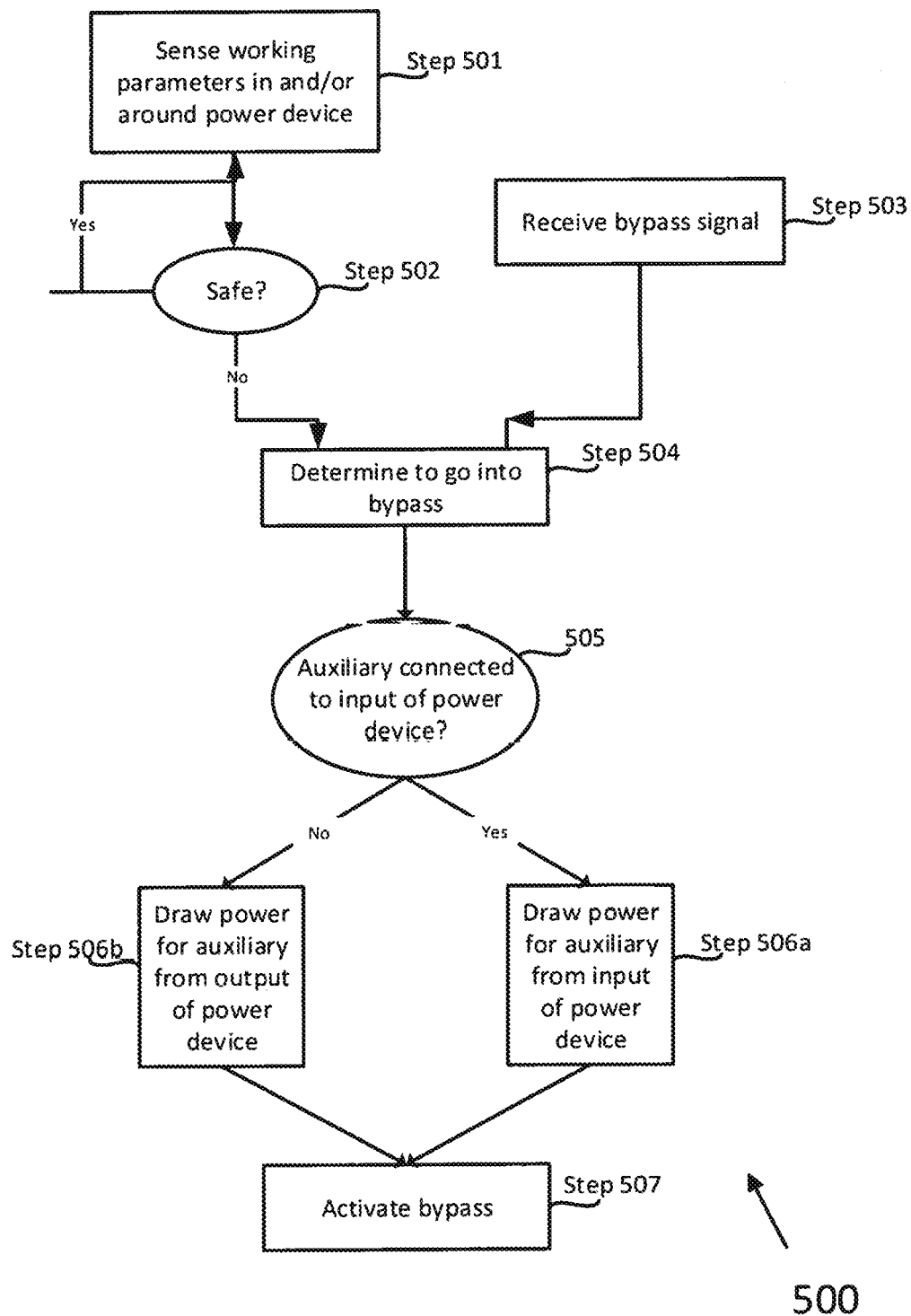
FIG. 5 shows a flow chart of a method for operating a bypass circuit, according to one or more illustrative embodiments.

Reference is now made to FIG. 5, which shows a method 500 for enabling bypass according to an embodiment. A power system may have one or more strings of one or more power devices connected in parallel and/or series. Each one of the power devices may be coupled to a power generator. Each one of the power devices may extract power from the power generators to the common string. The common string may carry AC and/or DC current and/or voltage. Method 500 may begin at step 501, which may include sensor(s)/sensor interface(s) coupled to or housed in one of the one or more power devices sensing operational parameters of the power device and the power generator coupled to the power device. Operational parameters may include input voltage current and/or power to the power device, temperature in and/or surrounding the power device, output voltage current and/or power of the power device, voltage current and/or power in the power device, etc. The sensed values by the sensor(s)/sensor interface(s) may be provided to a controller.

The controller, in step 502, may evaluate the signal(s) received from the sensor(s)/sensor interface(s) and determine if the measurements are representative of a safe or unsafe, functional or dysfunctional operating condition. If the controller determines the measurements represent a safe operating condition, the controller may control the power device to extract power from the coupled power generator and sense the operational parameters at step 501. If the controller determines the values of the measured values represent an unsafe, malfunctioning or underproduction operating condition, the controller may activate the bypass of the power device.

The bypass of the power device may be configured to short-circuit the outputs of the power device, and/or disconnect the inputs of the power device from the power generator and/or short circuit the inputs of the power device. According to some aspects, the power device may have a communication device configured to receive and/or send signals to other devices in the power system. The communication device, in step 503, may receive a bypass signal, or stop receiving a keep-alive signal. The power device may be configured to extract power and couple to the common string as long as long as the keep-alive signal is being received. When the keep-alive signal stops or when the bypass signal is received, the controller may be configured to enable the bypass and/or shutdown the power device, and go into bypass, step 504.

Enabling the bypass of the power device may include drawing power for an auxiliary power circuit configured to provide power to the bypass circuit. The bypass circuit may include one or more switches (e.g., MOSFETs, BJTs, IGBTs, etc.) configured to open and short circuit the bypass circuit, such as switches QB1-QB5 of FIG. 3A. According to some aspects, the auxiliary power circuit may be configured to draw power from the inputs of the power device. The inputs of the power device may be connected to a power source. According to some aspects, the power source may output power at a level high enough to power the auxiliary power circuit, even in a scenario where the power source is under producing and is to be bypassed. According to some aspects, the auxiliary power circuit may be configured to draw power from the outputs of the power device. A controller may be configured to determine if to draw power from the inputs of the power device or from the outputs, step 505. The controller may be configured to draw power from the inputs of the power device as long as the power source is outputting enough power to provide and power the auxiliary power circuit.

In some embodiments, where the inputs to the auxiliary power circuit are coupled to the inputs of the power device, step 505 may be followed by step 506*a*. The auxiliary power circuit may draw power needed to activate the bypass from the inputs to the power device. The auxiliary power circuit may include a power converter configured to output power suitable to power the bypass circuit that may include providing power to the switches in the bypass circuit. The power drawn from the inputs to the power device to the auxiliary power circuit may be converted to suitable voltage levels needed to activate the bypass circuit. The controller may activate the switches of the bypass circuit according to form of current flowing into the bypass from the common string, using the power drawn from the auxiliary.

According to some aspects, the controller may decide to draw power from the outputs of the power device and not to draw power from the inputs of the power device, step 506*b*. The bypass circuit may include a first and a second input coupled to the outputs of the power device. The bypass circuit may further include a first output and a second output coupled to the inputs of the auxiliary power circuit. The auxiliary power circuit may have a power converter configured to output power suitable to power the bypass circuit that may include providing power to the switches in the bypass circuit. The bypass circuit may draw power from the common string and output the amount of power needed to feed the auxiliary power circuit. After receiving the amount of power needed to power the auxiliary power circuit, the controller may activate the switches accordingly. For example, the current and voltage from the common string may be DC current and voltage. The controller may turn multiple switches ON and keep multiple switches OFF depending on the direction of the power flow. According to some aspects, the current and/or voltage may be in an AC form and the direction of the current may be bidirectional. The bypass circuit may be designed as a rectifier configured to ensure a constant direction of current on the outputs of the bypass circuit. The controller may switch the switches in the bypass circuit ON and OFF at a rate that may be proportional to the rate of the current (e.g., the rate of the current may be 50 Hz and the switching rate of the switches may be 50 Hz).

According to some aspects, the auxiliary may be coupled to the outputs of the bypass and to the inputs of the power device. The auxiliary power circuit may have a logic block configured to output either the voltage of the input to the power device or the output of the bypass. For example, the logic block may be configured to perform an "OR" operation on both the voltage of the input to the power device and the output of the bypass, and output the greater one of the two. According to some aspects, the logic block may be configured to output the voltage of the input to the power device as long as the voltage is over a minimum threshold (e.g., 0.1[V]), otherwise output the voltage of the output to the bypass.

After drawing power to the auxiliary power circuit, step 507 includes activating the bypass. Activating the bypass may be carried out by the controller by turning a switch from OFF to ON and keeping it ON as long as the bypass is enabled. The bypass may be enabled as long as an enablement signal is received, a disable signal has not been received and/or a keep-alive signal has not been received.

Figure 6A:
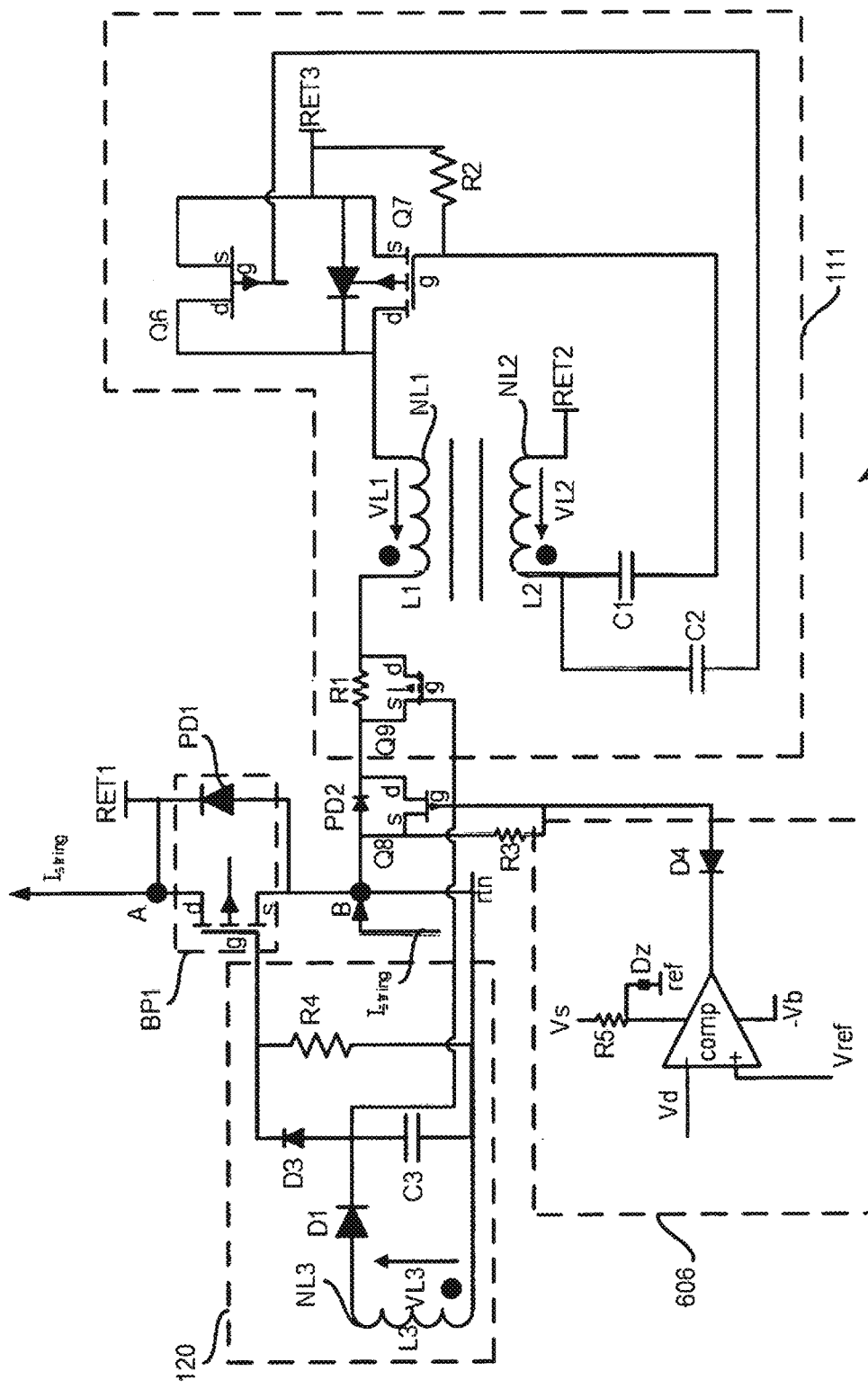
FIG. 6A illustrates a part schematic, part circuit diagram of a bypass circuit, according to one or more illustrative embodiments.

Reference is now made to FIG. 6A, which shows an implementation of a bypass circuit 115, according to aspects included in the disclosure herein. Coupling circuit 120 may include coupling the gate (g) of switch BP1 (of FIG. 1G) to cathode of diode D3 and a first end of resistor R4. The anode of diode D3 may couple to the cathode of diode D1, a first end of capacitor C3 and the gate (g) of switch Q8. A second end of resistor R4 may couple to a second end of capacitor C3 and terminal B. The second end of capacitor C3 may couple to a first end of inductor L3 and a second end of inductor L3 may couple to the anode of diode D1. The drain (d) of switch BP1 may couple to the cathode of diode PD1 at terminal A to give a return connection RET1. The anode of diode PD1 may couple to the source (s) of switch BP1, the anode of diode BD2 that belongs to switch Q8 and the source (s) of switch Q8. The drain (d) of switch Q8 may couple the source (s) of switch Q9 and to a first side of resistor R3. The gate (g) of switch Q9 may be coupled to circuit 606. The cathode of diode PD2 may be coupled to a first side of resistor R1. A second side of resistor R1 may be coupled to the drain (d) of switch Q9 and a first end of inductor L1 of circuit 111. Switch BP1 may be a metal oxide semiconductor field effect transistor (MOSFET), which may include diode PD1 or which might not include a diode. Similarly switches Q6, Q7 and Q9 may be MOSFETs, which include a diode like diode PD2 or which might not include a diode. Switch Q9 may be a junction gate field-effect transistor (J-FET). According to some aspects, bypass circuit 115 might not have circuit 606, switch Q8 and resistor R1.

In circuit 111, a second end of inductor L1 may couple to the drains (d) of switches Q6 and Q7. The sources (s) of Q6 and Q7 may be coupled together to give a return connection RET2. A first end of resistor R2 may couple between the gate of switch Q7 and the source (s) of switch Q7. The gate (g) of switch Q6 may couple to a first end of capacitor C2. A second end of capacitor C2 may couple to a first end of inductor L2 and a first end of capacitor C1. A second end of inductor L2 may provide return connection RET3. A second end of capacitor C1 may couple to the gate of switch Q2. Return connections RET1, RET2 and RET3 may couple together to form a return path that may be separate to terminal B at the source(s) of switch BP1. Separation between the return path and terminal B in bypass circuit 115, along with the integration of bypass circuit 115 across the input of a power device 200, may be achieved by disposing switch Q8 and diode PD2 between terminal B and inductor L1. Switches BP1, Q6 and Q7 may be metal oxide semiconductor field effect transistors (MOSFETs) and switch Q9 may be a junction field effect transistor (JFET).

According to some aspects, inductors L1, L2 and L3 may be mutually coupled on the same magnetic core. In effect, the coupling between inductor L1 to L2 and then inductor L2 to L3 may provide a possible function of coupling between the output of circuit 111 and coupling circuit 120. Therefore, the output of circuit 111 across inductor L1 may be coupled back to the input of coupling circuit 120 via the mutual inductance between inductor L1 and inductor L3 and also coupled to inductor L2 via the mutual coupling between inductor L1 and inductor L2. The mutual inductance between inductor L1 and inductor L2 and voltages induced into inductor L2 drive the gates (g) of switches Q6 and Q7 via the coupling of respective capacitors C2 and C1. The mutual coupling between inductor L1 and inductors L2 and L3 may be such that inductors L2 and L3 have a greater number of turns across the common magnetic core than inductor L1 does, so the voltages induced into inductors L2 and L3 are greater by virtue of the transformer equations:

$$\frac{VL1}{VL2} = \frac{NL1}{NL2}$$

and $$\frac{VL1}{VL3} = \frac{NL1}{NL3}$$

where VL1, VL2 and VL3 are the respective voltages of inductors L1, L2 and L3, where NL1, NL2 and NL3 are the respective number of turns of inductors L1, L2 and L3.

The greater voltages induced into inductors L2 and L3 by virtue of the greater number of turns NL2 and NL3 may allow for operation of switches BP1, Q6, and Q7, whereas without the greater voltages induced, switches BP1, Q6 and Q7 might not be able to operate otherwise. Inductor L2 and capacitors C1 and C2 in circuit 111 function as a Colpitts oscillator. The frequency of oscillation given by:

$$f_o = \frac{1}{2\pi \sqrt{L_2 \left(\frac{C_1 C_2}{C_1 + C_2}\right)}}$$

Inductors L1, L2, L3, and capacitors C1 and C2 may be chosen so that a frequency of oscillation for circuit 111 may be between 1 and 4 Kilohertz (KHz). The low frequency of oscillation of circuit 111 may therefore, provide low losses in the switching of Q6, Q7 and Q8. Alternatively, capacitor C1 may be replaced with another inductor so that circuit 111 may be implemented as a Hartley oscillator. Inductor L3 of circuit 120 may be built on the same core as inductors L1 and L2 in circuit 111, diode D1 may be used to rectify voltages induced on inductor L3 that may be by virtue of the mutual coupling between inductor L3 to inductors L1 and L2 of circuit 111. The rectified pulses may drive the voltage (Vgs) between gate (g) and source (s) of the MOSFET of switch BP1 to turn switch BP1 ON for continuous conduction of switch BP1 at step 1007 (see FIG. 1H).

Connected to the gate of switch Q9 may be a second side of resistor R3 and circuit 606. Circuit 606 may be coupled to the gate (g) of switch Q8 by the anode of diode D4. The output of a comparator comp may be coupled to the cathode of diode D4. Comparator comp may have a reference voltage Vref at the positive input to comparator comp, and Vd at the negative input to comparator comp. Vd may be the voltage from a power source and/or the voltage from the power device housing bypass circuit 115. The positive power supply may be coupled to a first side of resistor R5 and to the cathode of a zener diode Dz. A second side of resistor R5 may be coupled to Vs. Vs may represent the output voltage of the power source coupled to the power device. The anode of diode Dz may be connected to a reference point, where resistor R5 and diode Dz are configured to regulate the positive power supply. The voltage output of comparator comp may be configured to either turn switch Q9 ON or OFF. When comparator comp outputs a voltage of −Vb switch Q9 is ON and when comp outputs a positive voltage relative to Vs, depending on the value of R5, switch Q9 is OFF.

Reference is now made again to FIG. 1T with method 1000 of FIG. 1H applied to the further details of coupling circuit 120, switch BP1 and circuit 111 in bypass circuit 115 shown in FIG. 1G, according to illustrative embodiments. At step 1003, switch BP1 may be coupled across the outputs of a power device 200 where there may be a series string of power device 200 outputs. Switch BP1 is not active in step 1003.

At decision step 1005, specifically a first bypass current conduction of diode PD1 may be an indication of power device 200 and/or power source 101 not functioning correctly. Consequently, the flow of current ($I_{string}$) through an inactive power device 200 output may become restricted. As a result of restricted current flow, the voltage outputs of the other power devices 200 in the string may attempt to push the current through their outputs and through the inactive power device 200 output. The attempt at pushing current flow of current may be caused by an increase in voltage output of the other power device 200, which may cause diode PD1 to become forward biased so that a first bypass current conduction of current occurs through diode PD1. Diode PD1 becoming forward bias also results in diode PD2 also being forward biased. The forward biasing of diode PD2 allows the utilization of circuit 111 to initiate a continuous operation of switch BP1. Detailed description of the operation of circuit 111 is described later on in the descriptions which follow.

At step 1007, circuit 111 may initiate the continuous operation of switch BP1. As soon as body diode PD1 conducts, Q6 and/or Q7 may be ON, and circuit 605 may maintain the continuous operation of switch BP1 so that the MOSFET of switch BP1 is ON such that the voltage (Vds) between drain (d) and source (s) of switch BP1 remains low, e.g., from about 10 millivolts (mV) substantially up to 200 mV. A comparison between Vds of 10 mV of switch Q1 and a forward voltage drop 0.7V of a bypass diode to bypass a string current ($I_{string}$) of 25 Amperes gives bypass power losses of 0.25 Watts and 17.5 Watts, respectively. As such, operation of switch BP1 in bypass circuit 115 and other bypass circuit embodiments described below provide efficient bypass circuits that may allow the bypassing power sources and/or other circuit elements without incurring significant losses by the bypass itself. Bypassing power sources and/or other circuit elements without incurring significant losses may be significant when compared to other ways of providing a bypass that may include the use of bypass diodes, for example.

At step 1007, return connections RET1, RET2 and RET3 may couple together to form a return path rtn that may be a separate return path to that provided at terminal B at the source (s) of switch BP1. Separation between the return path and terminal B between coupling circuit 120 and circuit 111 may be by switch Q9 and diode BD2. Consequently, oscillations of circuit 111 may build on the drains of switches Q6 and/or Q7, while the return path for the oscillations may be provided on the sources(s) of switches Q7 and/or Q6.

At decision step 1009, if inactive power device 200 remains inactive, then the MOSFET of switch BP1 remains ON so that switch BP1 remains activated at step 1007. At decision step 647, if switch BP1 remains activated at step 1007, power from auxiliary power circuit 207 may be isolated from being supplied to the inactive power device 200. However, when power device 200 starts to become active, for example when a panel becomes unshaded that may be sensed by sensors/sensor interfaces 203 and may turn switch Q8 OFF, power from auxiliary power circuit 207 may be allowed to be resupplied to the switches of power device 200 to allow the functioning of power device 200. Both the MOSFET and body diode PD1 of switch BP1 and diode PD2 at this point may become reverse biased. The reverse bias voltages of both the MOSFET and diode PD1 of switch BP1 applied to the input of circuit 111 at the anode of diode PD2 may cause the ceasing of the oscillations of circuit 111. The output oscillations of circuit 111 ceasing when feedback to the input of switch BP1 via coupling circuit 120 may be sufficient to, cause the MOSFET of switch BP1 to switch OFF, so that switch BP1 is de-activated at step 1011. Alternatively, sensors/sensor interfaces 203 under control of controller 204 or some other controller may sense the reverse bias voltages of both the MOSFET and diode BD1 of switch BP1. As a result of the reverse biases being sensed, switch BP1 may be switched OFF and power from auxiliary power circuit 207 may be allowed to be resupplied to the switches of power device 200 to allow power device 200 to function as normal. The reduction of voltage applied to the gate of the MOSFET of switch BP1 causes the MOSFET to turn OFF. With the power devices 200 functioning normally switch BP1 is now inactive (OFF) but still coupled at terminals A and B (step 1003).

Figure 6B:
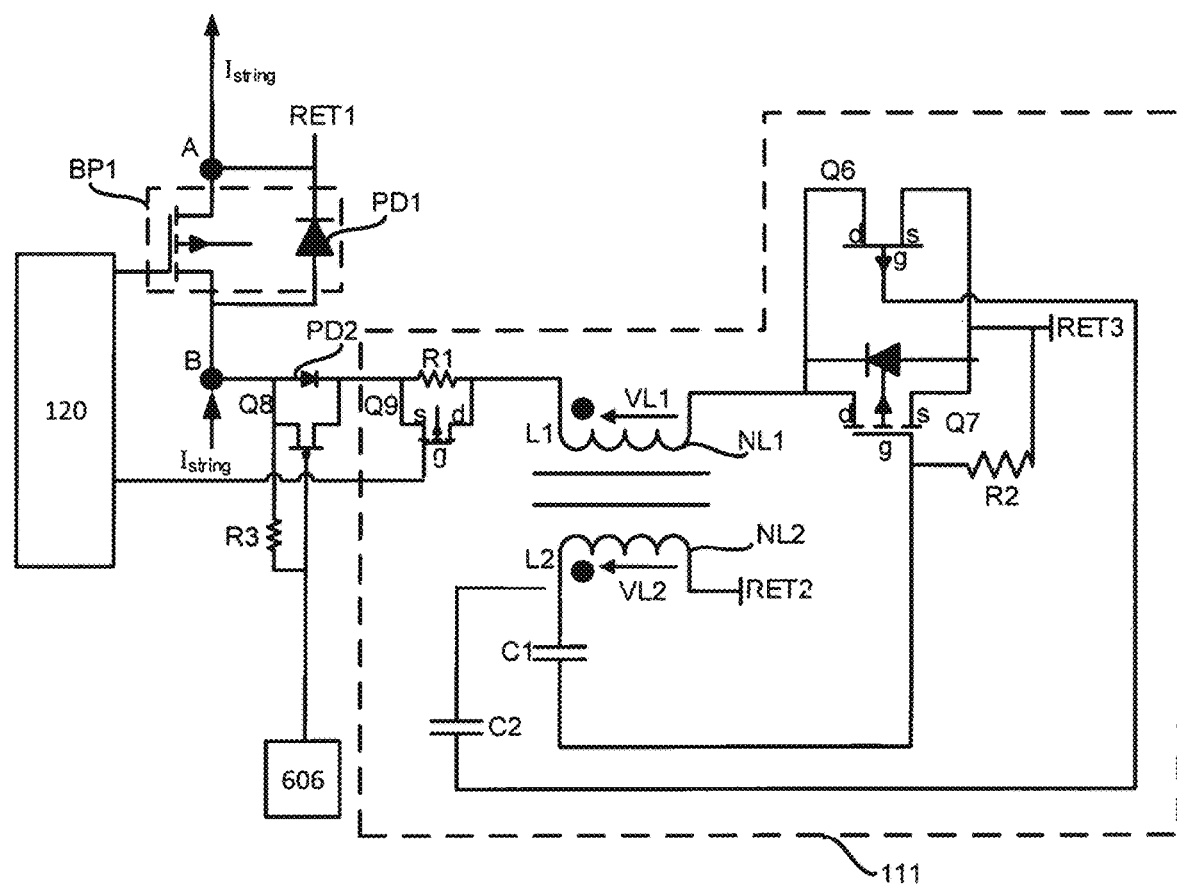
FIG. 6B illustrates a part schematic, part circuit diagram of a circuit included in a bypass circuit, according to one or more illustrative embodiments.

Reference is now made to FIG. 6B, which shows circuit 111, and a flow chart of FIG. 1K, according to illustrative embodiments. Shown is the connection of circuit 111 to coupling circuit 120 and circuit 606. Step 1007 (see also FIG. 1H, which shows the steps prior to and after step 1007) occurs if a power device 200 does not work, so that switch BP1 draws the current in the series string ($I_{string}$) in a path around the output of an inactive power device 200. Circuit 111 may be the same as described with regard to FIG. 1G, and may be coupled to bypass switch BP1. Switches Q6 and Q7 may be biased with resistor R2. In operation of circuit 111 when switch BP1 is OFF and a power device 200 is working correctly at step 1011, switch Q9 and diode PD2 may block leakage current through bypass switch BP1 and block reverse voltage across bypass switch BP1 when the voltage at terminal A may be much greater than the voltage at terminal B. Conversely when a power device 200 is not working at step 1007, switch Q9 is operated by the rectified output provided by diode D1 so that diode PD2 is bypassed by switch Q9 when switch Q9 may be ON. Switch Q9 OFF during step 1007 provides a block of leakage current through bypass switch BP1. Switch Q9 being ON may additionally compensate for any drop in voltage across terminals A and B as a result of switch BP1 being turned ON and being maintained as ON during step 1007 so as to give headroom for circuit 111 to oscillate. Switch Q9 and its operation is ignored and is to be considered to be ON, in order to simplify the following description.

In decision step 1203, if a low amount of power is being produced by a power source 101 and respective power device 200 compared to other power sources 101 and respective power devices 200 in a series string of power device 200 outputs, a first bypass current conduction may therefore be through diode PD1. Similarly, if the power source 101 and respective power device 200 has a failure the first bypass current conduction may also be through diode BD1.

At step 1205, the first bypass current conduction may induce a voltage VL1 across inductor L1 since diode PD2 is similarly forward biased as diode BD1. At step 637b, bypass switch BP1 may be positively biased with respect to output voltage ($V_{AB}$) of power device 200. Bypass switch BP1 being positively biased with respect to output voltage ($V_{AB}$) of power device 200 may be a result of power device 200 not functioning. The first bypass current conduction to provide the bypass of current through bypass switch BP1 may therefore be through diode PD1, followed by the conduction of inductor L1 via diode PD2 and then by the conduction of inductor L1 by use of switch Q6 in a first stage of operation of bypass switch BP1.

An example of the low amount of power may be when power sources 101 may be photovoltaic panels that have just begun to be illuminated (e.g., at dawn) or when a photovoltaic panel may be substantially and/or partially shaded. Shading may reduce power generated by a power source 101 (e.g., reducing the power generated by, for example, 20%, 50% or even close to 100% of the power generated by an unshaded power source). If enough power may be produced by power sources 101 in decision step 637a, circuit 605 may continue to oscillate with an initial use of switch Q6 for a number of times according to the steps of 637c-637g described below as part of the first stage of operation of switch BP1 until the second stage of operation where switch Q7 and/or Q6 are used. Q6 may be implemented using a junction field effect transistor (JFET) rather than a MOSFET since a JFET compared to a MOSFET may have a lower bias input current compared to a MOSFET and a JFET may conduct between source (s) and drain (d) when the voltage between gate (g) and source (Vgs) is substantially zero. Q6 may also be implemented using a depletion mode FET.

Following on from the first stage with the use of Q6, steps 1209, 1211, 1213, 1215, and 1217 are implemented with the use of switch Q7 and/or Q6 as part of a second stage of operation of switch BP1. The principal of operation for both the first stage and the second stage is that inductor L1 is mutually coupled to inductors L3 and L2 when current flows through inductor L1. The mutual coupling is such that when current flows through inductor L1, current flows in inductor L2 and induces a voltage VL2 into inductor L2. Voltage VL2 may charge the gate (g) of switches Q7 and/or switch Q6 (at step 637c) via capacitors C1 and/or C2. The charging of the gate (g) of Q7 and/or switch Q6 may cause switch Q7 and/or switch Q6 to start to conduct current between source (s) and drain (d) of switch Q7 and/or switch Q6 so that Q7 and/or switch Q6 is ON (step 637g) for a time period ton.

The energy induced into inductor L1 during ton may be discharged by a time constant $\tau[L1]$ $$\tau[n]=L1\times Req$$

where Req may be the equivalent resistance that includes resistor R1 and the respective resistances (Rds) between drain (d) and source (s) when switch Q6 and/or Q7 may be ON. The value of respective resistances (Rds) between drain (d) and source (s) when switch Q7 and/or Q6 may be ON may be derived from manufacturer data sheets for the particular devices chosen for switches Q7 and Q6 as part of the design of circuit 605. Discharge of inductor L1 (step 1213) may continue in decision step 1215 until voltage VL2 of inductor L2 in decision step 637f drops below the threshold voltage of Q7 and/or switch Q6 which makes Q7 and/or switch Q6 switch OFF (step 1217) for a time period toff. Q7 and/or switch Q6 drain (d) voltage then may begin to increase by the ratio:

$$\frac{ton}{toff \times VAB}$$

so that voltage may again increase on L2 for a time defined by a time constant $\tau[L2]$, after which switch Q7 and/or switch Q6 conducts again (step 1209), which may create the oscillation of circuit 111. The time constant $\tau[L2]$ may be given by:

$$\tau[L2]=\sqrt{L2\times Ceq}$$

where Ceq may be the equivalent capacitance that includes capacitors C1 and C2 and the parasitic capacitances of switches Q7 and/or Q6. Parasitic capacitances of switches Q7 and/or Q6 may be derived from manufacturer data sheets for the particular devices chosen for switches Q7 and Q6 as part of the design of circuit 111. Parasitic capacitances of switches Q7 and/or Q6 may or might not be a significant factor in the desired value of time constant $\tau[L2]$. Inductor L1 coupled to inductor L3 may cause a voltage to be induced in inductor L3 when current flows through inductor. L1. The voltage induced into inductor L3 may be rectified by diode D1. The rectified voltage of diode D1 may be applied to the gate (g) of bypass switch BP1 via diode D3 and resistor R4, which may turn bypass switch BP1 to be ON (step 1007).

Figure 6C:
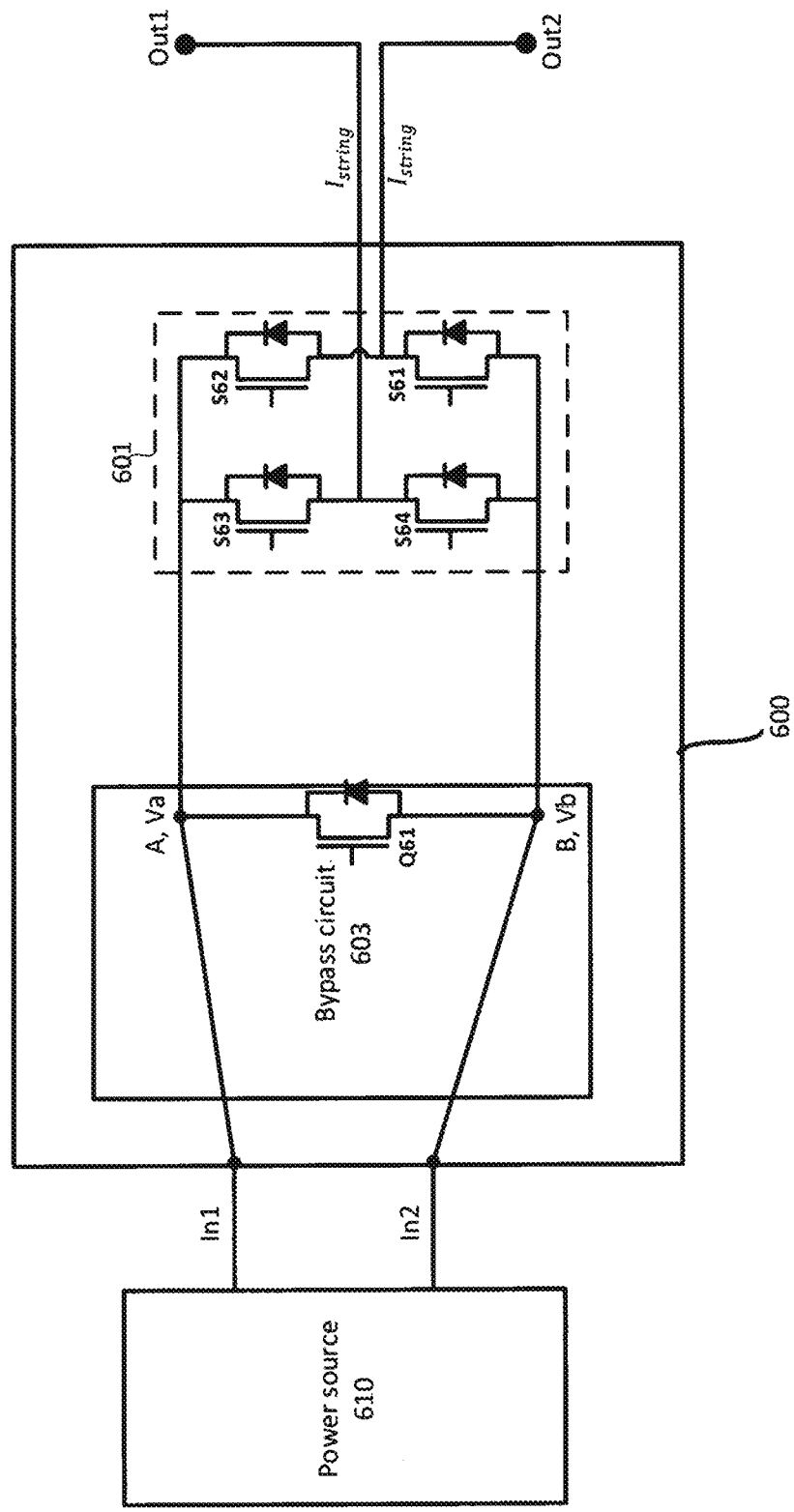
FIG. 6C illustrates a part schematic, part block diagram of a power device, according to one or more illustrative embodiments.

Reference is now made, to FIG. 6C, which illustrates a power device 600 according to aspects of the disclosure herein. Power device 600 may be the same as or similar to power device 200 of FIG. 2. According to some aspects, power device 600 may have a first input In1 and a second input Int configured to input power from a power source 610 to power device 600. Power device 600 may have a first output Out1 and a second output Out2. Power device 600 may be coupled to a power system (e.g. power system 100) with a current ($I_{string}$) via outputs Out1 and Out2. According to some aspects, power device may include a full bridge 601. Full bridge 601 may include a bridge of four switches (e.g. MOSFETs) S62-S65. Full bridge 601 may be configured to transfer power from power source 610 to outputs Out1 and Out2 (e.g., full bridge 601 may function as an inverter). In some scenarios, bypass circuit 603 may be disabled, for example, voltage Vd of circuit 606 may be greater than Vref causing the output voltage of comparator comp to be −Vb turning switch Q8 OFF (where Vd, Vref, circuit 606, comp, Vb and Q8 appear in FIG. 6B). In a scenario where power source 610 is producing power at a sufficient level and power device 600 is operating correctly, the voltage of terminal A (Va) may be configured to be higher than the voltage of terminal B (Vb).

Current may flow from outputs Out1 and/or Out2 of power device 600 to power source 610 and power may flow back to outputs Out1 and/or Out2. In some scenarios, bypass circuit 603 may be enabled by turning switch Q8 of FIG. 6B ON. Switches S61-S64 of full bridge 601 may have bypass diodes (similar to or the same as diode PD1 of switch BP1 of FIG. 6B). Current may enter power device 600 through output Out1 and/or Out2 and may reach point A flowing through the bypass diodes of switches S62 or S63. Entering bypass circuit 603, the current may flow from terminal A to terminal B through circuit 605, resistor R1 and switch Q8

(which appear in FIG. 6B). Flowing from terminal A to terminal B may provide power to switch BP1 through coupling circuit 120 turning switch BP1 ON and providing a path with lower impedance than through circuit 111 of FIG. 1G, while providing enough power through circuit 111 and coupling circuit 120 of FIG. 6A for holding switches Q9 of FIG. 6B and BP1 ON. Current may flow from point B back to output Out1 and/or Out2 through bypass diodes of switches S64 and/or S61. According to some aspects, power on outputs Out1 and Out2, of power device 600 may be in AC form, and power source 610 may be a DC power source. Full bridge 601 may be configured to convert output current from AC to DC when entering power device 600, and may be configured to output power from power source 610 through power device 600 and out of outputs Out1 and Out2 of power device 600.

Figure 6D:
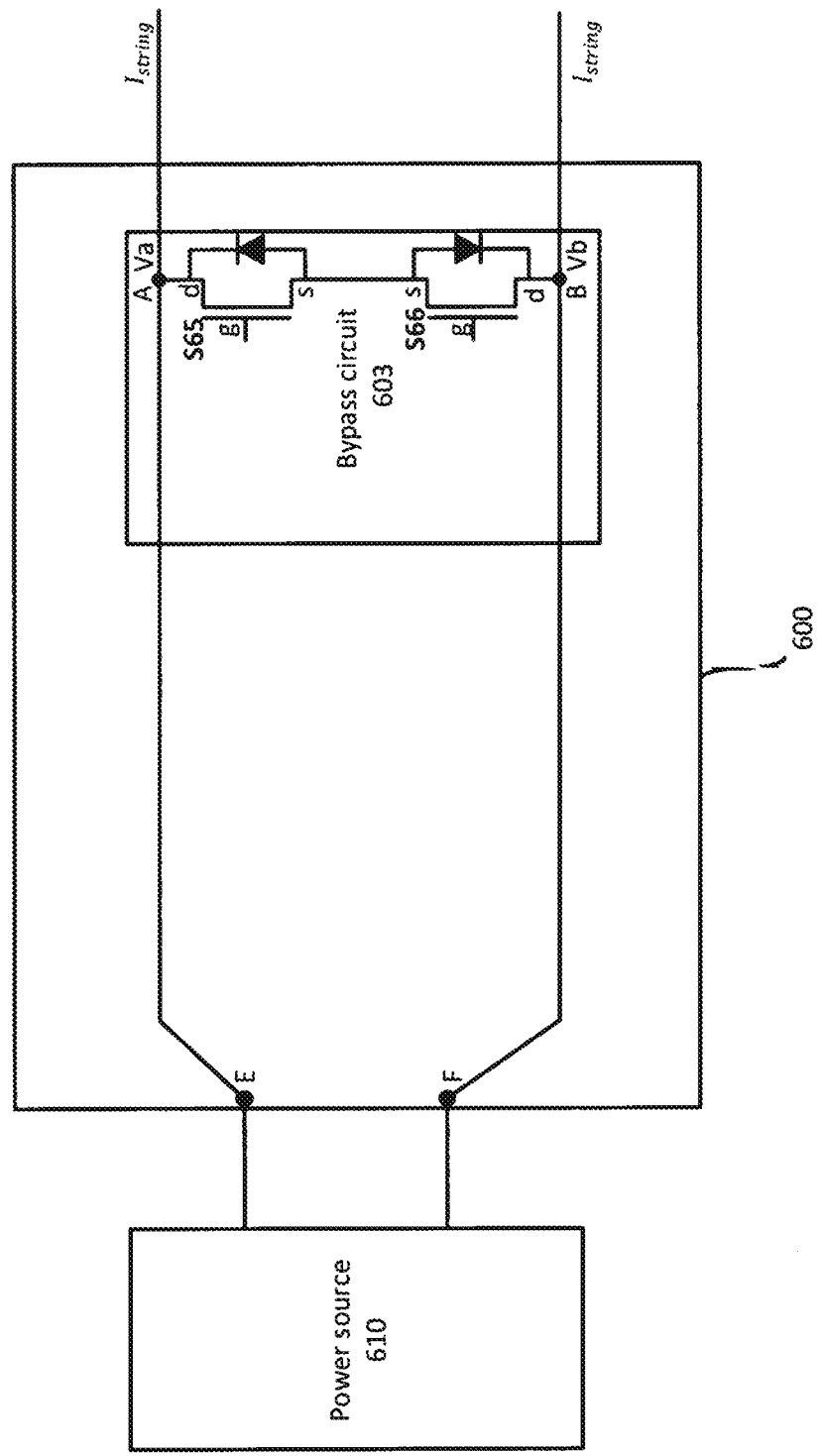
FIG. 6D illustrates a part schematic, part block diagram of a power device, according to one or more illustrative embodiments.

Reference is now made to FIG. 6D, which illustrates aspects of power device 600. Switch BP1 of FIG. 6B may be replaced by a first switch S65 and a second switch S66. Switches S65 and S66 may be the same as switch BP1. Terminal A may be coupled to the drain (d) of switch S65 and terminal B may be coupled to the drain (d) of switch S66. The source (s) of switch S65 may be coupled to the source (s) of switch S66. The gate (g) of switch S65 may be coupled to the gate (g) of switch S66 as well as to the cathode of diode D3 and a first side of resistor R4. A second side of resistor R4 may be coupled to the sources of switch S65 and switch S66 as well as the second side of capacitor C3 and the first end of inductor L3. The bypass circuit of FIG. 6D may be different than the circuit depicted in FIG. 6B in that switch BP1 of FIG. 6B is replaced by switches S65 and S66 of FIG. 6D, and point B of FIG. 6B is attached to the drain terminal of switch S66 of FIG. 6D instead of the source terminal of switch BP1 of FIG. 6B.

According to some aspects, power source 610 may function as a load as well as a source (e.g., a battery that functions as a load when charging and functions as a source when discharging). When power source 610 is functioning as a source, $I_{string}$ may flow from terminal A to terminal B, and when power source 610 is functioning as a consumer, $I_{string}$ may flow from terminal B to terminal A. When $I_{string}$ is flowing from terminal A to terminal B and bypass circuit 603 is disabled, switches S65 and S66 may be OFF and the bypass diode of switch S65 may block the current from flowing through switches S65 and S66. Switch Q8 of FIG. 6B may be OFF preventing current from flowing through circuit 111 of FIG. 6B from terminal A to terminal B. When current $I_{string}$ is flowing from terminal B to terminal A, and bypass circuit 115 is disabled, switches S65 and S66 may be OFF and the bypass diode of switch S66 may block current from flowing from terminal B to terminal A through switches S65 and S66. When bypass circuit 115 is enabled, meaning switch Q8 is turned ON current may flow from terminal A to terminal B and/or vice versa through circuit 111 and may provide power to switches S65 and S66 through coupling circuit 120 of FIG. 6A. When enough power is provided to the gates (g) of switches S65 and S66, switches S65 and S66 may turn ON and $I_{string}$ may flow through switches S65 and S66.

Having switches S65 and S66 in series may make it easier to design coupling circuit 120 and circuit 111 and to select the values of the components for one or more reasons. One reason may be creating a symmetric circuit. When switches S65 and S66 are coupled in series, the direction of current $I_{string}$ might not affect the voltage values and polarity of Va and Vb. For example, $I_{string}$ may be flowing from terminal B to terminal A and power source 610 may be functioning as a source. The voltage difference between Va and Vb may be determined according to the operation of power device 600, e.g. 50V. In a scenario where power source 610 is acting as a load, the voltage difference between Va and Vb may be 50V with $I_{string}$ flowing from A to B. If switch BP1 of bypass circuit 115 (FIG. 1G) was not replaced with switches S65 and S66 the voltage difference may be Va−Vb=50V when the power source is functioning as a source and $I_{string}$ is flowing from terminal A to terminal B. However, when power source 610 is functioning as a load the voltage difference between Va and Vb may be substantially the voltage of body diode PD1 of switch BP1, which may be far lower, for example, 0.7V. Designing bypass circuit 115 to have a constant voltage drop between terminals A and B regardless of the direction of current flow may make it simpler and cheaper to design a circuit designed to convert to voltage between terminals A and B to a voltage used for operating the bypass circuit.

Figure 7A:
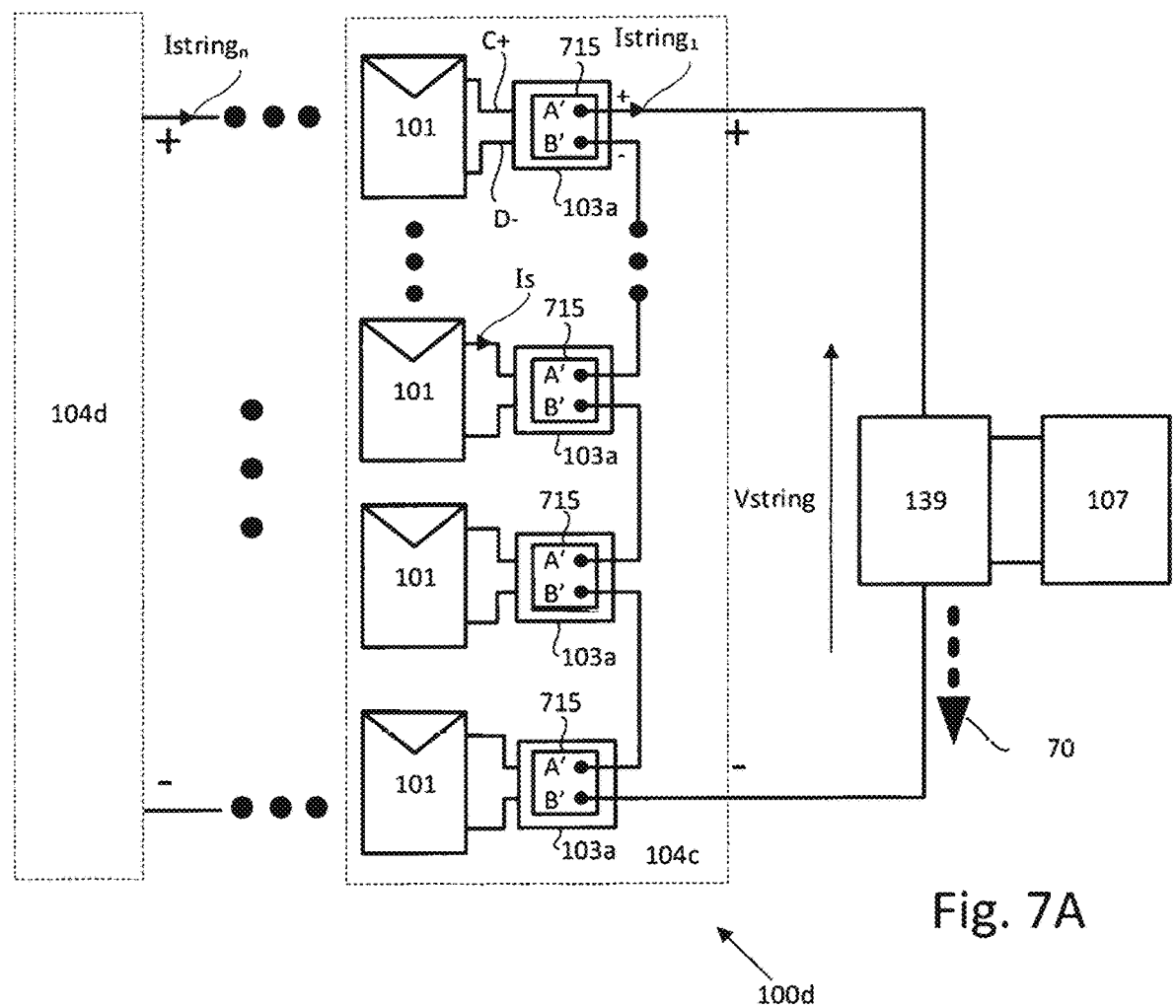
FIG. 7A is a part schematic, part block diagram of a power system, according to one or more illustrative embodiments.

Reference is now made to FIG. 7A, which shows a power system 100d, according to one or more illustrative embodiments. A connection configuration 104c is shown connected to system power device 139 at terminals + and −. Multiple connection configurations 104d may be connected in parallel across terminals + and −. Connection configurations 104d may be the same as connection configuration 104c or different from connection configurations 104c. Connection configuration 104c may include a series connection (as shown in FIG. 7A) or a parallel connection of the outputs of multiple power modules 103a. The input to each power module 103a at terminals C+ and D− may be connected to a respective output of a power source 101. Power source 101 is shown as a photovoltaic panel. Connection configuration 104d may include a series connection of the outputs of multiple power modules 103a, where the input to power module 103a may be from another source of DC power such as a battery or fuel cell, or rectified AC power from an AC power source such as a wind turbine, grid, or other AC generator.

A safe voltage unit 715 may be included in one or more power modules 103a. Safe voltage units 715 may be the same as or similar to, and/or may include features of bypass circuits 115, 115a, 115b and/or 115c described above, which may be utilized to provide a substantial short circuit across terminals A' and B'.

When power modules 103a might not include a power circuit 135 (see FIG. 1B, for example) disposed between terminals C+, D− and terminals A', B', safe voltage units 715 effectively connect across power sources 101 and terminals C+, D− may respectively be terminals A', B'.

The communication interfaces 129 (see FIG. 1B) of the power modules 103a may be configured to communicate with each other, and/or to communicate with the controllers of system power device 139 and/or load 107 (e.g., using power line communications or wireless communication methods). Load 107 may be, for example, a battery, an alternating current (AC) grid, a DC grid, or a DC to AC inverter. The power modules 103a may also receive, according to features described below, a signal 70 transmitted from system power device 139 and/or load 107. Signal 70 may be, for example, a "keep alive" signal or a stop signal which may activate or deactivate safe voltage units 715. Signal 70 may be, for example, a wireless signal, a wired signal (e.g., via power-line communications or via a separate communication wire), or an acoustic signal. Power modules 103a and utilization of bypass circuits 115, 115a, 115b and/or 115c as described above may include a bypass mode for shaded panels, for example, as well as a safety feature provided by use of safe voltage unit 715 described in greater detail in the descriptions which follow, which consider the use of signal 70.

In the descriptions that follow, by way of a non-limiting example, power modules 103a, do not include power circuit 135 for DC to DC conversion from input terminals C+, D− to output terminals A', B'. The non-limiting example may include use of the other features of power module 103/103a described above. For example, power modules 103a connected to system power device 139 may provide communication capabilities (e.g., a communication device) and/or control of a bypass and/or safe voltage unit.

Figure 7B:
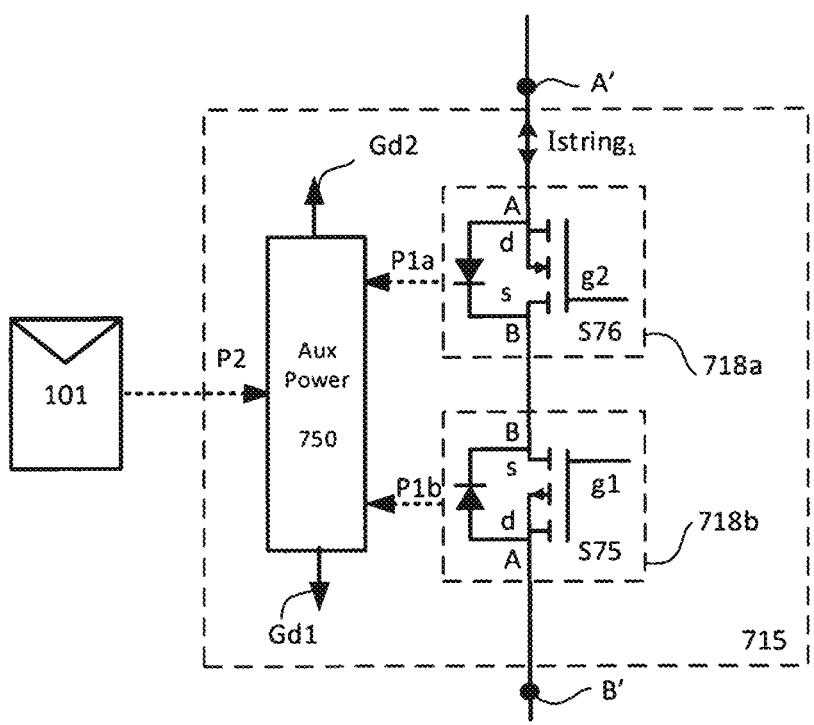
FIG. 7B shows further details of a safe voltage unit which may be located and connected to a power module, according to one or more illustrative embodiments.

Reference is now made to FIG. 7B, which shows further details of safe voltage unit 715 which may be located and connected to a power module 103a, according to one or more illustrative embodiments. Two bypass circuits 718a and 718b are shown implemented as switches S76 and S75, which may be two MOSFETs with respective body diodes. The body diodes may be an integral part of the MOSFETs or be additionally attached. Switches S76 and S75 each may be other types of semiconductor switches or relays that may include diodes that allow a bi-directional flow of current (AC or DC current) between terminals A' and B' of safe voltage unit 715.

Switches S76 and S75 are implemented by two MOSFETs, the sources (s) of the MOSFETs connected at terminals B of switches S76 and S75 and the drains (d) connected to terminals A' and B' of safe voltage unit 715. Safe voltage unit 715 further includes an auxiliary power unit 750 that may provide operating power to gate drivers Gd1 and Gd2. The gate drivers may connect respectively to gates g1 and g2 in order to make switches S76 and S75 turn ON or OFF. Power input to auxiliary power circuit 162 may be power P2 from power source 101 and/or operating powers P1a and P1b. Operating powers P1a and P1b may be provided from current flowing through the body diodes of respective switches S76 and S75 according to the conduction of diode PD1 that may be included in a first stage as described at step 1205 above. Turning ON of switches S76 and S75 may be according to the first and second stages of operation of bypass 115 as described above in methods 420, 500 and 1007. Therefore, in normal operating mode, safe voltage units 715 may be powered by the voltage across the body diodes of switches S76 and S75. The body diodes of switches S76 and S75 may be substantially the same as and may provide the same function as diode PD1 of switch BP1 described above. Therefore, switches S76 and S75 may be considered to be two switches BP1 connected in series to provide a bi-directional flow of current (AC or DC current) between terminals A' and B' of safe voltage unit 715. Bypass circuits 718a and 718b may each additionally include circuitries of bypass circuits 115, 115a, 115b and/or 115c connected to switches S76 and S75 to provide the operating bias to switches S76 and S75.

Figure 7C:
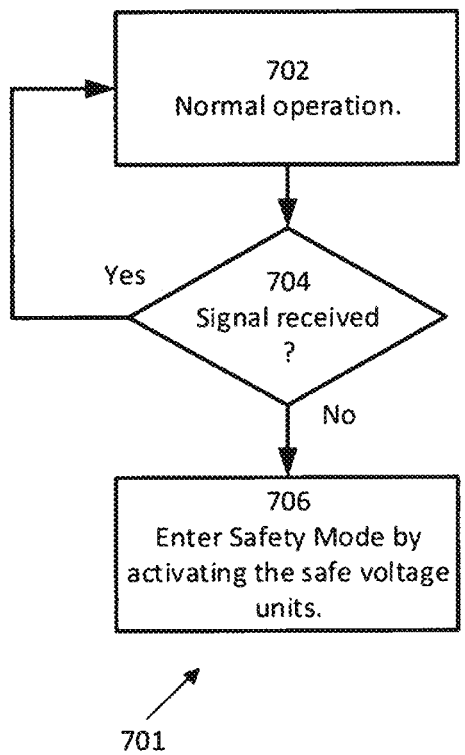
FIG. 7C shows a flow chart of a method applied in a power system for providing safety, according to one or more illustrative embodiments.
Figure 7D:
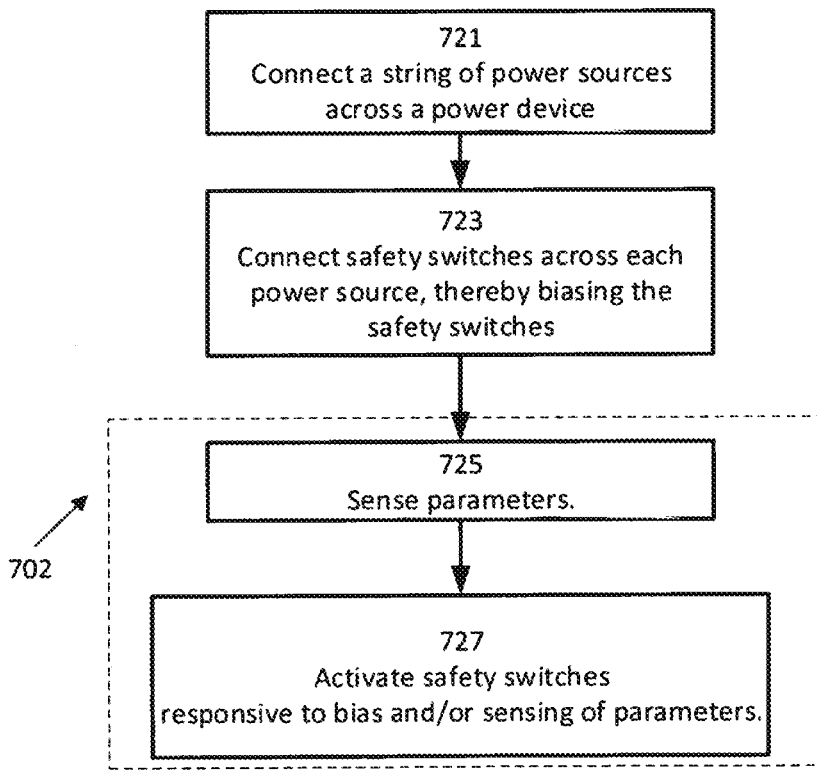
FIG. 7D shows a flow chart of a method applied in a power system for providing safety, according to one or more illustrative embodiments.

Reference is now made to FIGS. 7C and 7D, which show respective flow charts of methods 701 and 702 applied in a power system 100d, according to one or more illustrative embodiments. Method 702 shows further details of step 702 of method 701 in greater detail. Power sources 101 are assumed, for illustrative purposes, to be photovoltaic panels, but may be any suitable type of power source.

In power system 100d, power modules 103a might not include a power circuit 135 disposed between terminals C+, D− and terminals A', B'. Safe voltage units 715 effectively connect across power sources 101 and terminals C+, D− may respectively be connected to terminals A', B'. The string of serially connected power sources 101 may connect across system power device 139 (step 721), and each safe voltage unit 715 connects across each respective power source 101 at terminals A' and B' (step 723). Steps 721 and 723 may be carried out during installation and/or commissioning of a PV power system, prior to first operating the power system in the normal mode.

In the normal operation of power system 100d, in step 702, a control function may be provided by a controller of system power device 139 or a controller included in safety voltage unit 715 for example. The controller may establish and control the string voltages or string currents Istring$_{1-n}$ from each of the connection configurations 104c/104d connected to system power device 139 at terminals +/−. The control function may therefore establish and/or maintain an overall string voltage Vstring an algebraic sum of string currents Istring$_{1-n}$ to terminals +/− of system power device 139. As such, the other features of power modules 103a connected to system power device 139 (e.g., communication interfaces, controllers and/or other features described with respect to FIG. 1B) may provide enablement of the control function. The other features of power modules 103a may allow the sensing of voltages and currents within each of the connection configurations 104c/104d. The other features may allow communication of data of the sensing to be sent to system power device 139. The control function may therefore enable method 701 to be applied to safe voltage units 715 utilized in power system 100d.

During the normal operation of power system 100d, at step 725, parameters of power system 100d may be sensed by sensors of system power device 139, sensors 125, and/or sensor(s)/sensor interface(s) 203/305. The parameters sensed may include the voltage output by the power sources 101, the polarities of the voltages output by power sources 101 relative to each other, the current level and the direction of string currents Istring$_{1-n}$ in connection configurations 104c/104d, the voltage level of connection configurations 104c/104d and/or the presence or the absence of a grid or load 107 connected to the output of system power device 139. The control function, in response to the parameters sensed in step 725, may establish and verify the normal operation of power system 100d in step 702. The normal operation of power system 100d in step 702 may be verified by sending signal 70 out from system power device 139. Safe voltage units 715 connected across each one of power sources 101 in step 723 may be OFF (step 727) in the normal mode of operation (step 702) of operation of power system 100d.

In the case where a power source 101 comprises a PV panel that is shaded, a safe voltage unit 715 associated with that shaded PV panel may be switched from OFF to ON in a normal mode of operation of the power system, due to detection of a reverse polarity of the shaded power source 101. The detection in the normal mode of the reverse polarity may provide an indication of a shaded PV panel or a discharged battery (in a case where the power source 101 is a battery). Reverse polarity of an underperforming power source 101 compared to other performing power sources 101 in a series sting may be a cause of impeding current flow in the series string. The cause of impeding current flow in the series string may be removed by switching a respective safe voltage unit 715 of the underperforming power source 101 from OFF to ON. Therefore, due to dynamic changes of shade and state of charge of batteries over a period of time of operating the power system, responsive to the detection in the normal mode of operation, a number of safe voltage units 715 may be OFF or ON in a series string.

The configuration of the control function may include calculation and selection of component values, types of components and the interconnections of components as part of an analog circuit design of safe voltage unit 715. The analog circuit design may further include features to enable interfacing to the controller. In the absence of the controller or lack of operating power for the controller, operation of safe voltage units 715 may be independent of the control function and the parameters sensed in step 725. The configuration may be based on normal operating parameters (e.g., system parameters that are present when power sources 101 and/or power modules 103a are functioning correctly) or to accommodate non-normal operating parameters of power system 100d described above and in power systems described below. The configuration may thereby be responsive to an event such as the breakdown or failure of a power module 103a and/or power source 101 so as to provide a bypass of the power module 103a and/or power source 101.

In this regard, the configuration with respect to safe voltage unit 715 with lack of control by the controller may be considered to be substantially activated and/or operated for most of the time. Therefore, the steps of method 701 are performed responsive to the continuously changing operating parameters of power system 100d. Power for the operation of safe voltage unit 715 may be provided from the string of serial connected power sources 101. Power for the operation may also come from a partial power from module 103a and/or power source 101, which may use power P2 for example. Power for operation may also be supplied from an auxiliary power source. Safe voltage unit 715 and the other analog bypass circuit embodiments described above when considered as being substantially activated might not require sensors 125, controller 105, and an associated algorithm to activate safe voltage unit 715 (ON) or to de-activate safe voltage unit 715 (OFF) in method 701.

Therefore, a way to enable a de-activation of safe voltage circuit 115 and the other analog bypass circuit embodiments described below from being substantially activated most of the time is for a controller to use driver circuitry 170 to apply voltages to gates g1 and g2 of switches S76, S75 so that safe voltage unit 715 is OFF and/or de-activated thereby. The configuration may also give the decision aspect of decision step 704 described below so as to be responsive to an event such as a power module 103a and/or power source 101 reverting back to a normal operation, where the normal operation de-activates a bypass of a power module 103a and/or power source 101.

During normal operation of power system 100d in step 702, signal 70 is sent from system power device 139 and/or load 107 to power modules 103a in each of the connection configurations 104c/104d. Communication interfaces 129 of power modules 103a may receive signal 70 sent from system power device 139 and/or load 107. If in step 704, signal 70 is received by power modules 103a, normal operation of power system 100d continues in step 702 where safe voltage units 715 are OFF or open circuit between terminals A' and B'.

When safe voltage units 715 are OFF, or de-activated, the string current Istring₁ may be equal to the current (Is) from the poorest performing power source 101 and the voltage across each of terminals A' and B' is the voltage of a respective power source 101. When safe voltage unit 715 is ON, or activated in a bypass mode (e.g., in response to an underperforming power source 101), the voltage from a power source 101 in the bypass mode may be substantially zero because the safe voltage unit 715 may substantially short-circuit the power source. As such, string current Istring₁ (from other functioning serially connected power source 101 outputs for example) flows from terminals B' to A' and the voltage drop across terminals A' and B' is the voltage between drain (d) and source (s) of safe voltage unit 715 (ON), where the combined drain source voltages Vds may be 10 mV each for example. A feature of the bypass mode as explained above is that if a power source 101 was to become unshaded, or power source 101 begins to function again, safe voltage unit 715 may be de-activated from ON to OFF. Activation or de-activation of safe voltage unit 715 in the bypass mode may be independent of any sensing of parameters in power system 100d in step 725.

If in step 704, signal 70 is not received by power modules 103a, a safety mode of operation of power system 100d may be started in step 706 by activation of some and/or all of the safe voltage units 715. Signal 70 not received by power modules 103a may be indicative of a disconnection of at least one of the power lines that connect system power device 139 and/or load 107 to connection configurations 104c/104d. Alternatively the disconnection may be in the power lines within a connection configuration 104c/104d which may prevent a particular connection configuration 104c/104d from receiving signal 70, whilst another connection configuration 104c/104d might not be disconnected from system power device 139 and/or load 107 and receives signal 70. The disconnection may also be due to a shutdown of system power device 139 and/or load 107. The disconnection may be due to an over current in configuration 104c/104d blowing an inline fuse, circuit breaker or residual current device (RCD) in the power lines within a connection configuration 104c/104d and/or between power device 139 and/or load 107 to connection configurations 104c/104d. The overcurrent may cause an open circuit in connectors between power lines which may also be further cause of the disconnection.

Unsafe conditions that may prevent reception of signal 70 (due to signal 70 not being transmitted in response to an unsafe condition, or inhibition of the transmission of a signal 70 due to, for example, disconnected power lines) may further include, for example, a disconnection in power system 100d, a grid outage, a leakage current, an inverter malfunction, etc. As such, safe voltage units 715 being ON, according to method 751, may ensure safe voltage level (e.g., 0.1V, 1V, 2V etc.) across power sources 101 and overall a safe voltage level of the string voltage Vstring. Maintaining a safe Vstring level may protect operatives such as installers and firemen for example. In other possible implementations, an unsafe condition may be detected in the power system due to the occurrence of a signal instead of the absence of a signal, whereby the signal detected may be a result of an over-voltage or over-current condition within the power system, for example.

The safety mode of operation in step 706 may be triggered in safe voltage unit 715 in various ways. According to one feature, a stop signal may be received by a communication device included in safe voltage unit 715, the stop signal being transmitted by a system power device (e.g., system power device 139). According to a feature, safe voltage unit 715 may constantly (e.g., continuously, or at regular intervals) receive a "Keep alive" signal (e.g., from system power device 139) while the system is operating properly. The signal may be wired or wireless. Upon cessation of the "Keep alive signal" (e.g., having not received a "Keep alive" for a period of time, such as 10 seconds), the safe voltage unit 715 may trigger the safety mode of operation (step 706) by turning switches S76 and S75 ON.

A criterion for activating at least one or more safe voltage units 715 may be based on a maximum acceptable safe voltage for Vstring that may be considered to be safe in case of a disconnection between system power device 139 and/or load 107 and connection configuration 104c/104d. The disconnection may include a disconnection in the power lines within a connection configuration 104c/104d and/or when a shutdown of system power device 139 and/or load 107 occurs. By way of non-limiting example, ten power modules 103a with outputs wired in series may be included in a configuration 104c/104d. Each power source 101 output may be 20 volts (V) and a safe voltage for Vstring is considered to be 60V when a disconnection from and/or shutdown of system power device 139 and/or load 107 occurs. At step 706, seven of the safe voltage units 715 may be turned ON in order to ensure the safe voltage, since three of the ten safe voltage units 715 are OFF. Three of the ten safe voltage units 715 being OFF by virtue of Kirchoff Voltage Law gives Vstring=20V+20V+20V=60V. Step 706 may be permanently applied to ensure the safe voltage until a reconnection of connection configuration 104c/104d and/or startup of system power device 139 and/or load 107 occurs. The reconnection of connection configuration 104c/104d and/or startup of system power device 139 and/or load 107 may reestablish the normal mode of operation in step 702.

The control algorithm of a controller located in system power device 139 and/or at least one of the power modules 103a is aware of what a maximum voltage for Vstring. The maximum voltage for Vstring may be based system requirements for a safe voltage. Where the output voltage or the combined output voltages in parts of string are considered not safe, the control algorithm may act to ensure a safe voltage level at each point in the series string. The safe voltage level may be achieved by activating all of the safe voltage units 715 ON. The control algorithm may deem it fit to activate some of the safe voltage units 715 ON to ensure the safe voltage for Vstring as shown in the numerical example above.

Figure 7E:
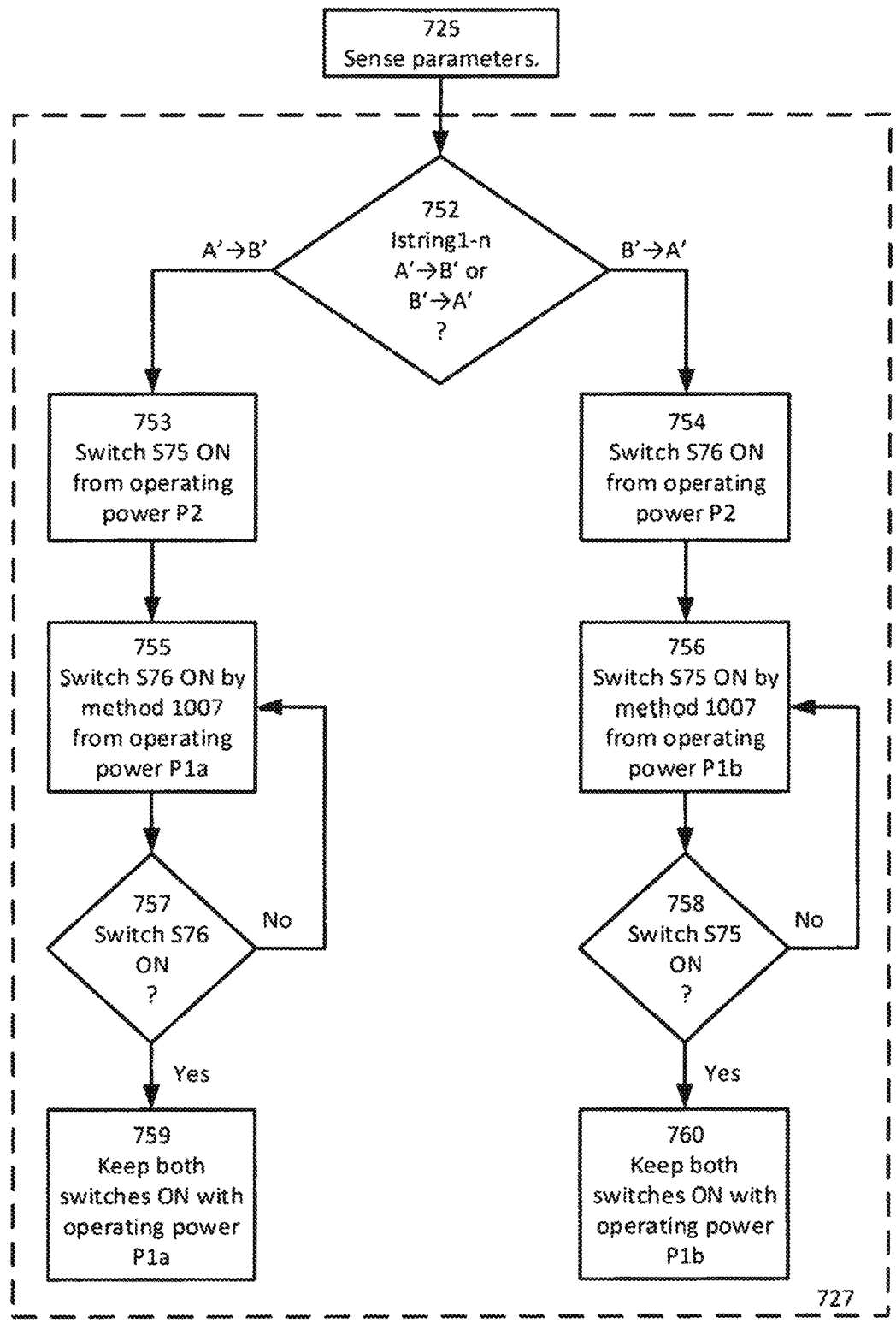
FIG. 7E shows a flow chart of a method applied in a power system for providing safety, according to one or more illustrative embodiments.

Reference is now made to FIG. 7E, which shows a method 751, according to one or more illustrative embodiments. Method 751 may be applied by a controller of power system 100d to safe voltage units 715 utilized in power system 100d. As previously described, the controller may be part of system power device 139 or may be included in power modules 103a. Activation of safe voltage units 715 may be by control of the controller responsive to sensing step 725 or the analog circuitry of safe voltage units 715 working independently of the controller. Safe voltage units 715 working independently may be according to descriptions above with respect to FIGS. 1I and 1Q, which may be appropriate for very low levels of string current that exist at dusk or dawn, for example. Activation of safe voltage units 715 may also be a combination of control of the controller responsive to sensing step 725 and the analog circuitry of safe voltage units 715.

Safe voltage units 715 may provide a bidirectional flow of string currents $Istring_{1-n}$ which may flow from terminal B' to terminal A' or from terminal A' to terminal B'. By way of non-limiting example, a control function of a control algorithm may be provided and applied by a controller of power device 139 where power modules 103a do not include the use of a power circuit 135. The control function may therefore establish and/or maintain string voltage Vstring or one or more of the string currents $Istring_{1-n}$, or the algebraic sum of string currents to terminals +/− of system power device 139. Other features of power modules 103a may provide enablement of the control function. Other features of power modules 103a may allow the sensing of voltages and currents within each of the connection configurations 104c/104d that may be included in step 725 and to communicate data of the sensing to system power device 139. The control function may therefore allow method 751 to be applied to safe voltage units 715 utilized in power system 100d.

In step 725, with reference to FIG. 7A, parameters of power system 100d may be sensed. The parameters sensed may include the voltage levels output by power sources 101, the polarities of the voltages output by power sources 101 relative to each other, the current level and the direction of string currents $Istring_{1-n}$ in connection configurations 104c/104d, the voltage level of connection configurations 104c/104d and/or the presence or the absence of a grid or load 107 connected to the output of system power device 139. In general, operation of safe voltage unit 715 may provide substantially a short circuit or an open circuit of terminals A' and B'. The short circuit or the open circuit may be provided by method 751 applied to bypass circuits 718a and 718b. The short circuit may provide string currents $Istring_{1-n}$ flow in either direction in connection configurations 104c/104d.

Safe voltage unit 715 may be utilized to provide a bypass mode for current flow of string current $Istring_1$ from terminals B' to A' when one or more of the safe voltage units 715 may be activated because of underperformance of panels because of shade 155 for example. The bypass mode may be provided in either the normal (step 702) or safety (step 706) modes of operation. Underperformance of panels may cause a reverse voltage bias of the panels (e.g., due to excessive current being forced through an underperforming panel). In some cases, the reverse voltage bias may be sensed at step 725 and may be used in criteria for the control algorithm of power system 100d to decide to be in either the normal mode of operation (step 702) or the safety mode of operation. As such, if a safe voltage unit 715, is in the bypass mode, flow of string current $Istring_1$ from terminals B' to A' continues. Alternatively, (e.g., where power sources 101 are batteries with associated charging converter connected to safe voltage units 715 for example, and the batteries are being charged during a normal mode of operation (step 702) of operation), flow of string current $Istring_1$ may be from terminals A' to B'. As such, some of the safe voltage units 715 may be activated and turned ON (e.g., because of a battery becoming substantially charged before other batteries), so a bypass mode included in the normal mode of operation (step 702) of operation may be initiated for the charged battery with its associated charging converter OFF to isolate the battery such that string current $Istring_1$ from terminals + to − continues to charge the other batteries.

Some, most or all of the safe voltage units 715 may be activated ON in a safety mode to ensure a safe voltage level between and at each of the terminals A' and B' in connection configurations 104c to reduce the level of the voltage between or at terminals + and − of connection configurations 104c to a safe voltage level. A controller of system power device 139 may implement a control function to power system 100d based on a control algorithm run by the controller. Criteria for the control algorithm of power system 100d to enter into the safety mode from the normal mode of operation (step 702) may include a substantially zero string current $Istring_1$ existing and/or signal 70 not being received by power modules 103a. Safe voltage units 715 activated ON by the controller in the safety mode may cause a direction of string current $Istring_1$ to be from terminals A' to B'. When safe voltage unit 715 is OFF or de-activated, string current Istring$_1$ may be substantially equal to the currents (Is) output by the power sources 101.

At decision step 752, responsive to sensing step 725, the controller carrying out it may be decided that string currents Istring$_{1-n}$ have to flow from terminal A' to terminal B' or from terminal B' to terminal A'. A criterion for entering the safe mode form the normal mode of operation (step 702) may include panels not being reversed biased, a substantially zero string current Istring$_1$ and/or signal 70 not being received by power modules 103*a*. Activation of safety unit 715 to ON may be such that current from string current Istring$_1$ is flowing from terminal A' to terminal B' because switch S75 is turned ON by operating power P2 supplied by power source 101 at step 753. Switch S75 turned ON causes current to flow in the body diode of switch S76 whilst switch S76 may be OFF in step 755. Switch S76 may be turned ON in step 755 by implementation of method 1007 applied to switch S76, where some of the current to flow in the body diode of switch S76 as power P1*a* may be utilized by circuitries of bypass circuits 115, 115*a*, 115*b* and/or 115*c* which may be included in bypass circuit 718*a* to turn switches S75 and S76 ON. If, in decision step 757, switch S76 is not turned ON, step 755 may continue until switch S76 is ON. If in decision step 757, switch S76 is turned ON. The power to drive switches S76 and S75 via gate drivers Gd1 and Gd2 applied to respective gates g1 and g2 may be provided by power P1*a* and/or power P2.

Similarly, in a normal mode of operation (step 702) where power sources 101 are batteries being charged via converter circuit for example, decision step 752 may consider that batteries are not reverse-biased, a substantial string current Istring$_1$ does exist and/or signal 70 is being received by power modules 103*a*. Activation of safety unit 715 to ON may be due to a battery connected to safety unit 715 becoming charged before other batteries. A bypass mode included in the normal mode of operation may therefore be initiated for the charged battery with an associated charging converter OFF. The associated charging converter OFF isolates the battery from the effect of safety unit 715 being ON. The charged battery is thereby bypassed, and according to steps 753-759, string current Istring$_1$ from terminals A' to B' continues to charge the other batteries.

At decision step 752, responsive to sensing step 725, it may be decided by the controller carrying out method 751 (e.g., the controller of system power device 139) that string currents Istring$_{1-n}$ should flow from terminal B' to terminal A'. String currents Istring$_{1-n}$ may flow from terminal B' to terminal A' because in a normal operation mode, some of the safe voltage units 715 may be activated ON because of shade 155 affecting PV panels. Shade of panels may cause a reverse bias of the panels. The reverse bias may be sensed (e.g., by detection of a negative voltage across a PV panel) in step 725 and may be used in criteria for a control algorithm of power system 100*d*. Activation of safety unit 715 to ON is such that current from string current Istring$_1$ is from terminal B' to terminal A' because switch S76 is turned ON by operating power P2 supplied by power source 101 at step 754. Switch S76 turned ON causes current to flow in the body diode of switch S75 whilst switch S75 may be OFF in step 756. Switch S75 may be turned ON in step 756 by implementation of method 1007 applied to switch S75. With switch S75 ON, power P1*b* may be provided as a result of some of the current to flow in the body diode of switch S75 may be utilized by circuitries of bypass circuits 115, 115*a*, 115*b* and/or 115*c*. The circuitries may be included in bypass circuit 718*b* to turn switches S75 and S76 ON. If in step 758, switch S75 is not turned ON, step 756 may continue until switch S75 is ON. If in step 758, switch S75 is turned ON, the power to drive switches S76 and S75 via gate drivers Gd1 and Gd2 applied to respective gates g1 and g2 may be provided by power P1*b* and/or power P2.

In general, for the descriptions above and for those which follow below, power source 101 may function as a source of string currents Istring$_{1-n}$ that may flow from terminal A' to terminal B', and/or when power source 101 is functioning as a sink (for example when power source 101 is a battery, and the battery is being charged), string currents Istring$_{1-n}$ may flow from terminal B' to terminal A' of one or more safe voltage units. Bypass of terminals A' and B' may be achieved by a bi-directional switch which may include switches S65 and S66 according the descriptions above with respect to FIGS. 6A-6D and with respect to use of switches S76 and S75. The descriptions above with respect to FIGS. 6A-6D may be similarly utilized in safe voltage unit 715 to provide a bi-directional switching function to provide both the safety mode and the bypass mode for both DC currents Istring$_{1-n}$ described above and AC string currents Istring$_{1-n}$ provided in the descriptions that follow below.

Figure 7F:
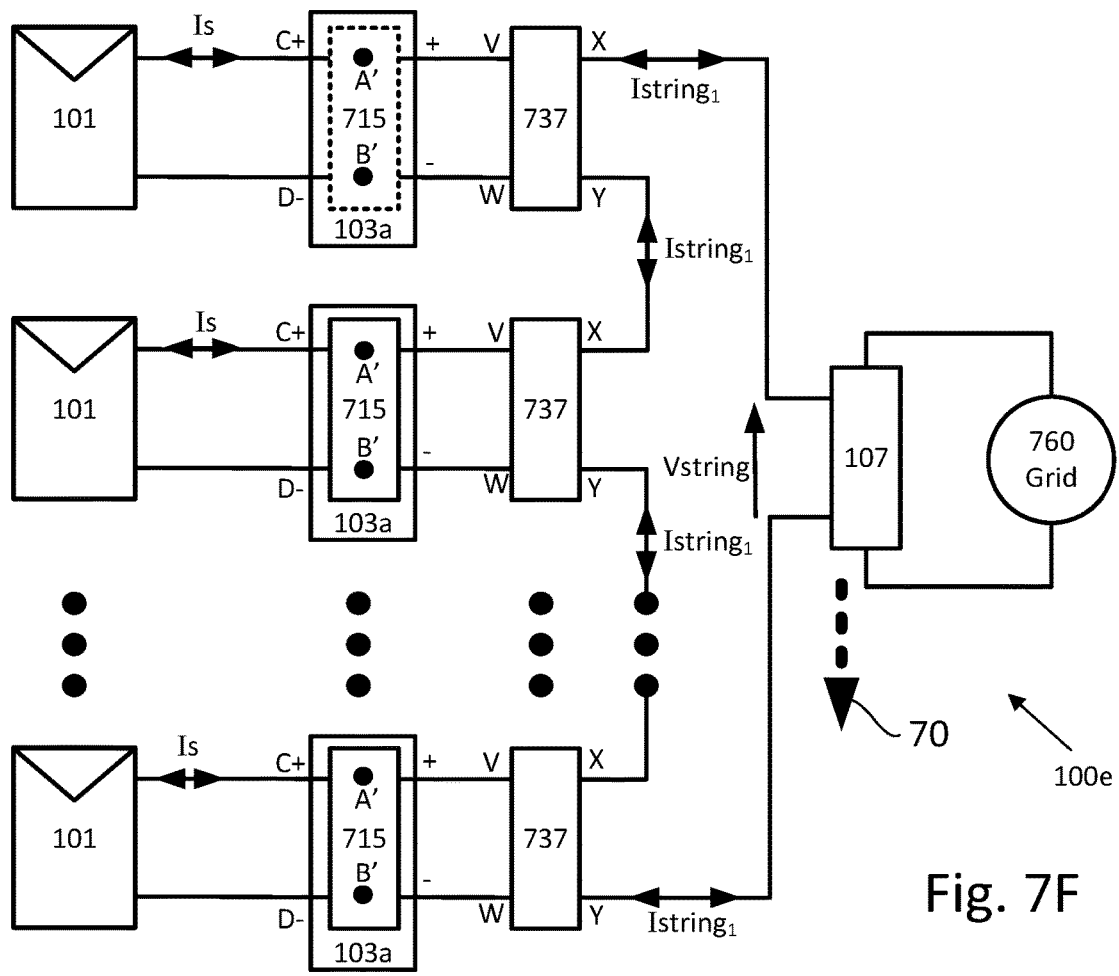
FIG. 7F shows a power system, according to one or more illustrative embodiments.

Reference is now made to FIG. 7F, which shows a block diagram of power system 100*e*, according to one or more illustrative embodiments. Power system 100*e* includes multiple power sources 101, which by way of non-limiting example may be photovoltaic panels and/or storage devices such as batteries. If power module 103*a* includes a power circuit 135 disposed between terminals C+, D− and terminals +, −, terminals A' and B' of safe voltage units 715 may connect across power sources 101 at terminals C+, D− or may connect across terminals +, − of power module 103*a*. When power modules 103*a* might not include a power circuits 135, terminals A', B' of safe voltage units 715 may connect across power sources 101. Terminals +, − connect respectively to one side of bridge circuits 737. Bridge circuit 737 may be the same as bridge 306 shown in FIG. 3A. The other side of bridges 736 on terminals X and Y connect in a series string in which flows string current Istring$_1$. The series string may connect across load 107. Load 107 may be the same as system power device 139 which may be connectable to a grid 760.

Bridge circuits 737 may convert the DC from power sources 101 at terminals +, − to AC at terminals X and Y directly if there is no power circuit 135 included in power module 103*a*. If there is a power circuit 135 included in power module 103*a*, AC may be provided to load 107 and/or grid 760 from bridge circuits 737 via DC power from power circuits 135 at terminals +, −. Where power sources 101 are batteries in need of charge, bridge circuits 737 may convert the AC from grid 760 to DC to be provided to the batteries directly or via power circuits 135. Therefore, if power sources 101 are batteries, currents Is may be discharged to load 107/grid 760 in one direction and may be charged from load 107/grid 760 to the batteries in the opposite direction. In sum, bridge circuits 737 may convert the DC from power sources 101 at terminals +, − to AC to load 107 and vice versa by converting AC from load 107/grid 760 to DC to power sources 101. Therefore, string current Istring$_1$ in the above description is an alternating current (AC).

Figure 7G:
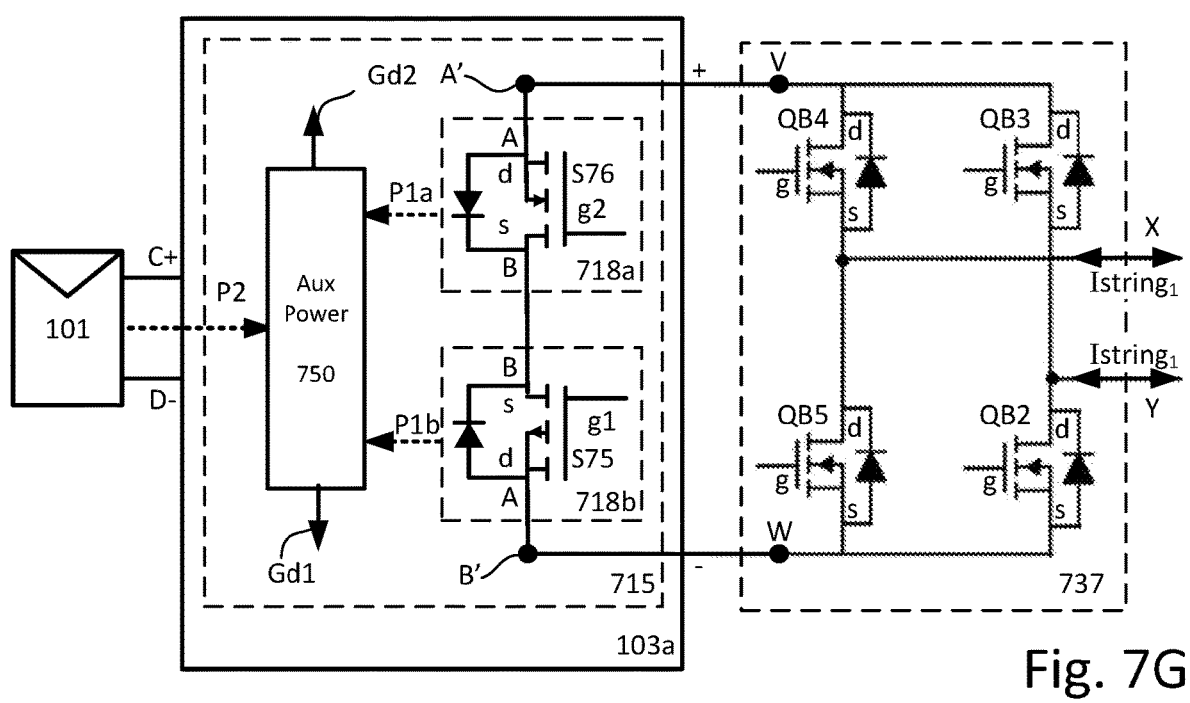
FIG. 7G shows further details of the power system of FIG. 7F, according to one or more illustrative embodiments.

Reference is now made to FIG. 7G, which shows further circuit details of safety unit 715 and bridge circuit 737 that may be included in power system 100*e* of FIG. 7F, according to one or more illustrative embodiments. Safety unit 715, power source 101 and the connection between power source 101 and power module 103*a* are described as above with respect to FIG. 7A and FIG. 7B. With respect to bridge circuit 737, terminals +, − connect respectively to the drains (d) of switches QB4 and QB3 at terminal V and the sources (s) of switches QB5 and QB2 at terminal W. Terminals X and Y of bridge circuit 737 connect respectively to where the source (s) of switch QB4 connects to the drain (d) of switch QB5 and where the source (s) of switch QB3 connects to the drain (d) of switch QB2. In operation, bridge circuit 737 may have alternating drives applied to the gates (g) of switch pairs QB4 and QB2 and to the gates (g) of switch pairs QB3 and QB5. The alternating drives applied may be pulse width modulation (PWM) so that bridge circuit 737 may convert DC from terminals V and W to AC on terminals X and Y and vice versa so that that bridge circuit 737 may convert DC from terminals X and Y to AC on terminals V and W.

Reference is now made again, by way of a non-limiting example, to FIGS. 7F-7G and methods 701 and 751. The non-limiting example assumes power sources 101 are photovoltaic panels supplying power to load 107 via power modules 103a, which may include power circuits 135 disposed between terminals C+, D− and terminals +, −. Safe voltage units 715 may connect across +, − at terminals A', B'. The string of serially connected terminals X and Y of bridge circuits 737 connect across load 107.

In normal operation of power system 100e in step 702, a control function may be provided, by one or more controllers connected to power modules 103a. A primary power module 103a may establish communication and control to the other secondary power modules 103a, safety units 715 and/or bridge circuits 737. The primary power module 103a may therefore control the string voltage Vstring and/or string current $Istring_1$ applied to load 107/grid 760. The features power modules 103a connected to system power device 139 may provide an enablement of the control function. The other features of power modules 103a to enable the control function may allow a sensing of voltages and currents of power sources 101 and the string current $Istring_1$. The sensing may be included in step 725 and the enablement may further include communication of data of the sensing to load 107/system power device 139. The control function may therefore allow methods 701/751 to be applied to safe voltage units 715 utilized in power system 100e.

In the normal operation of power system 100e, in step 725 parameters of power system 100e may be sensed. The parameters sensed may include the voltage levels of the power sources 101, the polarities of power sources 101 relative to each other, the current level and the directions of string current $Istring_1$, the voltage level of the string voltage Vstring or the presence or the absence of a grid 760 and/or load 107.

The control function responsive to the parameters sensed in step 725 may therefore establish and verify the normal operation of power system 100e in step 702 by receiving signal 70 from load 107 if similar to system power device 139. Safety units 715 connected across terminals +, − in step 723 may provide an operating bias to safety units 715 to be ON or OFF in the normal mode of operation (step 702) of power system 100e. The operating bias may be responsive to the parameters sensed (step 725) and controlled by the control function or be independent of the control function and the parameters sensed. As previously stated, the controller may be part of system power device 139 or may be included in power modules 103a. Activation of safe voltage units 715 may be by control of the controller responsive to sensing step 725 or the analog circuitry of safe voltage units 715 working independently of the controller. Safe voltage units 715 working independently may be according to descriptions above with respect to FIGS. 1I and 1Q, which may be appropriate for very low levels of string current that may exist at dusk or dawn, for example. Activation of safe voltage units 715 may also be a combination of control of the controller responsive to sensing step 725 and the analog circuitry of safe voltage units 715.

During normal operation of power system 100e in step 702, signal 70 is sent from system power device 139 and/or load 107 to power modules 103a. Signal 70, by way of non-limiting example may be transmitted to power modules 103a by power line communications. Communication interfaces 129 of power modules 103a receive signal 70 sent from system power device 139 and/or load 107. If in step 704, signal 70 is received by power modules 103a, a normal operation of power system 100e continues in step 702. In the normal operation, safe voltage units 715 may be OFF or open circuit between terminals A' and B' and bridge circuit 737 may convert DC from terminals V and W to AC on terminals X and Y.

When safe voltage units 715 are OFF or de-activated, the rms value of AC string current ° $Istring_1$ may be similar to the current (Is) from the poorest performing power source 101 and the rms AC voltage across each of terminals X and Y similar to the voltage of a respective power source 101. Included in the normal mode of operation (step 702) responsive to sensing step 725 is a situation when the current (Is) from a power source 101 may be substantially zero. Current (Is) substantially zero may be because of shade 155 (if power sources 101 are photovoltaic panels for example) or the power source 101 is faulty. In either case in the normal mode of operation terminals X and Y may need to be bypassed. Shade 155 of panels may cause a reverse bias of the panels, which may be sensed in step 725 and reduced string current $Istring_1$ which may be used in criteria for a control algorithm of power system 100e to decide to be in the normal mode of operation (step 702) and apply bypasses to terminals X and Y. With reference to FIG. 7G, in bypass of terminals X and Y, in a one-half cycle of AC current $Istring_1$, switches QB4 and QB5 are OFF, QB3 and QB3 are ON. Therefore, in the one-half cycle current through safe voltage unit 715 (ON) is from terminal B' to terminal A' by application of steps 754-760 of method 751 at decision 752. On the other half cycle of AC current $Istring_1$, switches QB4 and QB5 are ON, QB3 and QB5 are OFF. Current through safe voltage unit 715 (ON) is from terminal A' to terminal B' by application of steps 753-759 at decision 752 of method 751. Auxiliary power to power the bypass of terminals X and Y as such may be utilized from at least auxiliary power circuits 162/750.

Similarly, in the normal mode of operation (step 702) where power sources 101 are batteries being charged via charging converter circuits for example, sensing step 725 and decision step 752 may consider that batteries are not reversed biased, a substantial string current $Istring_1$ does exist and/or signal 70 is being received by power modules 103a. Activation of safety unit 715 to ON may be because of a battery becoming charged before the other batteries. The battery becoming charged before the other batteries may initiate a bypass mode that may be included in the normal mode of operation (step 702). The bypass mode may be initiated for the charged battery with its associated charging converter (power module 103a) OFF to isolate the battery from the effect of safety unit 715 being ON. Therefore, the charged battery is bypassed and according to steps of method 751 for both directions of string current $Istring_1$ from terminals A' to B' and from terminals B' to A' allows continued charging of the other batteries.

If in step 704, signal 70 is not received by power modules 103*a*, a safety mode of operation (step 706) of power system 100*e* may be started in step 706 by activation of some and/or all of the safe voltage units 715. Signal 70 not received by power modules 103*a* may be indicative of a disconnection of at least one of the power lines that connect system power device 139 and/or load 107 to the series string connection of terminals X and Y of bridge circuits 737. Alternatively, the disconnection may be in the power lines within the series string or between the series string and power device 139/load 107. The disconnection may be due to an over current blowing an inline fuse, circuit breaker or residual current device (RCD) in the power lines within the series string and/or between power device 139 and/or load 107 to the series string. The overcurrent may cause an open circuit in connectors between power lines which may also be further cause of the disconnection.

Unsafe conditions that may not allow signal 70 to be received may further include, for example, a disconnection in power system 100*e*, a grid outage, a leakage current or an inverter malfunction, etc. Safe voltage units 715 being ON, according to method 751, may ensure safe voltage level (e.g., 0.1V, 1V, 2V etc.) across power sources 101, terminals A'/B', terminals V and W to give a safe voltage level of the string voltage Vstring. Maintaining a safe Vstring level as well as safe voltage levels across power sources 101, terminals A'/B' and terminals V and W may protect operatives such as installers and fireman from electrocution for example.

The safety mode of operation in step 706 may be triggered in safe voltage unit 715 in various ways. According to one feature, a stop signal may be received by a communication device included in safe voltage unit 715, the stop signal being transmitted by a system power device (e.g., 139)/load 107. According to a feature, safe voltage unit 715 may constantly (e.g., continuously, or at regular intervals) receive a "Keep alive" signal (e.g., from system power device 139/load 107) while the system is operating properly. The signal may be wired or wireless. Upon cessation of the "Keep alive signal" (e.g., having not received a "Keep alive" for a period of time, such as 10 seconds), the safe voltage unit 715 may triggered. The safety mode of operation (step 706) may therefore be by activating safe voltage unit 715 ON.

A criterion for activating at least one or more safe voltage units 715 may be based on a maximum acceptable safe voltage for Vstring that may be considered to be safe in case of a disconnection, possible causes for the disconnection are described in more detail above. By way of non-limiting example, if ten bridge circuits 737 with connection terminals X and Y wired in series are connected across system power device 139 and/or load 107. Each bridge circuit 737 output may be 20 volts (V) rms and a safe voltage for Vstring is considered to be 60V rms when a disconnection from and/or shutdown of system power device 139 and/or load 107 occurs. At step 706, seven of the safe voltage units 715 may be turned ON in order to ensure the safe voltage, since three of the ten safe voltage units 715 are OFF. Three of the ten safe voltage units 715 being OFF by virtue of Kirchoff Voltage Law gives Vstring=20V+20V+20V=60V rms. Step 706 may be permanently applied to ensure the safe voltage until a reconnection of power sources 101, power modules 103*a*, the series string connection of terminals X and Y of bridge circuits 737 and/or startup of system power device 139 and/or load 107 occurs. The reconnection as such may reestablish the normal mode of operation in step 702.

The control algorithm of a controller located in load 107 and/or at least one of the power modules 103*a* is aware of what a maximum voltage for Vstring. The maximum voltage for Vstring may be based on the number of power modules 103*a*. Where the output voltage or the combined output voltages in parts of string are considered not safe, the control algorithm may ensure a safe voltage level at each point in the series string. The safe voltage level may be by activating all of the safe voltage units 715 ON. Whereas the control algorithm may deem it fit to activate some of the safe voltage units 715 ON to ensure the safe voltage for Vstring as shown in the numerical example above.

According to some aspects, ensuring power to the auxiliary power circuit may solve one or more problems and/or provide an advantage over auxiliary power provided only when connected to the inputs to the power device. For example, in a scenario where a power generator was disconnected from a power device, the auxiliary power circuit may provide an option of bypassing the disconnected portion of the string rather than disconnecting the entire string, or by creating an open circuit section in a string that has a danger of arcing. Another example of a possible advantage according to certain aspects may be providing auxiliary power at night when the PV power generator might not provide substantial power.

According to certain aspects, the power device may test the power generators to determine whether they are operating in a normal state or not, in which the testing may require auxiliary power. Providing auxiliary power may enable the ability to perform testing on one or more power generators and bypassing one or more power generators in the same string. It is noted that various connections are set forth between elements herein. These connections are described in general and, unless specified otherwise, may be direct or indirect; this specification is not intended to be limiting in this respect. Further, although elements herein are described in terms of either hardware or software, they may be implemented in either hardware and/or software. Additionally, elements of one embodiment may be combined with elements from other embodiments in appropriate combinations or sub combinations.

Although the subject matter has been described in language specific to structural features and/or methodological acts, it is to be understood that the subject matter defined in the appended claims is not necessarily limited to the specific features or acts described above. For example, in each of the embodiments described above, the absence or presence of a signal from a device of a power system may not necessarily be an indication of an unsafe condition, but instead may be an indication to cause the power system to enter into a safety mode of operation from a normal mode of operation. For example, the absence or presence of a signal may cause the power system to enter into a safety mode (as described above), whereupon, entry of the power system into the safety mode of operation causes safety switches to be ON to ensure a voltage level at each point in a series string of power sources of the power system to be at or below a predetermined voltage level, thereby reducing the level of the voltage of the series string to be at or below the predetermined voltage level. The entering into the safety mode of operation may be a result of, for example, a disconnection in the series string of power sources, a disconnection between the series string and a power device which the series string is connected across, an outage of a grid connected to the power device, a leakage current, a malfunction of the power device, a trip of a circuit breaker, a shutdown of the power device, or for any other reason a user would want or need to put the system in the safety mode. Rather, the specific features and acts described above are described as example implementations of the following claims.

Various characteristics of various embodiments of the invention as hereinafter highlighted in a set of numbered claims. These characteristics are not to be interpreted as being limiting on the invention or inventive concept, but are provided merely as a highlighting of some characteristics of the invention as described in the description without suggesting a particular order of importance or relevancy of such characteristics.

What claimed is:

1. A power system comprising:
   a power device; and
   a plurality of power sources connected in a series string, wherein the series string is connected across the power device to provide a voltage of the series string to the power device;
   a plurality of safe voltage units each including a respective plurality of safety switches connectable across each one of the plurality of power sources, wherein each of the plurality of safe voltage units is configured to monitor for a signal output from the power device; and
   a plurality of sensors connectable to each one of the plurality of power sources,
   wherein the plurality of sensors are configured to sense a plurality of parameters of the plurality of power sources,
   wherein the power system is controllable such that at least one of: a) detection of the signal by the plurality of safe voltage units within a predetermined time period, or b) an operating criterion determined based on the plurality of parameters sensed, causes each of the plurality of safety switches to be OFF in a normal mode of operation of the power system,
   wherein the power system is controllable such that, when at least one of the plurality of safe voltage units does not detect the signal within the predetermined time period, the power system enters into a safety mode of operation from the normal mode of operation, and
   wherein, the power system is controllable such that, upon entry of the power system into the safety mode of operation, the plurality of safety switches are caused to be ON to ensure a voltage level at each point in the series string to be at or below a predetermined voltage level.

2. The power system of claim 1, wherein in the normal mode of operation, power from the series string is applied to the power device, and wherein when the plurality of parameters sensed by the plurality of sensors are indicative of the normal mode of operation, the plurality of safe voltage units are controlled to be OFF.

3. The power system of claim 1, wherein the plurality of power sources comprise batteries, wherein power from the power device is applied to the series string to charge the batteries in the normal mode of operation, and wherein at least one of receiving of the signal or operating criteria applied to the plurality of parameters sensed, enables each of the plurality of safety switches to be OFF or ON responsive to the normal mode of operation.

4. The power system of claim 1, wherein the plurality of power sources comprise batteries, wherein power from the batteries is provided from the series string to the power device to thereby discharge the batteries in the normal mode of operation, and wherein at least one of receiving of the signal or operating criteria applied to the plurality of parameters sensed, enables each of the plurality of safety switches to be OFF or ON, in the normal mode of operation of the power system.

5. The power system of claim 1, wherein the plurality of power sources comprise photovoltaic panels, wherein power from the photovoltaic panels is provided from the series string to the power device in the normal mode of operation, and wherein at least one of receiving of the signal or operating criteria applied to the plurality of parameters sensed, enables each of the plurality of safety switches to be OFF when the photovoltaic panels are unshaded or ON when photovoltaic panels are shaded, in the normal mode of operation.

6. The power system of claim 1, wherein the voltage of the series string is less than an open circuit voltage of the plurality of power sources.

7. The power system of claim 1, wherein an operating power is provided to the plurality of safety switches to cause the plurality of safety switches to be ON or OFF in the normal mode of operation of the power system.

8. The power system of claim 1, wherein the operating criterion in the normal mode is selected from a group of criteria comprising at least one of: voltage levels of the plurality of power sources, polarities of the plurality of power sources relative to each other, current level in the series string, a direction of current in the series string or the voltage level of the series string.

9. The power system of claim 1, wherein the power system enters into the safety mode of operation from the normal mode of operation due to at least one of: a disconnection in the series string, a disconnection between the series string and the power device, an outage of a grid connected to the power device, a leakage current, a malfunction of the power device, a trip of a circuit breaker or a shutdown of power device.

10. The power system of claim 1, wherein the voltage of the series string is a sum of each of voltage levels of the plurality of power sources.

11. The power system of claim 1, wherein operating power of the plurality of safe voltage units is supplied from at least one of the plurality of power sources or an auxiliary source of power independent of the plurality of power sources.

12. The power system of claim 1, further comprising a load connected to the power device, wherein the load is selected from a group of loads comprising at least one of: an alternating current (AC) grid, a direct current (DC) grid, a transformer, a DC to AC inverter, a DC to DC converter, or an AC to DC rectifier.

13. A method for a power system having a series string of a plurality of power sources connected across a power device, the method comprising:
   connecting a plurality of safe voltage units including a plurality of safety switches connected respectively across each of the plurality of power sources,
   monitoring an operating power applied to the plurality of safety switches;
   sensing a plurality of parameters of the plurality of power sources;
   monitoring, by the plurality of safe voltage units, for a signal transmitted from the power device;
   activating each of the plurality of safety switches to be OFF responsive to detecting the signal within a predetermined time period and at least one of the operating power or a sensing being associated with a normal mode of operation; and upon not detecting the signal from the power device within the predetermined time period, or based on the operating power applied to the plurality of safety switches being associated with an abnormal mode of operation, entering a safe mode of operation of the power system by reducing voltage levels of each of the plurality of power sources to a voltage level less than a predetermined voltage level by activating the plurality of safety switches to be ON.

14. The method of claim 13, wherein the activating comprises: turning at least one of the plurality of safety switches from OFF to ON responsive to the monitoring, wherein the monitoring monitors for a reverse polarity of a respective power source relative to other polarities of other power sources of the plurality of power sources.

15. The method of claim 13, wherein the reducing ensures a safe voltage level at each point in the series string of the plurality of power sources.

16. The method of claim 13, wherein a lowering of a voltage of the series string is achieved by activating at least one of the plurality of safety switches to be ON, thereby reducing the voltage of the series string to a safe level of voltage in the safe mode of operation.

17. The method of claim 13, wherein, in the safe mode of operation, a voltage of the series string is less than an open circuit voltage of each of the plurality of power sources.

18. The method of claim 13, wherein the operating power is selected from a group comprising at least one of: voltage levels of the plurality of power sources, polarities of the plurality of power sources relative to each other, current level in the series string, a direction of a current in the series string, or the voltage level of the series string.

19. The method of claim 13, wherein the sensing comprise sensing at least one of: a disconnection in the series string, or a disconnection between the series string and the power device.

20. The method of claim 13, wherein operating power of the plurality of safe voltage units is supplied from at least one of the plurality of power sources or an auxiliary source of power independent of the plurality of power sources.

* * * * *